(12) United States Patent
Ando et al.

(10) Patent No.: US 8,521,000 B2
(45) Date of Patent: Aug. 27, 2013

(54) INFORMATION RECORDING AND REPRODUCING METHOD USING MANAGEMENT INFORMATION INCLUDING MAPPING INFORMATION

(75) Inventors: Hideo Ando, Hino (JP); Yasufumi Tsumagari, Yokohama (JP); Takero Kobayashi, Akishima (JP); Haruhiko Toyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1268 days.

(21) Appl. No.: 11/472,347

(22) Filed: Jun. 22, 2006

(65) Prior Publication Data

US 2006/0291813 A1  Dec. 28, 2006

(30) Foreign Application Priority Data

Jun. 23, 2005  (JP) ................................ 2005-183537

(51) Int. Cl.
*H04N 9/80* (2006.01)

(52) U.S. Cl.
USPC ........................................................ 386/240

(58) Field of Classification Search
USPC ............. 386/46, 95, 124–126, 240, 248, 326, 386/337
See application file for complete search history.

(56) References Cited

U.S. PATENT DOCUMENTS

| | | | | |
|---|---|---|---|---|
| 5,771,334 A | * | 6/1998 | Yamauchi et al. | 386/95 |
| 5,978,841 A | * | 11/1999 | Berger | 709/217 |
| 6,181,870 B1 | * | 1/2001 | Okada et al. | 386/95 |
| 6,587,634 B2 | | 7/2003 | Maltz et al. | |
| 6,788,882 B1 | | 9/2004 | Geer et al. | |
| 7,155,676 B2 | * | 12/2006 | Land et al. | 715/731 |
| 7,930,624 B2 | * | 4/2011 | Phillips et al. | 715/201 |
| 2002/0007493 A1 | * | 1/2002 | Butler et al. | 725/109 |
| 2002/0056129 A1 | * | 5/2002 | Blackketter et al. | 725/112 |
| 2002/0131511 A1 | | 9/2002 | Zenoni | |
| 2003/0030852 A1 | | 2/2003 | Sampson et al. | |
| 2003/0095794 A1 | * | 5/2003 | Chung et al. | 386/95 |
| 2003/0115598 A1 | * | 6/2003 | Pantoja | 725/40 |
| 2003/0161615 A1 | | 8/2003 | Tsumagari et al. | |
| 2003/0231861 A1 | * | 12/2003 | Yoo et al. | 386/46 |
| 2004/0062530 A1 | | 4/2004 | Tsumagari et al. | |
| 2004/0117819 A1 | | 6/2004 | Yu | |
| 2004/0179618 A1 | | 9/2004 | Romriell et al. | |
| 2005/0021903 A1 | | 1/2005 | Baxter, Jr. | |
| 2005/0022226 A1 | * | 1/2005 | Ackley et al. | 725/23 |
| 2005/0033758 A1 | | 2/2005 | Baxter | |
| 2005/0071881 A1 | * | 3/2005 | Deshpande | 725/88 |
| 2005/0084245 A1 | | 4/2005 | Taira et al. | |
| 2005/0091672 A1 | | 4/2005 | Debique et al. | |

(Continued)

FOREIGN PATENT DOCUMENTS

| | | |
|---|---|---|
| EP | 1 093 122 A2 | 4/2001 |
| JP | 2000-115703 | 4/2000 |

(Continued)

*Primary Examiner* — David Harvey
(74) *Attorney, Agent, or Firm* — Oblon, Spivak, McClelland, Maier & Neustadt, L.L.P.

(57) ABSTRACT

According to one embodiment, there is provided an information playback method, comprising reading out management information used to manage one or more video titles from an information storage medium, the medium storing an advanced content including the management information in which a title timeline indicating playback timings of objects of each video title being individually defined, and playing back objects of each video title in accordance with the title timeline defined in the readout management information.

2 Claims, 27 Drawing Sheets

(56) References Cited

U.S. PATENT DOCUMENTS

| | | |
|---|---|---|
| 2005/0123284 A1 | 6/2005 | Kikuchi et al. |
| 2005/0160352 A1* | 7/2005 | Chung et al. ............... 715/500.1 |
| 2005/0207737 A1* | 9/2005 | Seo et al. ........................ 386/95 |
| 2005/0259968 A1* | 11/2005 | Tsumagari et al. ............. 386/95 |
| 2006/0165388 A1* | 7/2006 | Uesaka et al. ................ 386/125 |
| 2006/0188229 A1* | 8/2006 | Yamagata et al. .............. 386/95 |
| 2008/0270579 A1* | 10/2008 | Herz et al. .................... 709/219 |

FOREIGN PATENT DOCUMENTS

| | | |
|---|---|---|
| JP | 2001-285743 | 10/2001 |
| JP | 2001-320692 | 11/2001 |
| JP | 2002-216460 | 8/2002 |
| JP | 2003-116121 | 4/2003 |
| JP | 2004-343254 | 12/2004 |
| KR | 2003-0007706 | 1/2003 |
| KR | 2003-0097027 | 12/2003 |
| WO | WO 97/38527 | 10/1997 |

* cited by examiner

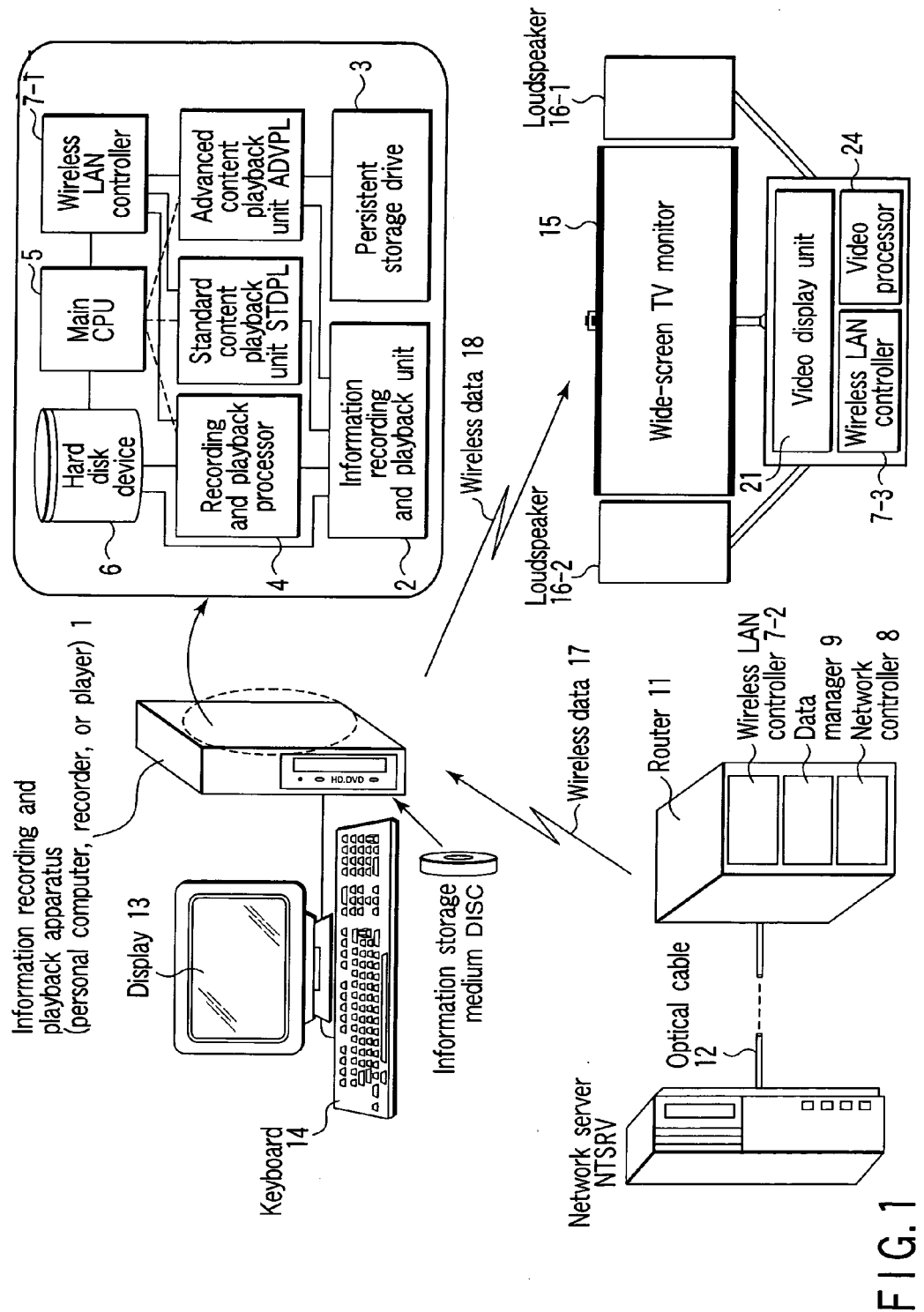
F I G. 1

| Required functions | Problems of prior art | Solutions (technical device contents to solve problems) | New effects obtained as result of technical devices |
|---|---|---|---|
| Flexible and diversified powers of expression (PC window like) | Since user requests are of too greater variety such requests cannot be met by only custom-made like minor change of data structure in existing DVD-Video standards | Expression formats in PC world having versatility are adopted, and concept of timeline is newly introduced | 1] Make flexible and impressive reactions in response to user's actions<br>  1.1) Make response by means of change in animation and image at the time of button selection or execution instruction<br>  1.2) Make voice response at the time of button selection or execution instruction<br>  1.3) Start execution operation at purposely delayed timing in response to user's execution instruction<br>  1.4) Give voice answer to help (like PC)<br>  1.5) Audibly and visually output how to use guide of menu, etc.<br>2] Allow flexible switching processing for video information itself and its playback method<br>  2.1) Switching presentation of audio information<br>  2.2) Switching presentation of subtitle information (telop, subtitle, still picture icon, etc.)<br>  2.3) Allow enlarged-scale presentation of subtitle according to user's favor<br>  2.4) Allow user to mark subtitle and to issue subtitle execution command<br>  2.5) Mark specific image part in synchronism with comment while director is making that comment<br>3] Simultaneously present independent information to be superimposed on image during playback<br>  3.1) Simultaneously present a plurality of pieces of video information by means of multi-windows<br>  3.2) Allow to freely switch size of each of multi-windows<br>  3.3) Simultaneously present prior audio message and after-recorded audio message by user<br>  3.4) Simultaneously present scrolling text to be superimposed on video information<br>  3.5) Simultaneously present graphic menus and figures (of select buttons, etc.) in flexible forms<br>4] Allow easy search to video location to be seen<br>  4.1) Conduct keyword (text) search of location to be seen using pull-down menu |

F I G. 2A

| Required functions | Problems of prior art | Solutions (technical device contents to solve problems) | New effects obtained as result of technical devices |
|---|---|---|---|
| Network action | Disjunction between data structure specified by existing DVD-Video standards and network compatible window is too large | Homepage presentation format (XML and scripts) of Web which has good track record in window expression of network is adopted as basic part of data management structure, and video playback management format is adjusted to it | 5] Provide update function of information on disc using network<br>5.1) Automatic updating of object information and intra-disc management information<br>5.2) Network downloading of how to use guide of menus<br>5.3) Automatic notification of information to user<br>5.4) Notification of OK/NG of update information presentation to user<br>5.5) Manual update function by user<br>6] Real-time online processing<br>6.1) Switching or mixing processing to audio information downloaded via network upon video playback (commentary presentation by means of voice of movie director, etc.)<br>6.2) Network shopping<br>6.3) Interactive real-time video change<br>7] Real-time information sharing with another user via network<br>7.1) Simultaneously present specific window even for another user at remote place<br>7.2) Play battle game or interactive game with another user at remote place<br>7.3) Participate in chatting during video playback<br>7.4) Transmit or receive message to or from fan club simultaneously with video playback |

F I G. 2B

| Required functions | Problems of prior art | Solutions (technical device contents to solve problems) | New effects obtained as result of technical devices |
|---|---|---|---|
| Easy processing of video related information and easy transmission of information after processing | New management data structure that can flexibly and easily cope with complicated information processing is needed | XML is adopted and concept of timeline is introduced | 8] Allow user to select and generate playlist and to transmit it<br>  8.1) Allow user to select or generate playlist<br>  8.2) Allow user to transmit playlist selected or generated by him or her to friend<br>  8.3) Allow to play back playlist selected or generated by user only on specific disc<br>  8.4) Allow user to also select collection of highlight scenes of video information<br>  8.5) Publish scrapbook that captures favorite frames in video information on Web<br>  8.6) Store and play back angles or scenes in multi-angles or multi-scenes selected by user<br>9] Allow user to append specific information associated with video information and to transmit result via network<br>  9.1) Allow user to add comment about video information, and to share it with another user on network<br>  9.2) Paste input image to character's face in video information<br>  9.3) Paste user information or experience information upon seeing video information onto image information<br>  9.4) Use user information in parental lock to impose automatic limitation on video information to be presented<br>10] Automatically save playback log information<br>  10.1) Provide automatic saving function of resume (playback pause) information<br>  10.2) Automatically save halfway information of game progress until previous time<br>  10.3) Automatically save previous playback environment (battle game environment with a plurality of users, etc.) |

F I G. 2C

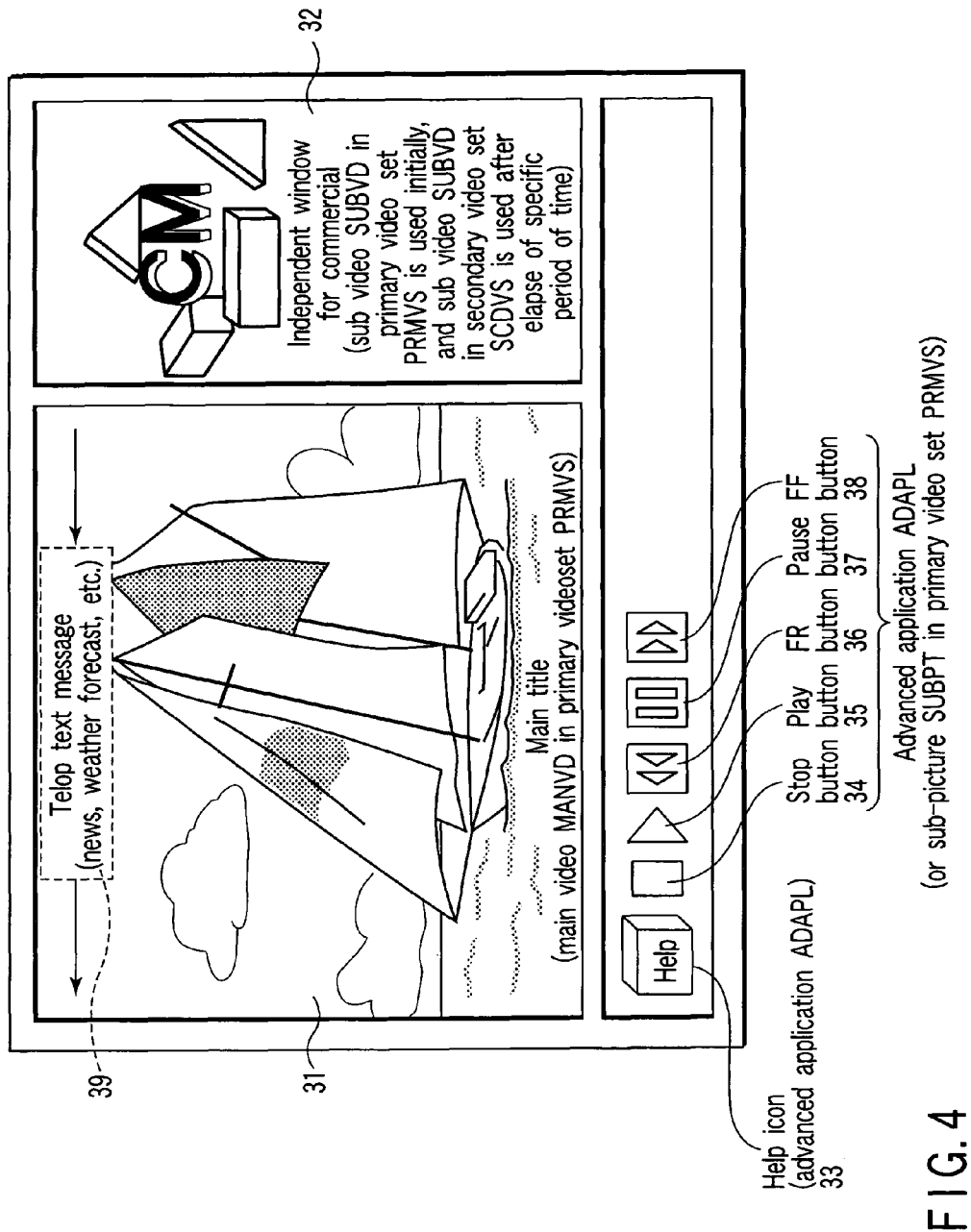
F I G. 4

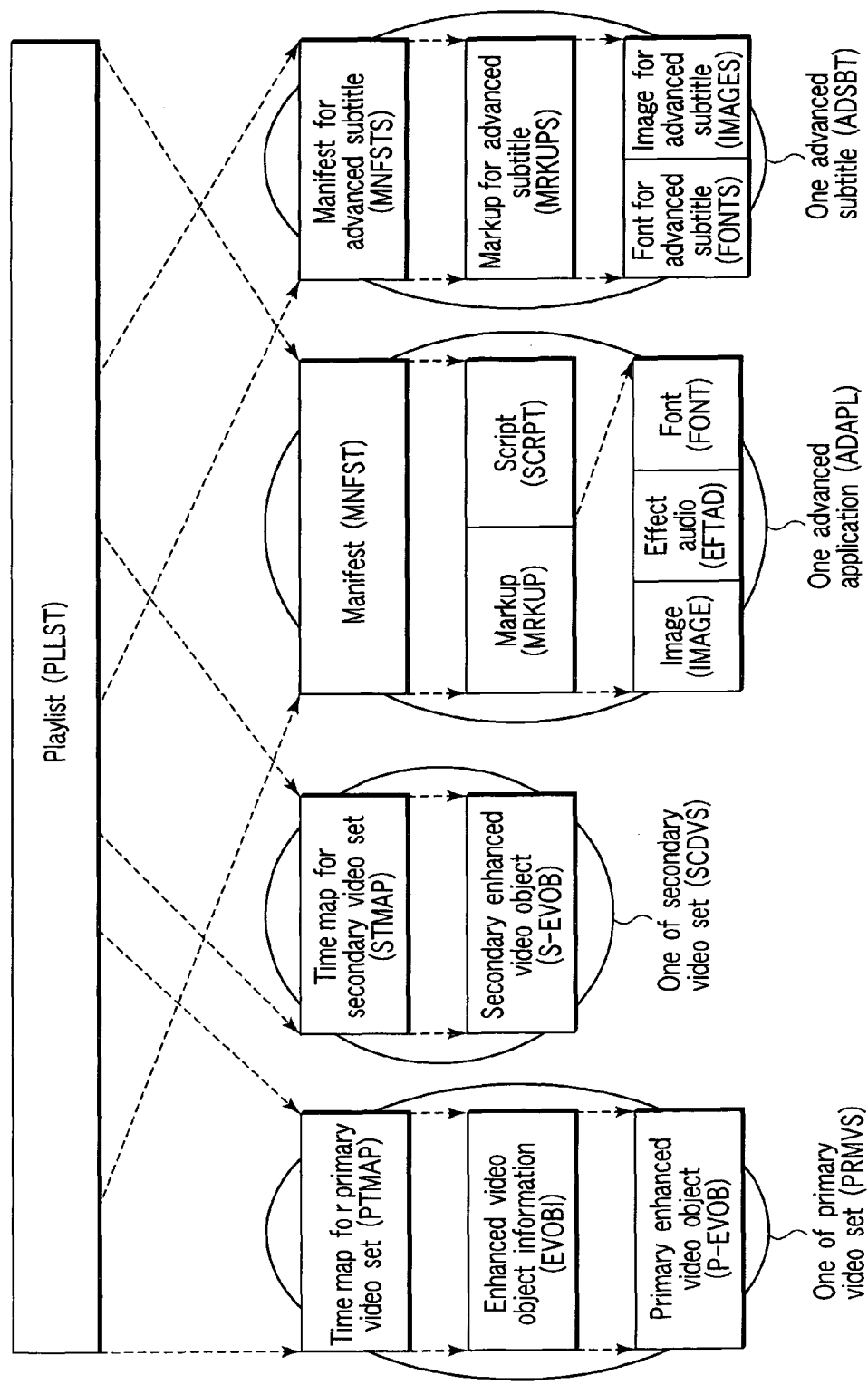
F I G. 6A

| Point number | Feature and point contents in this embodiment | Explanation of effect contents |
|---|---|---|
| (1) | Hierarchical structure of playlist PLLST and markup file MRKUP is provided as setting management information associated with layout on time axis and two-dimensional layout on user presentation window. ⇒Both playlist PLLST and markup file MRKUP are described using identical description format (XML). | 1) Extendability and flexibility of setting management information associated with layouts are improved. 2) Easy interpretation processing and sharing of management information can be attained since identical description format is used. |
| (2) | Playlist PLLST has media clock synchronized with title timeline TMLE and markup file MRKUP has page clock and application clock synchronized with setting based on timing element. These clocks can be independently set (they need not be synchronized). | When movie information synchronized with title timeline TMLE is played back at high speed or rewound, it can be presented simultaneously with window which undergoes standard playback on application clock, thus greatly improving power of expression to user. |
| (3) | Initial layout on window of movie (enhanced video object EVOB) is designated on playlist PLLST (video attribute item element VABITM), and can be changed in correspondence with execution of script file SCRPT. | Since movie presentation region on user window can be arbitrarily set, power of expression to user can be greatly improved. |
| (4) | Layout of presentation region (application region APPRGN) of advanced application ADAPL on window is designated in manifest file MNFST, and layouts for respective element in that region are designated on markup file MRKUP | 1) Since layout locations of respective elements of advanced application ADAPL are grouped (by application region APPRGN), management by advanced application manager ADAMNG is facilitated. 2) Layout management with movie expression region (prevention of overlapping, etc.) is facilitated. |

FIG. 6B

| Point number | Feature and point contents in this embodiment | Explanation of effect contents |
|---|---|---|
| (5) | A plurality of markup files MRKUP can be set for one playlist PLLST. | Jump presentation among a plurality of markup pages MRKUP can be attained during presentation of single movie, thus improving power of expression to user. |
| (6) | Jump among a plurality of markup pages MRKUP in single playlist PLLST is attained by executing script file SCRPT set in markup pages MRKUP. | Jump method among a plurality of markup pages MRKU is greatly and flexibly implemented.<br>⇒Example: Jump between markup pages MRKUP, which does not take place immediately after user designates action, and takes place with delay in synchronism with movie presentation window can be set using script file SCRPT (see effect (1. 3) in FIG. 2A). |
| (7) | 1) A plurality of markup pages MRKUP to be jumped in single playlist PLLST is designated by a plurality of manifest files MNFST.<br>2) Designated markup files MRKUP are temporarily saved in file cache FLCCH in advance. | Since markup page MRKUP information designated by manifest files MNFST can be saved in advance in file cache FLCCH, jump among a plurality of markup pages can be attained at high speed, and such function can be easily used by user (favorable impression). |
| (8) | Markup page MRKUP to be presented initially is designated from playlist PLLST via SRC attribute information of advanced application ADAPL and SRC attribute information of markup element MRKUP in manifest file MNFST. | Extendability about markup page MRKUP designation from playlist PLLST can be improved, and easy edit is assured. |

FIG. 6C

| Presentation object | Data source | Data type | Player | Decoder |
|---|---|---|---|---|
| Primary video set (PRMVS) | Disc (DISC) | Primary audio video (PRMAV) | Primary video player (PRMVP) | Main video decoder (MVDEC) |
| | | | | Main audio decoder (MADEC) |
| | | | | Sub video decoder (SVDEC) |
| | | | | Sub audio decoder (SADEC) |
| | | | | Sub-picture decoder (SPDEC) |
| Secondary video set (SCDVS) | Disc (DISC), persistent storage (RPSTR), network or file cache (FLCCH) (or data cache (DTCCH)) | Substitute audio video (SBTAV) | Secondary video player (SCDVP) | Main video decoder (MVDEC) |
| | | Substitute audio (SBTAD) | | Main audio decoder (MADEC) |
| | | Secondary audio video (SCDAV) | | Main audio decoder (MADEC) |
| | | | | Sub video decoder (SVDEC) |
| | | | | Sub audio decoder (SADEC) |
| Advanced application (ADAPL) | File cache (FLCCH) (or data cache (DTCCH)) | Markup (MRKUP)/Script (SCRPT)/Image (IMAGE)/Effect audio (EFTAD)/Font (FONT) | | Advanced application presentation engine (AAPEN) |
| Advanced subtitle (ADSBT) | File cache (FLCCH) (or data cache (DTCCH)) | Markup for advanced subtitle (MRKUPS)/Font (FONT)/Image (IMAGE) | | Advanced subtitle player (ASBPL) |

F I G. 7

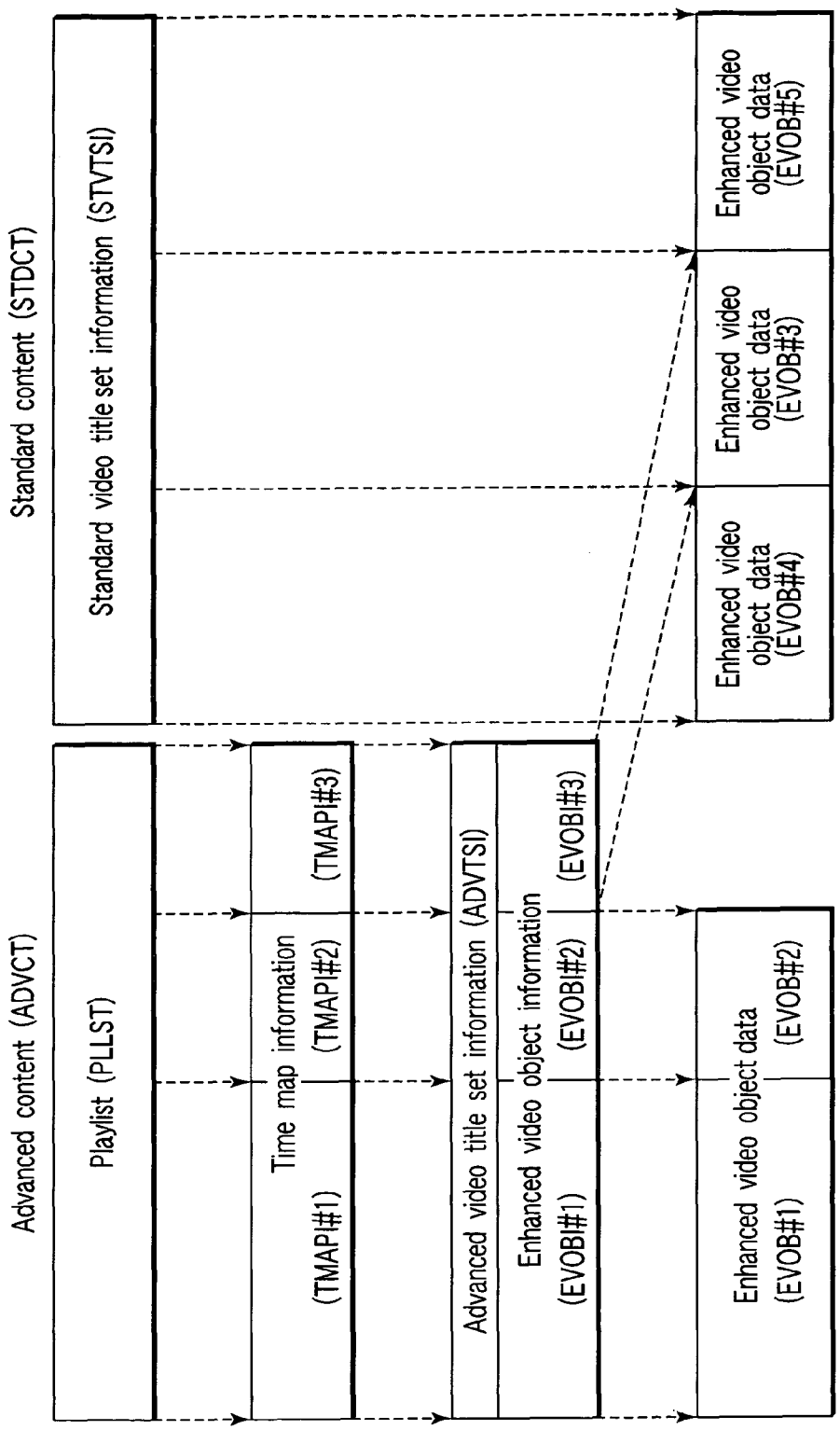
F I G. 9

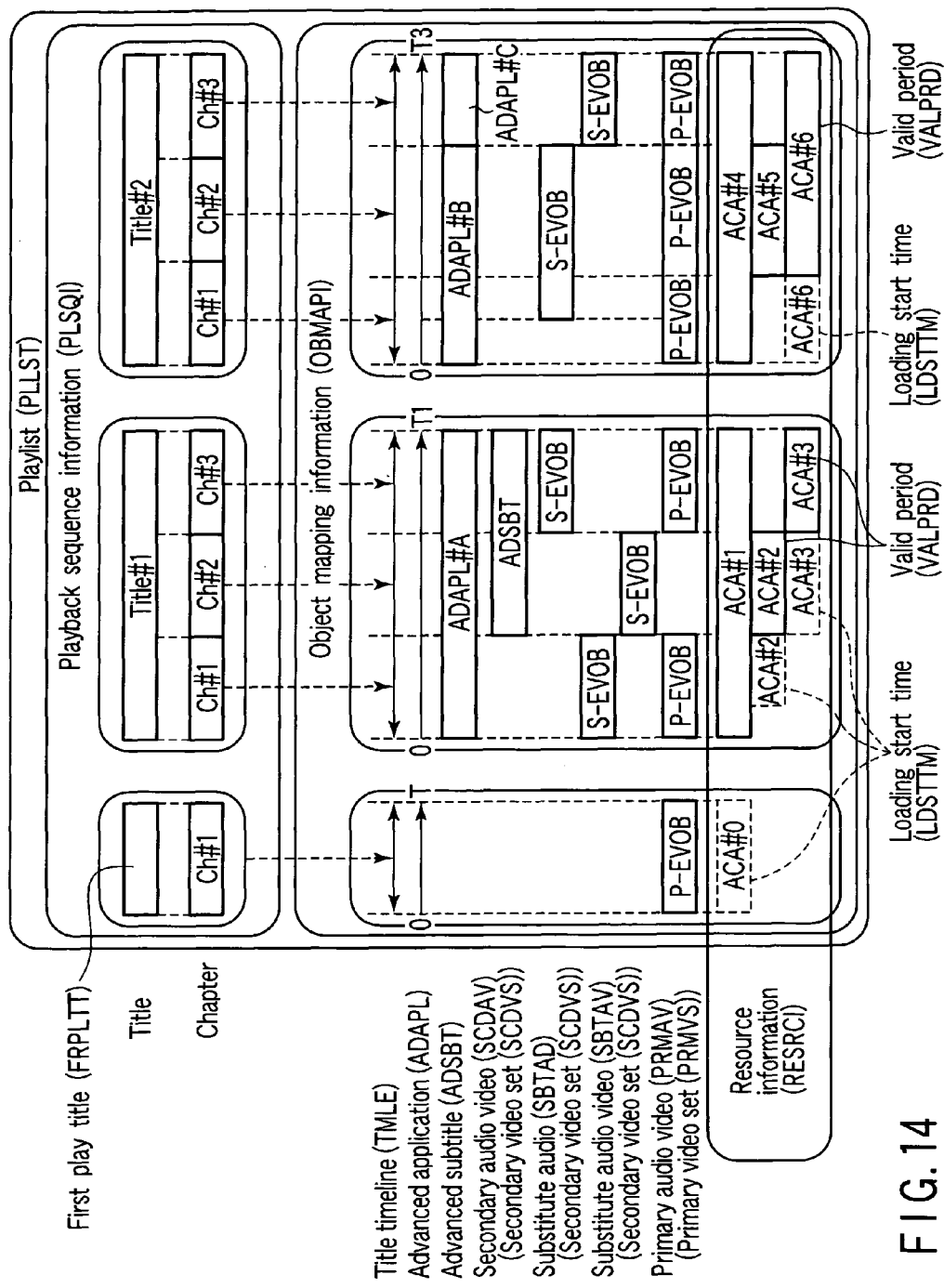
F I G. 14

| URI scheme | Possible resource locations |
|---|---|
| File | Disc (DISC), file cache (FLCCH), persistent storage (PRSTR) (or data cache (DTCCH)) |
| http | HTTP server |
| https | HTTPS server |

FIG. 16

| URI Path | Possible resource locations |
|---|---|
| File:///dvddisc/ | Disc (DISC) |
| File:///filecache/ | API managed area of file cache (FLCCH) (or data cache (DTCCH)) (in contemporary directory in file cache managed by advanced application) |
| File:///required/ | The area of own content provider in required persistent storage (PRSTR) |
| File:///additional/ | The area of own content provider in additional persistent storage(s) (PRSTR) |
| File:///common/required/ | The common area in required persistent storage (PRSTR) |
| File:///common/additional/ | The common area in additional persistent storage(s) (PRSTR) |

FIG. 17

```
<?xml[xml attribute information XMATRI]?>
<playlist[name space definition information PLTGNM of playlist tag][playlist attribute information PLATRI]>

Configuration information CONFGI

Media attribute information MDATRI

Title information TTINFO

</playlist>
```

*1 Configuration information CONFGI is described at first position in playlist element PLLST
⇒Setting of conditions (parameters) in system commonly used by playlist PLLST can be executed initially, and time required until start of playback upon activation can be shortened

*2 Media attribute information MDATRI and title information TTINFO are separately described
⇒Different titles can share identical attribute information, and saving of description text volume and simple processing of parameter setting, etc. in decoder can be attained

*3 Media attribute information MDATRI is described before title information TTINFO
⇒Since processing such as parameter setting, etc. in decoder is executed first, time required until start of playback upon activation can be shortened

F I G. 18

FIG. 19A (a) <?xml[xml attribute information XMATRI]?>
<playlist[name space definition information PLTGNM of playlist tag][playlist attribute information PLATRI]>
  Configuration information CONFGI
  Media attribute information MDATRI
  Title information TTINFO
</playlist>

(b) Title information TTINFO:
<TitleSet[title set attribute information TTSTAT]>
  First play title element information FPTELE
  <Title>
    Title element information TTELEM associated with title #1
  </Title>
  <Title>
    Title element information TTELEM associated with title #2
  </Title>
  <Title>
    Title element information TTELEM associated with title #3
  </Title>
  ...
  Playlist application element information PLAELE
</TitleSet>
(see titles #1 to #3 in FIG. 14)

(c) <Title id = [title ID information TTIDI]
           [title attribute information TTATRI]>
  [Title element information TTELEM] {
    Object mapping information OBMAPI (including track number assignment information)
    Resource information RESRCI
    Playback sequence information PLSQI
    Track navigation information TRNAVI
    Scheduled control information SCHECI
  }
</Title>

* By describing title ID information TTIDI at first position in title element tag in title element information TTELEM,
  1) a plurality of pieces of title element information TTELEM can be described in title information TTINFO (respective pieces of title element information TTELEM are set as playback management information for different titles); and
  2) each title element information TTELEM in title information TTINFO can be immediately identified by interpreting contents of title ID information TTIDI described at first position in title element tag, and content determination processing in playlist PLLST can be speeded up.
* Respective pieces of information which have related description contents in title element information TTELEM are grouped together and are described at near positions. As group names, object mapping information OBMAPI, resource information RESRCI, playback sequence information PLSQI, and track navigation information TRNAVI are assigned. As a result, content interpretation processing of playlist PLLST in playlist manager PLMNG can be simplified and speeded up.

| Clip element name (see FIG. 20) | Object name to be played back and used (see FIG. 7) | File name to be referred to as index upon playing back and using object (see FIG. 15) | Originally recorded location of object (see FIG. 13) |
|---|---|---|---|
| Primary audio video clip PRAVCP | Primary audio video PRMAV | Time map file PTMAP of primary video set | Information storage medium DISC |
| Substitute audio video clip SBAVCP | Substitute audio video SBTAV (secondary video set SCDVS) | Time map file STMAP of secondary video set | Information storage medium DISC Persistent storage PRSTR Network server NTSRV File cache FLCCH |
| Secondary audio video clip SCAVCP | Secondary audio video SCDAV (secondary video set SCDVS) | Time map file STMAP of secondary video set | Information storage medium DISC Persistent storage PRSTR Network server NTSRV File cache FLCCH |
| Substitute audio video clip SBADCP | Substitute audio SBTAD (secondary video set SCDVS) | Time map file STMAP of secondary video set | Information storage medium DISC Persistent storage PRSTR Network server NTSRV File cache FLCCH |
| Advanced subtitle segment ADSTSG | Advanced subtitle ADSBT | Manifest file MNFSTS of advanced subtitle | File cache FLCCH [**] |
| Application segment ADAPSG | Advanced application segment ADAPL | Manifest file MNFST of advanced application | File cache FLCCH [**] |

\* Only playlist PLLST is recorded in information storage medium DISC, and various objects to be played back and used recorded in network server NTSRV or persistent storage PRSTR can be designated from playlist PLLST \*\* In information storage medium DISC or persistent storage PRSTR, source files in network server NTSRV must be temporarily saved in file cache FLCCH

FIG. 21

INFORMATION RECORDING AND REPRODUCING METHOD USING MANAGEMENT INFORMATION INCLUDING MAPPING INFORMATION

CROSS-REFERENCE TO RELATED APPLICATIONS

This application is based upon and claims the benefit of priority from Japanese Patent Application No. 2005-183537, filed Jun. 23, 2005, the entire contents of which are incorporated herein by reference.

BACKGROUND

1. Field

One embodiment of the invention relates to an information playback system using information storage medium such as an optical disc.

2. Description of the Related Art

In recent years, DVD-Video discs having high image quality and advanced functions, and video players which play back these discs have prevailed, and peripheral devices and the like used to play back such multi-channel audio data have broader options. Accordingly, for content users, an environment for personally implementing a home theater that allows the users to freely enjoy movies, animations, and the like with high image quality and high sound quality has become available. For content providers, a variety of video expressions are available. For example, Jpn. Pat. Appln. KOKAI Publication No. 2004-343254 discloses a technique which can set buttons with arbitrary shapes and can form flexible and various menus by setting a graphic unit including highlight information as an independent stream.

For the existing DVD-Video standards, the content providers and content users have the following needs:

1. Realization of flexible and diversified expression formats like a computer window;

2. Realization of flexible responses to various actions via network; and

3. Realization of easy processing of video related information and easy transmission of information after processing.

The prior arts cannot meet such needs.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary diagram showing the arrangement of a system according to an embodiment of the invention;

FIGS. 2A, 2B, and 2C are exemplary tables showing the needs from users and the like for the existing DVD-Video standards and problems posed when the related existing DVD-Video standards are extended, and solutions of the embodiment of the invention and new effects as a result of the solutions of the embodiment of the invention;

FIG. 4 shows an exemplary presentation window at point α when a main title, another window for a commercial, and a help icon are simultaneously presented in (c) of FIG. 3B;

FIGS. 6A, 6B, and 6C are exemplary views showing the data structure of an advanced content and explanations of effects and the like;

FIG. 7 is an exemplary view for explaining the relationship among various objects;

FIG. 9 is an exemplary view showing different access methods to two different types of contents;

FIG. 14 is an exemplary view showing an overview of information in a playlist;

FIG. 16 is an exemplary view showing a method of designating a file storage location;

FIG. 17 is an exemplary view showing a path designation description method to a file;

FIG. 18 is an exemplary view showing the data structure in a playlist file;

FIGS. 19A and 19B are exemplary views showing details of title information in a playlist;

FIG. 21 is an exemplary view showing the relationship between various presentation clip elements and corresponding object names of objects to be presented and used.

DETAILED DESCRIPTION

Figure 3A:
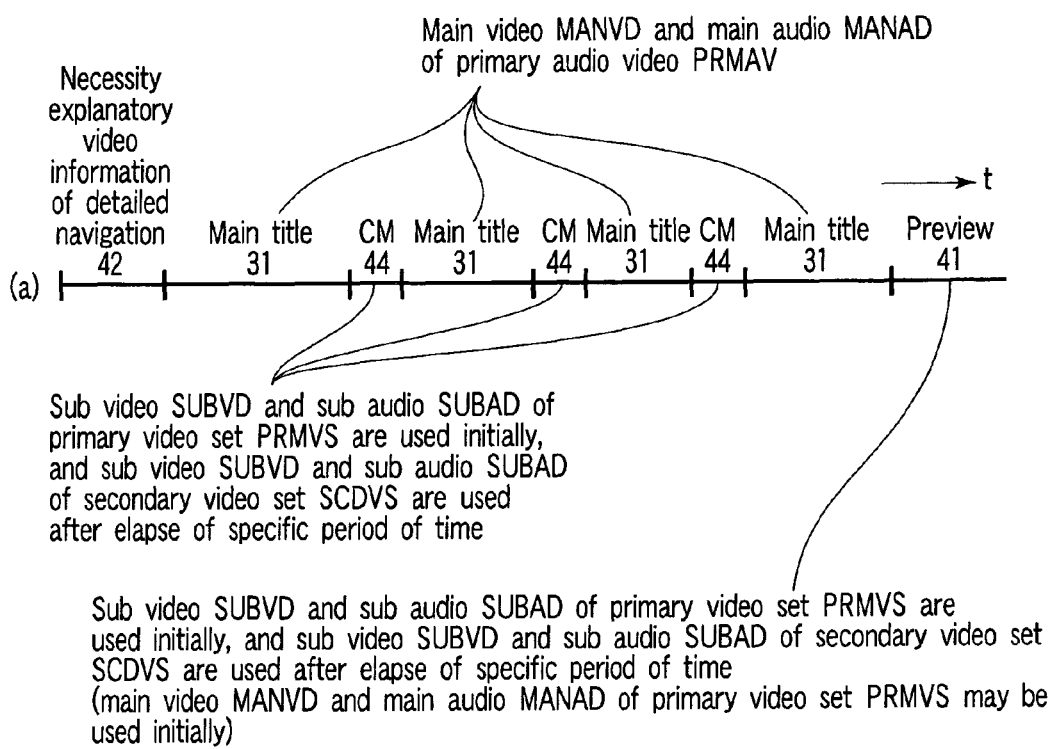
FIGS. 3A and 3B are exemplary views showing examples of video content playback methods by an information recording and playback apparatus.

Various embodiments according to the invention will be described hereinafter with reference to the accompanying drawings. In general, according to one embodiment of the invention, there is provided an information playback method, comprising reading out management information (PLLST) used to manage one or more video titles from an information storage medium, the medium storing an advanced content including the management information (PLLST) in which a title timeline (TMLE) indicating playback timings of objects of each video title being individually defined, and playing back objects of each video title in accordance with the title timeline (TMLE) defined in the readout management information (PLLST).

<System Arrangement>

FIG. 1 is a diagram showing the arrangement of a system according to an embodiment of the invention.

This system comprises an information recording and playback apparatus (or an information playback apparatus) 1 which is implemented as a personal computer (PC), a recorder, or a player, and an information storage medium DISC implemented as an optical disc which is detachable from the information recording and playback apparatus 1. The system also comprises a display 13 which displays information stored in the information storage medium DISC, information stored in a persistent storage PRSTR, information obtained from a network server NTSRV via a router 11, and the like. The system further comprises a keyboard 14 used to make input operations to the information recording and playback apparatus 1, and the network server NTSRV which supplies information via the network. The system further comprises the router 11 which transmits information provided from the network server NTSRV via an optical cable 12 to the information recording and playback apparatus 1 in the form of wireless data 17. The system further comprises a wide-screen TV monitor 15 which displays image information transmitted from the information recording and playback apparatus 1 as wireless data, and loudspeakers 16-1 and 16-2 which output audio information transmitted from the information recording and playback apparatus 1 as wireless data.

The information recording and playback apparatus 1 comprises an information recording and playback unit 2 which records and plays back information on and from the information storage medium DISC, and a persistent storage drive 3 which drives the persistent storage PRSTR that includes a fixed storage (flash memory or the like), removable storage (secure digital (SD) card, universal serial bus (USB) memory, portable hard disk drive (HDD), and the like). The apparatus 1 also comprises a recording and playback processor 4 which records and plays back information on and from a hard disk device 6, and a main central processing unit (CPU) 5 which controls the overall information recording and playback apparatus 1. The apparatus 1 further comprises the hard disk device 6 having a hard disk for storing information, a wireless local area network (LAN) controller 7-1 which makes wireless communications based on a wireless LAN, a standard content playback unit STDPL which plays back a standard content STDCT (to be described later), and an advanced content playback unit ADVPL which plays back an advanced content ADVCT (to be described later).

The router 11 comprises a wireless LAN controller 7-2 which makes wireless communications with the information recording and playback apparatus 1 based on the wireless LAN, a network controller 8 which controls optical communications with the network server NTSRV, and a data manager 9 which controls data transfer processing.

The wide-screen TV monitor 15 comprises a wireless LAN controller 7-3 which makes wireless communications with the information recording and playback apparatus 1 based on the wireless LAN, a video processor 24 which generates video information based on information received by the wireless LAN controller 7-3, and a video display unit 21 which displays the video information generated by the video processor 24 on the wide-screen TV monitor 15.

Note that the detailed functions and operations of the system shown in FIG. 1 will be described later.

<Solutions and Effects>

Needs from the users and the like for the existing DVD-Video standards and problems posed when the related existing DVD-Video standards are extended, and solutions in the embodiment of the invention and new effects as a result of such solutions will be described below with reference to FIGS. 2A, 2B, and 2C. As described above, there are the following three needs from the content providers and content users for the existing DVD-Video standards:

1. Realization of flexible and diversified expression formats like computer window;

2. Realization of flexible responses to various actions via network; and

3. Realization of easy processing of video related information and easy transmission of information after processing.

When 1, "Realization of flexible and diversified expression formats like computer window," above, is to be made by only a minor change of the existing DVD-Video standards, since user requests are of too greater variety, the following problem is posed. That is, such need cannot be met by only a custom-made like minor change of the data structure in the existing DVD-Video standards. As technical device contents to solve this problem, this embodiment adopts expression formats in the PC world having versatility, and newly introduces the concept of timeline. As a result, according to this embodiment, the following new effects can be obtained.

1] Make flexible and impressive reactions in response to user's actions:

1.1) Make response by means of change in animation and image at the time of button selection or execution instruction;

1.2) Make voice response at the time of button selection or execution instruction;

1.3) Start execution operation at purposely delayed timing in response to user's execution instruction;

1.4) Give voice answer to help (like PC); and 1.5) Audibly and visually output how to use guide of menu, etc.

2] Allow flexible switching processing for video information itself and its playback method:

2.1) Switching presentation of audio information;

2.2) Switching presentation of subtitle information (telop, subtitle, still picture icon, etc.);

2.3) Allow enlarged-scale presentation of subtitle according to user's favor;

2.4) Allow user to mark subtitle and to issue subtitle execution command; and 2.5) Mark specific video part in synchronism with comment while movie director is making that comment.

3] Simultaneously present independent information to be superimposed on video information during playback:

3.1) Simultaneously present a plurality of pieces of video information by means of multi-windows;

3.2) Allow to freely switch window size of each of multi-windows;

3.3) Simultaneously present prior audio message and after-recorded audio message by user;

3.4) Simultaneously present scrolling text to be superimposed on video information; and 3.5) Simultaneously present graphic menus and figures (of select buttons, etc.) in flexible forms.

4] Allow easy search to video location to be seen:

4.1) Conduct keyword (text) search of location to be seen using pull-down menu.

As for 2, "Realization of flexible responses to various actions via network," above, a disjunction between the data structure specified by the existing DVD-Video standards and a network compatible window is too large. As technical device contents to solve this problem, this embodiment adopts a homepage presentation format (XML and scripts) of a Web which has a good track record in window expression of a network as a basic part of the data management structure, and adjusts a video playback management format to it. As a result, according to the embodiment of the invention, the following new effects can be obtained.

5] Provide update function of information on disc using network:

5.1) Automatic updating of object information and intra-disc management information;

5.2) Network downloading of how to use guide of menus;

5.3) Notification of automatic updating of information to user;

5.4) Notification of OK/NG of update information presentation to user; and 5.5) Manual update function by user.

6] Real-time online processing:

6.1) Switching or mixing processing to audio information downloaded via network upon video playback (commentary presentation by means of voice of movie director);

6.2) Network shopping; and 6.3) Interactive real-time video change.

7] Real-time information sharing with another user via network:

7.1) Simultaneously present specific window even for another user at remote place;

7.2) Play battle game or interactive game with another user at remote place;

7.3) Participate in chatting during video playback; and 7.4) Transmit or receive message to or from fan club simultaneously with video playback.

When 3, "Realization of easy processing of video related information and easy transmission of information after processing," above, is to be implemented by a minor change of the existing DVD-Video standards, complicated edit processing cannot be flexibly and easily coped with. In order to flexibly and easily cope with the complicated edit processing, a new management data structure is needed. As technical device contents to solve this problem, this embodiment adopts XML and the concept of timeline to be described later. As a result, according to the embodiment of the invention, the following new effects can be obtained.

8] Allow user to select and generate playlist and to transmit it:

8.1) Allow user to select or generate playlist;

8.2) Allow user to transmit playlist selected or generated by him or her to friend;

8.3) Allow to play back playlist selected or generated by user only on specific disc;

8.4) Allow user to also select collection of highlight scenes of video information;

8.5) Publish scrapbook that captures favorite frames in video information on Web; and 8.6) Store and play back angles or scenes in multi-angles or multi-scenes selected by user.

9] Allow user to append specific information related with video information and to transmit result via network:

9.1) Allow user to add comment about video information, and to share it with another user on network;

9.2) Paste input image to character's face in video information;

9.3) Paste user information or experience information upon seeing video information onto image information; and 9.4) Use user information in parental lock to impose automatic limitation on video information to be presented.

10] Automatically save playback log information:

10.1) Provide automatic saving function of resume (playback pause) information;

10.2) Automatically save halfway information of game progress until previous time; and 10.3) Automatically save previous playback environment (battle game environment with a plurality of users, etc.).

In order to meet the three needs shown in FIGS. 2A, 2B, and 2C, this embodiment innovates the XML and scripts and the concept of timeline in correspondence with the expression format in the PC world. However, by merely adopting such data structure, compatibility with the existing DVD-Video standards is lost. In order to meet the requirements of the users and the like described using FIGS. 2A, 2B, and 2C, network connection is needed, and it becomes difficult to provide a very inexpensive information playback apparatus to the user. Hence, this embodiment adopts an arrangement which can use the advanced content ADVCT which meets the requirements of the users and the like described using FIGS. 2A, 2B, and 2C, and the standard content STDCT which cannot meet the requirements of the users and the like described using FIGS. 2A, 2B, and 2C but can be played back by a very inexpensive information playback apparatus (without any precondition of Internet connection) while assuring the compatibility to the existing DVD-Video standards. This point is a large technical feature in this embodiment.

Note that the data structure of the standard content STDCT and that of the advanced content ADVCT will be described in detail later.

<Example of Content Playback Method>

Figure 3B:
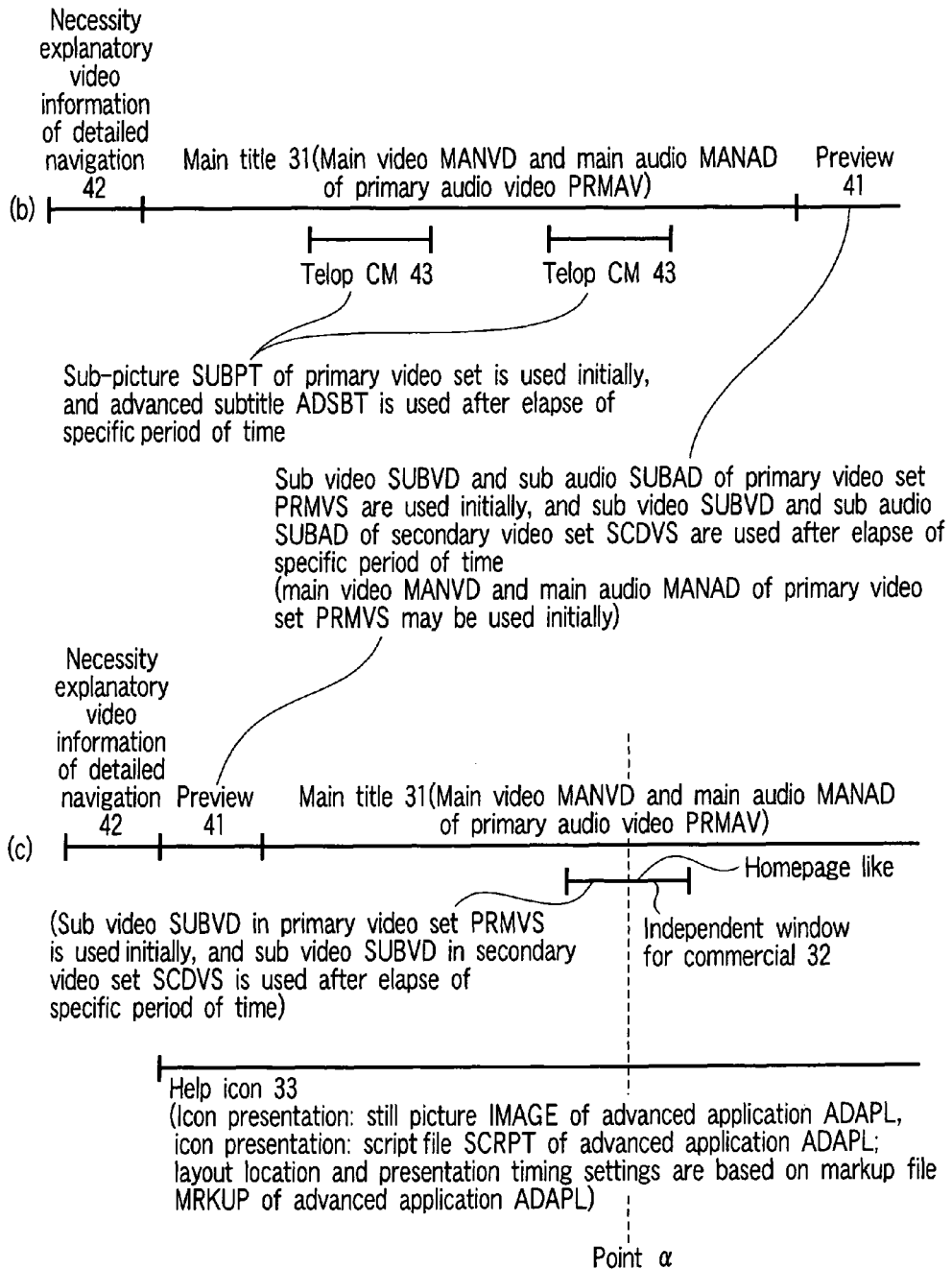

FIGS. 3A and 3B show examples of video content playback methods by the information recording and playback apparatus 1.

An example of a case is shown in (a) of

FIG. 3A wherein a main title 31 is presented like a television broadcast video information after video information 42 used to give an explanation of detailed navigation, commercial 44 for a product, service, or the like is presented to be inserted into the main title 31, a preview 41 of a movie is presented after completion of presentation of the main title 31.

An example of a case is shown in (b) of

FIG. 3B wherein a main title 31 is presented like a television broadcast video information after video information 42 used to give an explanation of detailed navigation, a commercial 43 in the form of a telop is presented to be superimposed on presentation of the main title 31, and a preview 41 of a movie is presented after completion of presentation of the main title 31.

An example of a case is shown in (c) of

FIG. 3B wherein a preview 41 of a movie is presented after video information 42 used to give an explanation of detailed navigation, a main title 31 is then presented, an independent window 32 for a commercial is presented on a presentation area different from the main title 31 during presentation of the main title 31, and a help icon 33 is presented on a presentation area different from the main title 31 during presentation of the preview 41 and main title 31.

Note that what kind of information is used to present the main title, commercial, preview, telop commercial, and the like will be described in detail later.

<Example of Presentation Window>

FIG. 4 shows an example of a presentation window at point α when the main title 31, the independent window 32 for a commercial, and the help icon 33 are simultaneously presented in (c) of FIG. 3B.

In the example of this presentation window, the main title 31 is presented as a moving picture of a main picture on the upper left area, the independent window 32 for a commercial is presented as a moving picture of a sub-picture on the upper right area, and the help icon 33 is presented as a still picture (graphic) on the lower area. Also, a stop button 34, play button 35, FR (fast-rewinding) button 36, pause button 37, FF (fast-forwarding) button 38, and the like are also presented as still pictures (graphics). In addition, a cursor (not shown) or the like is presented.

Note that what kind of information is used to present each individual moving picture or still picture on the presentation window will be described in detail later.

<Content Type>

This embodiment defines 2 types of contents; one is Standard Content and the other is Advanced Content. Standard Content consists of Navigation data and Video object data on a disc. On the other hand, Advanced Content consists of Advanced Navigation such as Playlist, Manifest, Markup and Script files and Advanced Data such as Primary/Secondary Video Set and Advanced Element (image, audio, text and so on). At least one Playlist file and Primary Video Set shall be located on a disc which has Advanced Content, and other data can be on a disc and also be delivered from a server.

More intelligible explanations will be provided below.

This embodiment defines two different types of contents, i.e., the standard content STDCT and the advanced content ADVCT. This point is a large technical feature in this embodiment.

The standard content STDCT of this embodiment includes enhanced video object EVOB which records video information itself and navigation data IFO which records management information of that enhanced video object. The standard content STDCT has a data structure obtained by purely extending the existing DVD-Video data structure.

By contrast, the advanced content ADVCT has a data structure which records various kinds of information to be described later.

Figure 5:
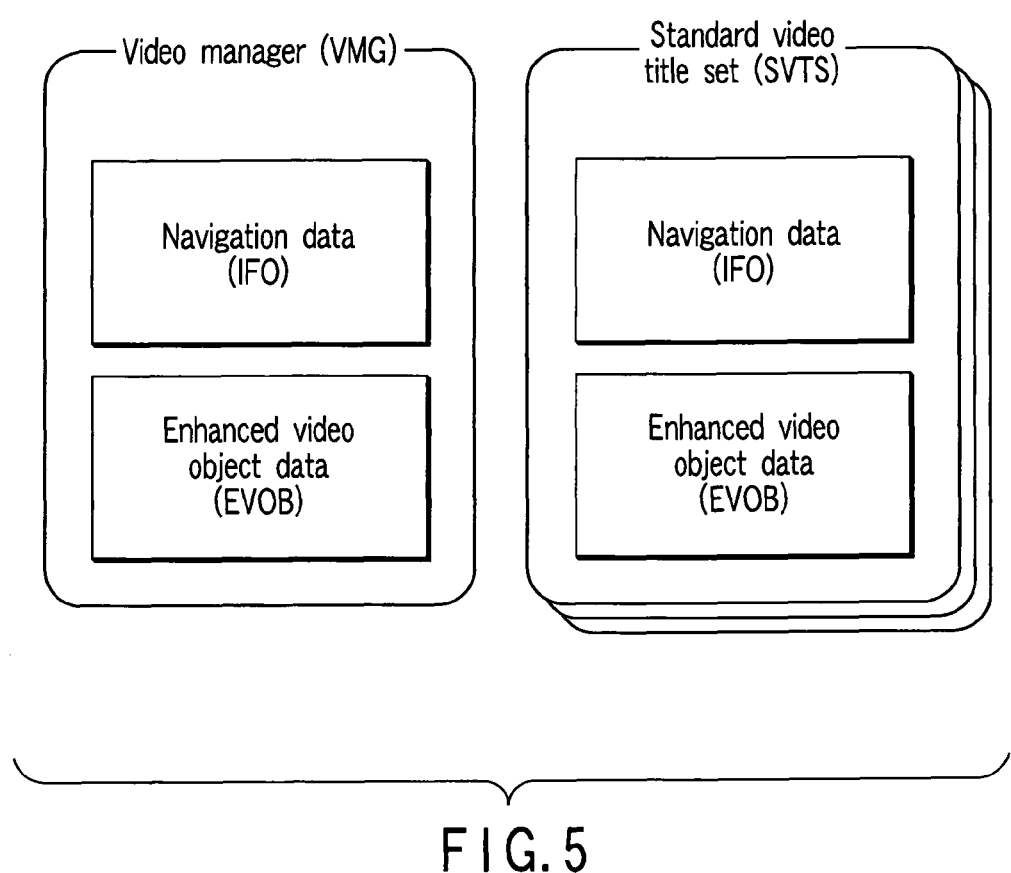
FIG. 5 shows an exemplary data structure of a standard content.

FIG. 5 shows the data structure of the standard content STDCT, and FIGS. 6A, 6B, and 6C shows the data structure of an advanced content and explanations of effects and the like. FIG. 7 shows the relationship among various objects in this embodiment. These figures will be referred to as needed in the following description.

<Standard Content>

Standard Content is just extension of content defined in DVD-Video specification especially for high-resolution video, high-quality audio and some new functions. Standard Content basically consists of one VMG space and one or more VTS spaces (which are called as "Standard VTS" or just "VTS"), as shown in FIG. 5. In comparison to the existing DVD-Video specification, this embodiment gives new functionalities. For instance, Extension of Video stream such as codec/resolution
Extension of Audio stream such as codec/frequency/channel number
Extension of Sub-picture stream/Highlight Information stream
Extension of Navigation Command
Elimination of some restrictions for FP_DOM/VMGM_DOM/VTSM_DOM
Elimination of some restrictions for transition among domains
Introduction of Resume Sequence, and so on More intelligible explanations will be provided below.

The data structure of the standard content STDCT will be described below using FIG. 5.

The standard content STDCT includes a video manager VMG that represents a menu frame, and a standard video title set SVTS that records video data.

The video manager VMG that records the menu frame includes enhanced video object EVOB that records video information itself, and navigation data IFO that records management data of that EVOB. The standard video title set SVTS includes enhanced video object EVOB that records video information itself and navigation data IFO that records management data of that EVOB.

The standard content STDCT represents an extended structure of the content specified by the conventional DVD-Video. Especially, new functionalities that improve the resolution of video data and the sound quality of audio data compared to the conventional DVD-Video are added. As shown in FIG. 5, the standard content STDCT consists of one video manager VMG space, and one or more video title set VTS spaces, which is called the standard video title set SVTS or VTS.

In comparison to the existing DVD-Video specification, this embodiment gives the following new functionalities.

A new compression method which assures a high resolution for video information and a high compression efficiency is adopted.

The number of channels of audio information is increased, and a higher sampling frequency is supported. An audio information compression method that assures high sound quality and a high compression efficiency is adopted.

Sub-picture information are extended, and a new stream for highlight information is defined.

Navigation command is extended.

Some restrictions which are conventionally included in a first play domain that executes processing upon activation, a video manager domain that manages a menu image, and a video title set domain that executes processing upon playback of video information are eliminated, thus allowing more flexible expression.

Some restrictions for transition among domains are eliminated, thus defining a more flexible expression environment.

A new resume sequence function that represents processing upon pausing playback is added, and user's convenience after pausing is improved.

<Standard VTS>

Standard VTS is basically used in Standard Content, however this VTS may be utilized in Advanced Content via time map TMAP. The EVOB may contain some specific information for Standard Content, and such information as highlight information HLI and presentation control information PCI shall be ignored in Advanced Content.

More intelligible explanations will be provided below.

The standard video title set SVTS in this embodiment is basically used on the standard content STDCT described above. However, this standard video title set SVTS may be utilized in the advanced content ADVCT via a time map TMAP (to be described later).

The enhanced video object EVOB as object data used in the standard video title set SVTS may contain some pieces of specific information for the standard content STDCT. Some pieces of specific information contain, e.g., highlight information HLI and presentation control information PCI which are used in the standard content STDCT, but shall be ignored in the advanced content ADVCT in this embodiment.

<HDDVD_TS Directory>

"HVDVD_TS" directory shall exist directly under the root directory. All files related with Primary Video Set (i.e. a VMG, Standard Video Set(s) and an Advanced VTS) shall reside under this directory.

More intelligible explanations will be provided below.

The directory structure upon recording the standard content STDCT shown in FIG. 5 in the information storage medium DISC will be described below. In this embodiment, the standard content STDCT and the advanced content ADVCT (to be described later) are recorded in the HDDVD_TS directory together. The HDDVD_TS directory exists directly under the root directory of the information storage medium DISC. For example, all files related with a primary video set PRMVS (to be described later) such as the video manager VMG, standard video title set SVTS, and the like shall reside under this directory.

<Video Manager (VMG)>

A Video Manager Information (VMGI), an Enhanced Video Object for First Play Program Chain Menu (FP_PGCM_EVOB), a Video Manager Information for backup (VMGI_BUP) shall be recorded respectively as a component file under the HVDVD_TS directory. An Enhanced Video Object Set for Video Manager Menu (VMGM_EVOBS) which should be divided into up to 98 files under the HVDVD_TS directory. For these files of a VMGM_EVOBS, every file shall be allocated contiguously.

More intelligible explanations will be provided below.

Components of the video manager VMG shown in FIG. 5 will be described below. The video manager VMG basically include menu frame information and control information of the conventional DVD-Video. Under the aforementioned HDDVD_TS directory, video manager information VMGI, enhanced video object EVOB related with a menu FP_PGCM_EVOB which is to be presented first immediately after insertion of the information storage medium DISC, video manager information VMGI_BUP as backup data of the navigation data IFO of the video manager VMG, and the like are separately recorded as component files.

Under the HDDVD_TS directory, an enhanced video object set VMGM_EVOBS related with a video manager menu has a size of 1 GB or more, and these data shall be recorded while being divided into up to 98.

In a read-only information storage medium in this embodiment, all the files of the enhanced video object set VMGM_EVOBS of the video manager menu shall be allocated contiguously for the sake of convenience upon playback. In this manner, since the information of the enhanced video object set VMGM_EVOBS related with the video manager menu is recorded at one location together, data access convenience, data collection convenience, and high presentation speed can be assured.

<Standard Video Title Set (Standard VTS)>

A Video Title Set Information (VTSI) and a Video Title Set Information for backup (VTSI_BUP) shall be recorded respectively as a component file under the HVDVD_TS directory. An Enhanced Video Object Set for Video Title Set Menu (VTSM_EVOBS), and an Enhanced Video Object Set for Titles (VTSTT_EVOBS) may be divided into up to 99 files. These files shall be component files under the HVDVD_TS directory. For these files of a VTSM_EVOBS, and a VTSTT_EVOBS, every file shall be allocated contiguously.

More intelligible explanations will be provided below.

In this embodiment, video title set information VTSI and backup data VTSI_BUP of the video title set information shall be recorded respectively as a component file under the HDDVD_TS directory. The sizes of an enhanced video object set VTSM_EVOBS of a video title set menu and an enhanced video object set VTSTT_EVOBS of each title are allowed to exceed 1 GB. However, their data should be recorded while being divided into up to 99 files. As a result, each file size can be set to be 1 GB or less. These files shall be independent component files under the HDDVD_TS directory. Every file of the enhanced video object set VTSM_EVOBS of the video title set menu and the enhanced video object set VTSTT_EVOBS of each title shall be allocated contiguously, respectively. As a result, since data are recorded at one location, the data access convenience, speeding up, and easy data processing management can be attained, and these pieces of information for the user can be presented at high speed.

<Structure of Standard Video Title Set (VTS)>

A VTS is a collection of Tides. Each VTS is composed of control data referred to as Video Title Set Information (VTSI), Enhanced Video Object Set for the VTS Menu (VTSM_VOBS), Enhanced Video Object Set for Titles in a VTS (VTSTT_EVOBS) and backup control data (VTSI_P).

The following rules shall apply to Video Title Set (VTS):

1) Each of the control data (VTSI) and the backup of control data (VTSI_BUP) shall be a single File.

2) Each of the EVOBS for the VTS Menu (VTSM_EVOBS) and the EVOBS for Titles in a VTS (VTSTT_EVOBS) may be divided into Files, up to maximum of 99 respectively.

3) VTSI, VTSM_EVOBS (if present), VTSTT_EVOBS and VTSI_BUP shall be allocated in this order.

4) VTSI and VTSI_BUP shall not be recorded in the same ECC block.

5) Files comprising VTSM_EVOBS shall be allocated contiguously. Also files comprising VTSTT_EVOBS shall be allocated contiguously.

6) The contents of VTSI_BUP shall be exactly the same as VTSI completely. Therefore, when relative address information in VTSI_BUP refers to outside of VTSI_BUP, the relative address shall be taken as a relative address of VTSI.

7) VTS numbers are the consecutive numbers assigned to VTS in the Volume. VTS numbers range from '1' to '511' and are assigned in the order the VTS are stored on the disc (from the smallest LBN at the beginning of VTSI of each VTS).

8) In each VTS, a gap may exist in the boundaries among VTSI, VTSM_EVOBS (if present), VTSTT_EVOBS and VTSI_BUP.

9) In each VTSM_EVOBS (if present), each EVOB shall be allocated in contiguously.

10) In each VTSTT_EVOBS, each EVOB shall be allocated in contiguously.

11) VTSI and VTSI_BUP shall be recorded respectively in a logically contiguous area which is composed of consecutive LSNs.

More intelligible explanations will be provided below.

The video title set VTS is a collection of a set of video titles. This video title set includes video title set information VTSI as control information related with the video title set, an enhanced video object set VTSM_EVOBS of a video title set menu, an enhanced video object set (video information itself) VTSTT_EVOBS of each title, and backup data VTSI_BUP of the video title set information.

In this embodiment, the following rules shall apply to the video title set VTS.

1) Each of the video title set information VTSI that records control information, and the backup data VTSI_BUP of the video title set information shall be recorded in a single file of 1 GB or less.

2) The enhanced video object set VTSM_EVOBS of the video title set menu and the enhanced video object set (video information itself) VTSTT_EVOBS of each title shall be recorded while being divided into files, up to maximum of 99 respectively, per information storage medium DISC, each having a size of 1 GB or less.

3) The video title set information VTSI, the enhanced video object set VTSM_EVOBS of the video title set menu, the enhanced video object set (video information itself) VTSTT_EVOBS of each title, and the backup data VTSI_BUP of the video title set information shall be allocated in this order.

4) The video title set information VTSI and the backup data VTSI_BUP of the video title set information shall not be recorded in one ECC block together. That is, the video title set information VTSI and the backup data VTSI_BUP of the video title set information are recorded contiguously, but the boundary position of them is inhibited from being allocated at the center of a single ECC block. That is, when the boundary portion of these data is allocated in the single ECC block, if that ECC block cannot be played back due to any defect, both pieces of information cannot be played back. Therefore, padding information is recorded in the residual area in the ECC block at the end position of the video title set information VTSI to allocate the head of the next backup data VTSI_BUP of the video title set information at the head position of the next ECC block, thus avoiding both the data from being recorded in the single ECC block. This point is a large technical feature in this embodiment. With this structure, not only the reliability of data playback can be greatly improved, but also the playback processing upon data playback can be facilitated.

5) A plurality of files comprising the enhanced video object set VTSM_EVOBS of the video title set menu shall be recorded contiguously on the information storage medium DISC. Also, a plurality of files comprising the enhanced video object set (video information itself) VTSTT_EVOBS of each title shall be recorded contiguously. Since the files are allocated contiguously, respective pieces of information can be played back at a time by a single continuous playback operation of an optical head upon playback (the need for jumping processing of the optical head is obviated). In this way, easy processing of various kinds of information upon data playback can be assured, and the time from when data playback until presentation can be shortened.

6) The contents of the backup data VTSI_BUP of the video title set information shall be exactly the same as the video title set information VTSI completely. Therefore, if the video title set information VTSI as management information cannot be played back due to an error, video information can be stably played back by playing back the backup data VTSI_BUP of the video title set information.

7) The video title set VTS numbers are the consecutive numbers assigned to the video title sets VTS recorded in a volume space. The numbers of respective video title sets VTS ranges numbers 1 to 511 and are assigned in ascending order of logical block number LBN as the address inn the logical space indicating the allocation position of the video title set VTS recorded on the information storage medium DISC.

8) In each video title set VTS, gap may exist in boundary areas between neighboring ones of the video title set information VTSI, the enhanced video object set VTSM_EVOBS of the video title set menu, the enhanced video object set (video information itself) VTSTT_EVOBS of each title in the video title set VTS, and the backup data VTSI_BUP of the video title set information. More specifically, the aforementioned four types of information are allocated in different ECC blocks, thus assuring high reliability and easy playback processing of data upon playback, and speeding up of processing. For this reason, this embodiment is designed as follows. That is, when the recording position of the last data of each information ends at the middle of one ECC block, padding information is recorded in the residual area, so that the head position of the next information matches that of the next ECC block. The part of the padding information in the ECC block will be referred to as a gap in this embodiment.

9) In the enhanced video object set VTSM_EVOBS of each video title set menu, enhanced video object EVOB shall be allocated in contiguously on the information storage medium DISC. Thus, the convenience of playback processing can be improved.

10) In the enhanced video object set (video information itself) VTSTT_EVOBS of each title in the video title set VTS, respective enhanced video objects shall be allocated in contiguously on the information storage medium DISC. In this manner, the convenience of information playback can be assured, and the time required until playback can be shortened.

11) The video title set information VTSI and the backup data VTSI_BUP of the video title set information shall be recorded respectively in a logically contiguous areas defined by serial logical block numbers LSN which represent the address positions on the information storage medium DISC. In this way, the information can be read by single continuous playback (without any jumping processing), thus assuring the convenience of playback processing and speeding up of processing.

<Structure of Video Manager (VMG)>

The VMG is the table of contents for Standard Video Title Sets which exist in the "HD DVD-Video zone". A VMG is composed of control data referred to as Video Manager Information (VMGI), Enhanced Video Object for First Play PGC Menu (FP_PGCM_EVOB), Enhanced Video Object Set for VMG Menu (VMGM_EVOBS) and a backup of the control data (VMGI_BUP). The control data is static information necessary to playback titles and providing information to support User Operation. The FP_PGCM_EVOB is an Enhanced Video Object (EVOB) used for the selection of menu language. The VMGM_EVOBS is a collection of Enhanced Video Objects (EVOBs) used for Menus that support the volume access.

The following rules shall apply to Video Manager (VMG):

1) Each of the control data (VMGI) and the backup of control data (VMGI_BUP) shall be a single File.

2) EVOB for FP PGC Menu (FP_PGCM_EVOB) shall be a single File. EVOBS for VMG Menu (VMGM_EVOBS) may be divided into Files, up to maximum of 98.

3) VMGI, FP PGCM_EVOB (if present), VMGM_EVOBS (if present) and VMGI_BUP shall be allocated in this order.

4) VMGI and VMGI_BUP shall not be recorded in the same ECC block.

5) Files comprising VMGM_EVOBS shall be allocated contiguously.

6) The contents of VMGI_BUP shall be exactly the same as VMGI completely. Therefore, when relative address information in VMGI_BUP refers to outside of VMGI_BUP, the relative address shall be taken as a relative address of VMGI.

7) A gap may exist in the boundaries among VMGI, FP_PGCM EVOB (if present), VMGM_EVOBS (if present) and VMGI_BUP.

8) In VMGM_EVOBS (if present), each EVOB shall be allocated contiguously.

9) VMGI and VMGI_BUP shall be recorded respectively in a logically contiguous area which is composed of consecutive LSNs.

More intelligible explanations will be provided below.

The video manager VMG is the table of contents for the standard video title set SVTS, and is recorded in an HDDVD-Video zone to be described later. Constituent elements of the video manager VMG are control information as video manager information VMGI, a menu FP_PGCM_EVOB which is to be presented first immediately after insertion of the information storage medium DISC, an enhanced video object set VMGM_EVOBS of a video manager menu, and backup data VMGI_BUP of control information as the video manager information VMGI. The control information as the video manager information VMGI records information required to play back each title, and information used to support user's operations. The menu FP_PGCM_EVOB which is to be presented first immediately after insertion of the information storage medium DISC is used to select a language presented in the menu. That is, the user himself or herself selects an optimal menu language immediately after insertion of the information storage medium DISC, thus presenting various menu frames using the best understandable language. The enhanced video object set VMGM_EVOBS related with the video manager menu is a collection of the enhanced video objects EVOBs used for in menus that support volume access. That is, information of a menu frame (a frame provided as independent information for each individual language) presented in the language selected by the user is recorded as the enhanced video object set.

In this embodiment, the following rules shall apply to the video manager VMG.

1) Each of the video manager information VMGI and the backup file VMGI_BUP of the video manager information shall be recorded in the information storage medium DISC to have each file size of 1 GB or less.

2) The enhanced video object EVOB of the menu FP_PGCM_EVOB which is to be presented first immediately after insertion of the information storage medium DISC shall be divisionally recorded in the information storage medium DISC to have each file size of 1 GB or less. The enhanced video object set VMGM_EVOBS of the video manager menu is divisionally recorded to have each file size of 1 GB or less, and the number of files of the enhanced video object set VMGM_EVOBS of the video manager menu recorded per information storage medium DISC is set to be 98 or fewer. Since the data size of one file is set to 1 GB or less, a buffer memory can be easily managed, and data accessibility is improved.

3) The video manager information VMGI, the menu FP_PGCM_EVOB which is to be presented first immediately after insertion of the information storage medium DISC, the enhanced video object set VMGM_EVOBS of the video manager menu, and the backup file VMGI_BUP of the video manager information shall be allocated in this order on the information storage medium DISC.

4) The video manager information VMGI and the backup file VMGI_BUP of the video manager information shall not be recorded in a single ECC block.

Since the video manager information VMGI, the menu FP_PGCM_EVOB which is to be presented first immediately after insertion of the information storage medium DISC, and the enhanced video object set VMGM_EVOBS of the video manager menu are optional, they are not often recorded on the information storage medium DISC. In such case, the video manager information VMGI and the backup file VMGI_BUP of the video manager information may be contiguously allocated in turn. This means that the boundary position of the video manager information VMGI and the backup file VMGI_BUP of the video manager information is not allocated at the center of one ECC block. Basically, information is played back from the information storage medium for each ECC block. For this reason, if the boundary position of both pieces of information is recorded in the single ECC block, not only the convenience of data processing of playback information is impaired, but also if an error occurs in the ECC block which stores the boundary portion to disable playback, both the video manager information VMGI and the backup file VMGI_BUP of the video manager information cannot often be played back. Therefore, when the boundary portion of both the pieces of information is allocated at that of ECC blocks, the superiority of processing upon playback is assured. Even when one of these ECC blocks includes many errors and cannot be played back, information can be restored and played back using the residual data. Therefore, by setting the boundary of both the pieces of information to that between neighboring ECC blocks, the data playback reliability of the video manager information VMGI can be improved.

5) Files comprising the enhanced video object set VMGM_EVOBS of the video manager menu that represents menu information shall be allocated contiguously. As described above, the data size of the enhanced video object set VMGM_EVOBS of the video manager menu is allowed to exceed 1 GB. In this embodiment, it is specified to divisionally record the data of the enhanced video object set VMGM_EVOBS of the video manager menu in a plurality of files to have each file size of 1 GB or less. The divided files are required to be recorded contiguously on the information storage medium DISC. In this way, all enhanced video object sets of the video manager menu can be fetched by single continuous playback, thus assuring high reliability of playback control and speeding up of presentation processing for the user.

6) The contents of the backup file VMGI_BUP of the video manager information shall be exactly the same of the video manager information VMGI completely.

7) A gap may exist in the boundary positions between neighboring ones of video manager information VMGI, the menu FP_PGCM_EVOB which is to be presented first immediately after insertion of the information storage medium DISC, the enhanced video object set VMGM_EVOBS of the video manager menu, and the backup file VMGI_BUP of the video manager information. As described in 4), when information of each data is recorded together for each ECC block, the position of the last data may have a difference from the boundary position of ECC blocks, and a residual area may be formed in the ECC block. This residual area is called a gap. Since existence of the gap areas is allowed in this way, each information can be recorded for respective ECC blocks. As a result, the convenience upon playback and the reliability upon data playback can be assured, as described above.

8) Each enhanced video object EVOB in the enhanced video object set VMGM_EVOBS of the video manager menu shall be allocated contiguously. As described above, the enhanced video object set VMGM_EVOBS of the video manager menu can have a size which exceeds 1 GB, and can be divisionally recorded in files of 1 GB or less. This means that the divided files are recorded contiguously on the information storage medium DISC. As a result, the enhanced video object set VMGM_EVOBS of the video manager menu can be read together by a single playback operation, thus assuring the convenience of the playback processing and shortening the time required for presentation for the user.

9) When the menu FP_PGCM_EVOB which is to be presented first immediately after insertion of the information storage medium DISC and the enhanced video object set VMGM_EVOBS of the video manager menu do not exist, the video manager information VMGI and the backup file VMGI_BUP of the video manager information shall be recorded respectively in continuous areas defined by continuous logical sector numbers. In this manner, the playback convenience of the video manager information VMGI and the backup file VMGI_BUP of the video manager information can be improved.

<Structure of Enhanced Video Object Set (EVOS) in Standard Content>

The EVOBS is a collection of Enhanced Video Object which is composed of data on Video, Audio, Sub-picture and the like.

The following rules shall apply to EVOBS:

1) In an EVOBS, EVOBs are to be recorded in Contiguous Block and Interleaved Block.

2) An EVOBS is composed of one or more EVOBs. EVOB_ID numbers are assigned from the EVOB with the smallest LSN in EVOBS, in ascending order starting with one (1).

3) An EVOB is composed of one or more Cells. C_ID numbers are assigned from the Cell with the smallest LSN in an EVOB, in ascending order starting with one (1).

4) Cells in EVOBS may be identified by the EVOB_ID number and the C_ID number.

5) An EVOB shall be allocated in ascending order in logical sector number contiguously (without any gaps).

More intelligible explanations will be provided below.

The enhanced video object set EVOBS is a collection of the enhanced video object EVOB, which is composed of data on video, audio, sub-picture, and the like. In this embodiment, the following rules shall apply to the enhanced video object set EVOBS.

1) In the enhanced video object set EVOBS, enhanced video objects EVOBs are to be recorded in contiguous blocks and interleaved blocks.

2) An enhanced video object set EVOBS is composed of one or more enhanced video objects EVOBs.

3) ID numbers EVOB_ID assigned to respective enhanced video object EVOB are assigned in ascending order of logical sector number LSN, which indicates the recording address of enhanced video object EVOB on the information storage medium DISC. The first number is "1", and is incremented in turn.

One enhanced video object EVOB is composed of one or more cells. As ID numbers C_ID set for respective cells, numerals which are incremented in turn to have a minimum value "1" in ascending order of logical sector number LSN which indicates the recording location of each cell on the information storage medium DISC are set.

4) Respective cells in the enhanced video object set EVOBS may be individually identified by the ID number EVOB_ID assigned to the enhanced video object EVOB and the ID numbers C_ID set for respective cells.

<Category of Information Storage Medium>

In this embodiment, for example, as video information and its management information to be recorded on the information storage medium DISC, two different types of contents, i.e., the advanced content ADVCT and standard content STDCT are set. By providing the advanced content ADVCT, the requirements of the user who wants to assure flexible and diversified expressions, easy processing of video related information of network actions, and easy transmission of information after processing, can be satisfied. By providing the standard content STDCT at the same time, the data compatibility to the conventional DVD-Video can be assured, and even an inexpensive information playback apparatus without any precondition of network connection can play back video information of this embodiment. This point is a large technical feature in this embodiment.

Figure 8:
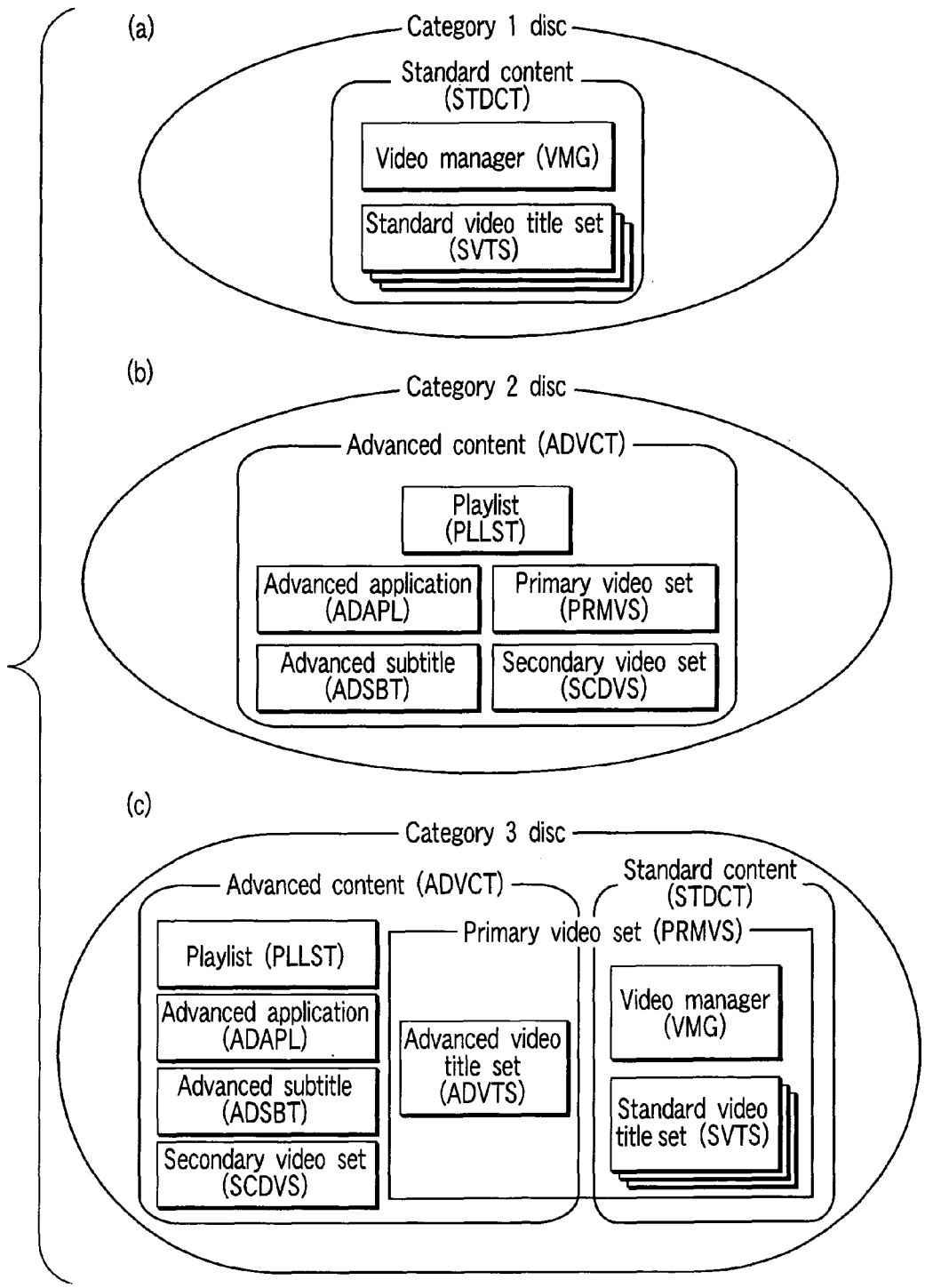
FIG. 8 is an exemplary view showing various categories of information storage media.

As shown in FIG. 8, information storage media DISC corresponding to three different categories are defined as the information storage media DISC that record respective contents. That is, as shown in (a) of FIG. 8, a medium which records only information of the standard content STDCT as data to be recorded in the information storage medium DISC compliant to category 1 is defined. The information storage medium DISC compliant to category 1 can be played back by both an inexpensive information playback apparatus without any precondition of network connection and an advanced information playback apparatus premised on network connection.

An information storage medium DISC which records only advanced content ADVCT as data recorded in an information storage medium compliant to category 2 is defined, as shown in (b) of FIG. 8. The information storage medium DISC compliant to category 2 can be played back by only an advanced information playback apparatus premised on network connection. Furthermore, as shown in (c) of FIG. 8, an information storage medium DISC compliant to category 3 that records identical video information in both the formats of the advanced content ADVCT and standard content STDCT is defined. This point is a large technical feature of this embodiment. Using the information storage medium DISC compliant to category 3, an advanced information playback apparatus having a network connection function can play back the advanced content ADVCT, and an inexpensive information playback apparatus without any precondition of network connection can play back the standard content STDCT. Hence, the contents optimal to every models can be presented (provided) to the user.

<Category 1 Disc>

This disc contains only Standard Content which consists of one VMG and one or more Standard VTSs. This disc contains no Advanced Content such as a Playlist, Advanced VTS and so on. As for an example of structure, see (a) of FIG. 8.

More intelligible explanations will be provided below.

The information storage medium DISC compliant to category 1 shown in (a) of FIG. 8 records the standard content STDCT which consists of one video manager VMG which forms a menu frame, and one or more standard video title sets SVTS that manage video information. No information of the advanced content ADVCT is recorded on this information storage medium DISC.

<Category 2 Disc>

This disc contains only Advanced Content which consists of Playlist, Primary Video Set (only Advanced VTS), Secondary Video Set and Advanced Subtitle. This disc contains no Standard Content such as VMG or Standard VTS. As for an example of structure, see (b) of FIG. 8.

More intelligible explanations will be provided below.

The information storage medium DISC compliant to category 2 shown in (b) of FIG. 8 records only the advanced content ADVCT, and does not record any standard content STDCT.

<Category 3 Disc>

This disc contains both Advanced Content which consists of Playlist, Advanced VTS in Primary Video Set, Secondary Video Set, Advanced Application and Advanced Subtitle and Standard Content which consists of one or more Standard VTSs in Primary Video Set. That is, neither FP_DOM nor VMGM_DOM should exist in this Primary Video Set. Even though FP_DOM and VMGM_DOM may exist on a disc, some navigation command to transit to FP_DOM or VMGM_DOM shall be ignored by a player. As for an example of structure, see (c) of FIG. 8. Even though this disc contains Standard Content, basically this disc follows rules for the Category 2 disc. Standard Content may be referred by Advanced Content with cancellations of some functions. In addition, for playback of this disc, there are kinds of state such as Advanced Content Playback State and Standard Content Playback State, and the transition between the states is allowed.

More intelligible explanations will be provided below.

Figure 10:
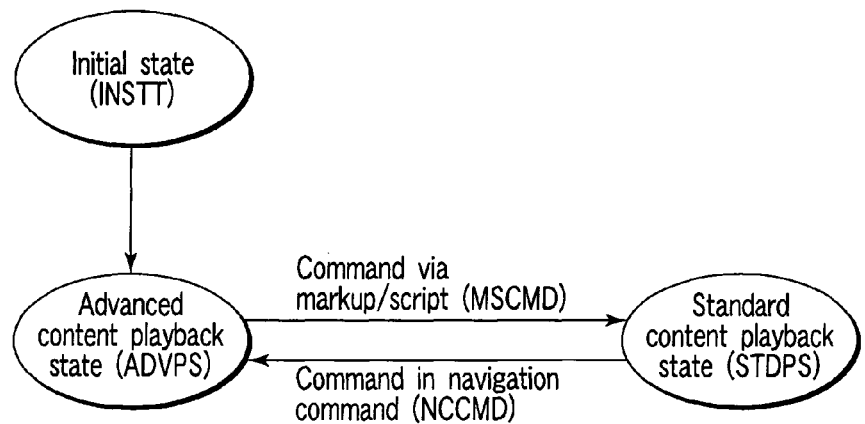
FIG. 10 is an exemplary diagram showing transitions upon playback of the advanced content and upon playback of the standard content.

The information storage medium DISC compliant to category 3 shown in (c) of FIG. 8 records the advanced content ADVCT and standard content STDCT. In the information storage medium DISC compliant to category 3, a primary video set PRMVS (to be described later) is defined. In the primary video set PRMVS, neither a first play domain FP_DOM corresponding to a frame to be presented immediately after insertion of the information storage medium DISC nor a video manager menu domain VMGM_DOM that presents a menu is defined in the primary video set PRMVS. However, the first play domain FP_DOM and video manager menu domain VMGM_DOM may exist in an area other than the primary video set PRMVS in the information storage medium DISC compliant to category 3. Furthermore, an information playback apparatus shall ignore a navigation command to transit to the first play domain FP_DOM or the video manager domain VMGM_DOM. The first play domain FP_DOM corresponding to a frame to be presented immediately after insertion of the information storage medium DISC and the video manager domain VMGM_DOM are basically required in a menu operation in the standard content STDCT. However, in this embodiment, as shown in FIG. 9 or 10, menu processing is executed in the advanced content ADVCT to refer to the standard video title set SVTS which records video information in the standard content STDCT as needed. In this way, by inhibiting jump to the first play domain FP_DOM of a menu presented immediately after insertion of the information storage medium DISC and the video manager domain VMGM_DOM, the menu processing on the advanced content ADVCT can always be assured, thus avoiding confusion to the user. Even though the information storage medium DISC compliant to category 3 contains the standard content STDCT, basically this information storage medium DISC follows rules for the information storage medium DISC compliant to category 2 shown in (b) of FIG. 8.

<Primary Video Set>

Primary Video Set in Advanced Content consists of Advanced VTS space, Standard VTS space and VMG. Basically Advanced VTS is used only in Advanced Content, and Standard VTS may be used in Advanced Content even though this VTS is mainly used for Standard Content. In Advanced Content, VMG may exist in Primary Video Set, however the transition to VMGM_DOM or FP_DOM is not allowed. The data for Primary Video Set is located on a disc under HVDVD_TS directory.

More intelligible explanations will be provided below.

The contents of the primary video set PRMVS shown in (c) of FIG. 8 will be described below. The primary video set PRMVS in the advanced content ADVCT includes an advanced video title set ADVTS, a standard video title set SVTS, and a video manager VMG. These video title sets are mainly used in the standard content STDCT. However, the advanced video title set ADVTS is used only in the advanced content ADVCT, and the standard video title set SVTS may be used in the advanced content ADVCT. In the advanced content ADVCT, the video manager VMG in the primary video set PRMVS may exist. However, during use of the advanced content ADVCT, the transition to the aforementioned video manager menu domain VMGM_DOM and first play domain FP_DOM is inhibited. The first play domain FP_DOM corresponding to a frame to be presented immediately after insertion of the information storage medium DISC and the video manager domain VMGM_DOM are basically required in a menu operation in the standard content STDCT. However, in this embodiment, as shown in FIG. 9 or 10, the menu processing is executed in the advanced content ADVCT to refer to the standard video title set SVTS which records video information in the standard content STDCT as needed. In this way, by inhibiting the transition to the first play domain FP_DOM of a menu presented immediately after insertion of the information storage medium DISC and the video manager domain VMGM_DOM, the menu processing on the advanced content ADVCT can always be assured, thus effectively avoiding confusion to the user. The primary video set PRMVS are recorded in the information storage medium DISC compliant to category 3. The primary video set PRMVS is allocated in the HDDVD_TS directory described above as the data structure to be recorded. However, the embodiment of the invention is not limited to this, and the primary video set PRMVS may be recorded in the persistent storage.

At least the primary video set PRMVS and at least one playlist PLLST (details will be described later) shall be recorded in the information storage medium DISC compliant to category 2 or 3. Other pieces of information related with the advanced content ADVCT described in FIGS. 8B and 8C shall be located in on information storage medium DISC but can be delivered from a server via the network.

<Structure of Volume Space>

The Volume Space of an HD DVD-Video disc consists of

1) The Volume and File structure, which shall be assigned for the UDF structure.

2) Single "HD DVD-Video zone", which shall be assigned for the data structure of HD DVD-Video format. This zone consists of "Standard Content zone" and "Advanced Content zone".

3) "DVD others zone", which may be used for other than HD DVD-Video applications.

The following rules apply for HD DVD-Video zone.

1) "HD DVD-Video zone" shall consist of a "Standard Content zone" in Category 1 disc.

"HD DVD-Video zone" shall consist of an "Advanced Content zone" in Category 2 disc.

"HD DVD-Video zone" shall consist of both a "Standard Content zone" and an "Advanced Content zone" in Category 3 disc.

2) "Standard Content zone" shall consist of single Video Manager (VMG) and at least 1 with maximum 511 Video Title Set (VTS) in Category 1 disc and Category 3 disc. "Standard Content zone" should not exist in Category 2 disc.

3) VMG shall be allocated at the leading part of "HD DVD-Video zone" if it exists, that is Category 1 disc case.

4) VMG shall be composed of at least 2 with maximum 102 files.

5) Each VTS (except Advanced VTS) shall be composed of at least 3 with maximum 200 files.

6) "Advanced Content zone" shall consist of files supported in Advanced Content with an Advanced VTS. The maximum number of files for Advanced Content zone under ADV_OBJ directory is 512×2047.

7) Advanced VTS shall be composed of at least 3 with maximum 5995 files.

More intelligible explanations will be provided below.

The recording locations of the advanced content ADVCT and standard content STDCT recorded in the information storage medium DISC will be described below using (c) of FIG. 8. In the following description, a medium in which the recording location of only the advanced content ADVCT is set corresponds to the information storage medium DISC shown in (b) of FIG. 8, and a medium in which the recording location of only the standard content STDCT corresponds to the information storage medium DISC of category 1 shown in (a) of FIG. 8. A space that records each content on the information storage medium DISC, as shown in (c) of FIG. 8, is defined as a volume space, and logical sector numbers LSN are assigned to all locations in the volume space. In this embodiment, the volume space is formed of the following three zones.

1) Zone that describes the volume and file structure (file system management information recording area)

This zone is defined as an area that records management information of a file system, although it is not described in (c) of FIG. 8. In this embodiment, a file system compliant to uniform disc format (UDF) is built. The above zone indicates a zone which records management information of that file system.

2) Single HD_DVD-Video zone

This zone records data in this embodiment described in (c) of FIG. 8. This zone consists of a zone that records the advanced content ADVCT, and a zone that records the standard content STDCT.

Other DVD related information recording zone.

3) DVD others zone

This zone records DVD related information other than information used in the HD_DVD-Video of this embodiment. This zone can record information related with the HD_DVD-Video recording standards and information related with the existing DVD-Video and DVD-Audio standards.

In this embodiment, the following rules apply for the HD_DVD-Video zone described in 2) above and (c) of FIG. 8.

1) The information storage media compliant to categories 1 and 3 can record information of one video manager VMG and 1 to 511 video title sets VTS in the recording area of the standard content STDCT. The information storage medium DISC compliant to category 2 cannot set the recording area of the standard content STDCT.

2) In the information storage medium DISC compliant to category 1, the video manager VMG shall be recorded at the first location in the HD_DVD-Video recording area.

3) The video manager VMG shall be composed of 2 with maximum 102 files.

4) Each video title set VTS except the advanced video title sets ADVTS shall be composed of at least 3 with maximum 200 files.

5) The recording area of the advanced content ADVCT shall consists of files supported in the advanced content ADVCT with an advanced video title set ADVTS. The maximum number of files for advanced content ADVCT to be recorded in the recording area is 512×2047.

6) The advanced video title set ADVTS shall be composed of 3 with 5995 files.

<Transition Upon Playback>

The transitions upon playback of the advanced content ADVCT and upon playback of the standard content STDCT will be explained below using FIG. 10. The information storage medium DISC compliant to category 3 shown in (c) of FIG. 8 has a structure that can independently play back the advanced content ADVCT and standard content STDCT. When the information storage medium DISC compliant to category 3 is inserted into an advanced information playback apparatus having an Internet connection function, the playback apparatus reads advanced navigation data ADVNV included in the advanced content ADVCT in an initial state INSTT. After that, the playback apparatus transits to an advanced content playback state ADVPS. The same processing applies when the information storage medium DISC compliant to category 2 shown in (b) of FIG. 8 is inserted. In the advanced content playback state ADVPS shown in FIG. 10, a playback situation can transit to a standard content playback state STDPS by executing a command MSCMD corresponding to a markup file MRKUP or script file SCRPT. In the standard content playback state STDPS, the playback situation can return to the advanced content playback state ADVPS by executing a command NCCMD of navigation commands set in the standard content STDCT.

In the standard content STDCT, system parameters which record information, e.g., the presentation angle numbers, playback audio numbers, and the like that are set by the system as in the existing DVD-Video standards are defined. In this embodiment, the advanced content ADVCT can play back data to be set in the system parameter or can change the system parameter values in the advanced content playback state ADVPS. In this manner, compatibility to the existing DVD-Video playback can be assured. Independently of the transition direction between the advanced content playback state ADVPS and the standard content playback state STDPS, the consistency of the setting values of the system parameters can be maintained in this embodiment.

When an arbitrary transition is made according to user's favor between the advanced content ADVCT and standard content STDCT in the information storage medium DISC compliant to category 3 shown in (c) of FIG. 8, since the system parameter values have consistency, as described above, for example, the same presentation language is used before and after transition, and the user's convenience upon playback can be assured.

<Medium Identification Processing Method>

Figure 11:
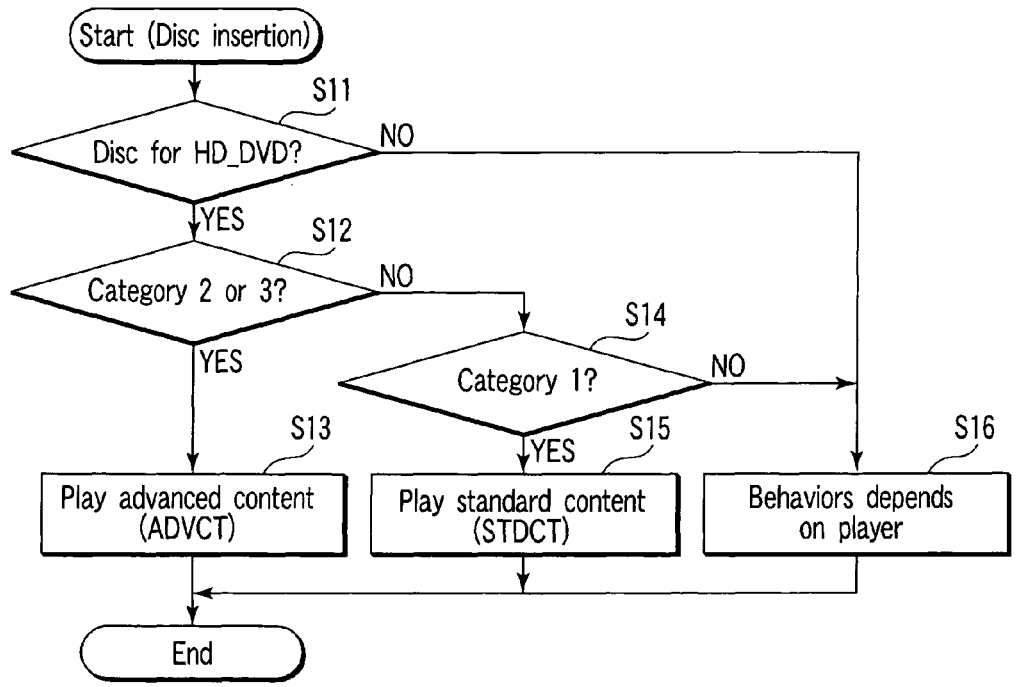
FIG. 11 is an exemplary flowchart showing a medium identification processing method by an information playback apparatus when an information storage medium is mounted.

FIG. 11 shows a medium identification processing method by the information playback apparatus of this embodiment when three different types of information storage media DISC shown in FIGS. 8A, 8B, and 8C are mounted.

When the information storage medium DISC is mounted on a high-end information playback apparatus having a network connection function, the information playback apparatus determines if the information storage medium DISC is compliant to HD_DVD (step S11). In case of the information storage medium DISC compliant to HD_DVD, the information playback apparatus goes to find a playlist file PLLST recorded in an advanced content directory ADVCT located directly under the root directory shown in FIG. 15 and determines if the information storage medium DISC is compliant to category 2 or 3 (step S12). If the playlist file PLLST is found, the information playback apparatus determines that the information storage medium DISC is compliant to category 2 or 3, and plays back the advanced content ADVCT (step S13). If the playlist file PLLST is not found, the information playback apparatus checks the video manager ID number VMGM_ID recorded in the video manager information VMGI in the standard content STDCT and determines if the information storage medium DISC is compliant to category 1 (step S14). In case of the information storage medium DISC compliant to category 1, the video manager ID number VMGM_ID is recorded as specific data, and it can be identified based on the information in a video manager category VMG_CAT that the standard content STDCT compliant to category 1 alone is recorded. In this case, the standard content STDCT is played back (step S15). If the mounted information storage medium DISC belongs to none of categories described in FIGS. 8A, 8B, and 8C, a processing method depending on the information playback apparatus is adopted (step S16).

<Playback of Only Audio>

Figure 12:
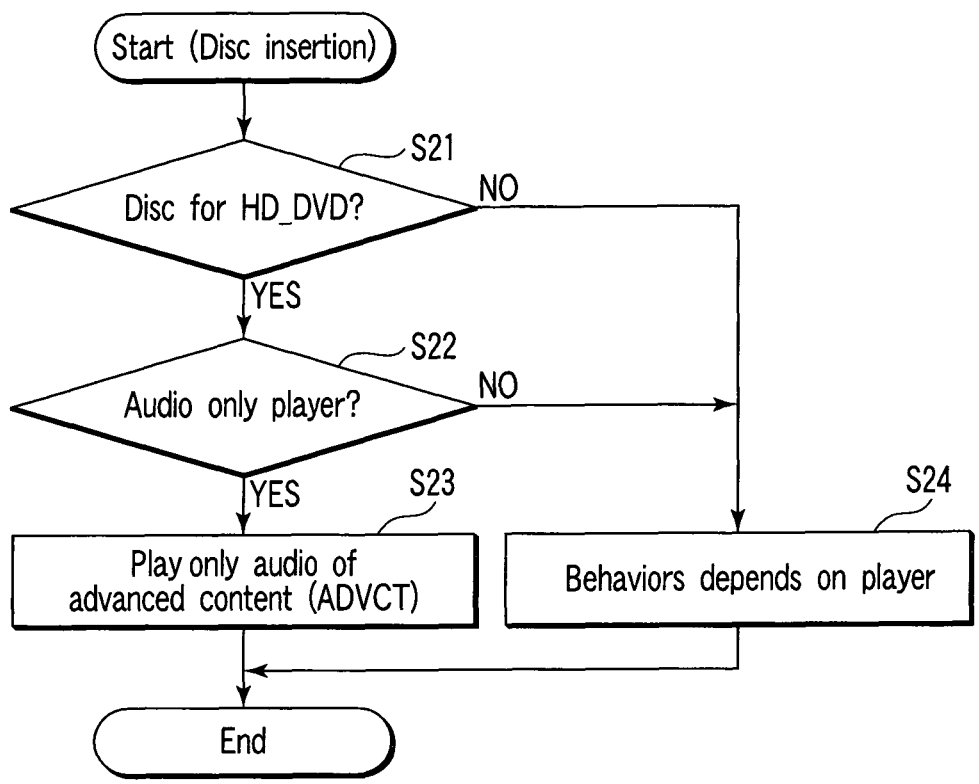
FIG. 12 is an exemplary flowchart showing a startup sequence in an information playback apparatus of only audio.

This embodiment supports a playback apparatus which does not have any video display function and plays back only audio information. FIG. 12 shows the startup sequence in an audio-only information playback apparatus.

When the information storage medium DISC is mounted on the information playback apparatus, the information playback apparatus determines if the information storage medium DISC is compliant to HD_DVD (step S21). If the information storage medium DISC is not compliant to HD_DVD in this embodiment, a processing method depending on the information playback apparatus is adopted (step S24). Also, if the information playback apparatus is not the one which plays back only audio information, a processing method depending on the information playback apparatus is adopted (steps S22 and S24). If the mounted information storage medium DISC is compliant to HD_DVD of this embodiment, the information playback apparatus checks the presence/absence of a playlist file PLLST recorded in the advanced content directory ADVCT located directly under the root directory. If the playlist file PLLST is found, the information playback apparatus which plays back only audio information plays back audio information (steps S22 and S23). At this time, the information playback apparatus plays back information via the playlist file PLLST.

<Data Access Method>

Different management methods (different data access methods to contents and the like) for the enhanced video object EVOB in the standard content STDCT and those in the advanced content ADVCT in this embodiment will be described below with reference to FIG. 9.

On standard video title set information STVTSI as management information in the standard content STDCT in this embodiment, access to each enhanced video object EVOB is designated by a logical sector number LSN as address information on the logical space. In this way, since access is managed using the address information, compatibility to the existing DVD-Video standards can be assured. By contrast, access to each enhanced video object EVOB in the advanced content ADVCT is managed not by address information but by time information. This point is a large technical feature in this embodiment. With this feature, not only compatibility to the video recording standards that allow existing video recording and playback can be assured, but also easy edit processing is guaranteed. More specifically, in a playlist PLLST which represents playback management information on the advanced content ADVCT, the playback range of advanced video object data at a playback position is set by time information. In the advanced content ADVCT of this embodiment, time information designated in the playlist PLLST can be converted into address information by time map information TMAPI. The time map information TMAPI is used to convert the designated time information into a logical sector number LSN indicating a logical address position on the information storage medium DISC. The time map information TMAPI is recorded at a position different from the playlist PLLST. Furthermore, advanced video title set information ADVTSI in the advanced content ADVCT corresponds to the standard video title set information STVTSI in the standard content STDCT. This advanced video title set information ADVTSI records enhanced video object information EVOBI which records individual attribute information of respective enhanced video object EVOB. This enhanced video object information EVOBI refers to and manages each individual enhanced video object EVOB as management information of attribute information. When this enhanced video object information EVOBI#3 manages and refers to attributes of the enhanced video object EVOB in the standard content STDCT, the playlist PLLST that manages playback of the advanced content ADVCT can designate playback of enhanced video object EVOB in the standard content STDCT.

<Utilization of Standard Content By Advanced Content>

Standard Content can be utilized by Advanced Content. VTSI of Advanced VTS can refer EVOBs which is also be referred by VTSI of Standard VTS, by use of TMAP (see FIG. 9). In this case, a TMAP Information refers one or more EVOBUs in an EVOB. However, the EVOB may contain HLI, PCI and so on, which are not supported in Advanced Content. In the playback of such EVOBs, some information which is not supported in Advanced Content such as HLI and PCI shall be ignored in Advanced Content.

More intelligible explanations will be provided below.

As described above, the advanced content ADVCT can utilize some data in the standard content STDCT. This point is a large technical feature in this embodiment.

For example, as shown in FIG. 9, the enhanced video object information EVOBI#3 in the advanced video title set information ADVTSI can refer to and play back enhanced video object EVOB#3 in the standard content STDCT by utilizing time map information TMAPI#3 in the advanced content ADVCT. Also, as shown in FIG. 9, the enhanced video object EVOB#3 referred to by the enhanced video object information EVOBI#3 in the advanced content can also be referred to by the standard video title set information STVTSI. As described above, in this embodiment, since the enhanced video object EVOB#3 in the standard content STDCT can be referred to by a plurality of pieces of information, it can be commonly utilized, and the efficiency of data to be recorded on the information storage medium DISC can be improved.

This enhanced video object EVOB#3 includes information such as highlight information HLI, presentation control information PCI, and the like. However, the advanced content ADVCT does not support these pieces of information, and information specified by these highlight information HLI and presentation control information PCI is ignored upon playback of the advanced content ADVCT based on the playlist PLLST.

<Advanced VTS>

Advanced VTS is utilized Video Title Set for Advanced Content. In comparison to Standard VTS, followings are additionally defined.

1) More enhancement for an EVOB
   1 Main Video stream
   8 Main Audio streams (Maximum)
   1 Sub Video stream
   8 Sub Audio streams (Maximum)
   32 Sub-picture streams (Maximum)
   1 Advanced stream
2) Integration of Enhanced VOB Set (EVOBS)
   Integration of both Menu EVOBS and Title EVOBS
3) Elimination of a layered structure
   No Tide, no PGC, no PTT and no Cell
   No supports of Navigation Command and UOP control
4) Introduction of new Time Map Information (TMAPI)
   In case of Contiguous Block, one TMAPI corresponds to one EVOB and it shall be stored as a file.
   In case of Interleaved Block, the TMAPIs which correspond to EVOBs in the Block shall be stored as a file.
   Some information in a NV_PCK are simplified.

More intelligible explanations will be provided below.

The advanced video title set ADVTS shown in (c) of FIG. 8 will be described below with reference to FIG. 9. The advanced video title set ADVTS is utilized as a video title set for the advanced content ADVCT. Differences between the advanced video title set ADVTS shown in (c) of FIG. 8 and the standard video title set SVTS will be listed below.

1) More enhancement for the enhanced video object EVOB in advanced content ADVCT The advanced video title set ADVTS can have one main video stream MANVD, eight (maximum) or fewer main audio streams MANAD, one sub video stream SUBVD, eight (maximum) or less sub audio streams SUBAD, 32 (maximum) or fewer sub-picture streams SUBPT, and one advanced stream (stream data that records an advanced application ADAPL to be described later).

2) Integration of enhanced video object set EVOBS

In the standard content STDCT, as shown in FIG. 5, enhanced video object EVOB in the video manager VMG that represents a menu frame is completely separated from enhanced video object EVOB in the standard video title set SVTS which represents video information to be played back, and a moving image and menu frame cannot be simultaneously presented. By contrast, the advanced video title set ADVTS in this embodiment can manage and present a menu frame and a picture frame that represents a moving image by integrating them.

3) Elimination of a layered structure of management information for video information The existing DVD-Video and standard content STDCT adopts a layered structure of program chains PGC/parts of title PTT/cells as a video management unit. However, the management method of the advanced content ADVCT in this embodiment does not adopt such layered structure. Also, the standard content STDCT of the existing DVD-Video uses navigation commands to execute special processing such as transition processing and the like and performs user operation processing. However, the advanced content ADVCT of this embodiment does not perform these processes.

4) Introduction of new time map information TMAPI

In a contiguous block to be described later, one time map information TMAPI corresponds to one enhanced video object EVOB, and respective pieces of time map information TMAPI are recorded as one file on the information storage medium DISC. In case of an interleaved block, a plurality of enhanced video object EVOB corresponding to each stream in that interleaved block are included. Time map information TMAPI is set for each individual enhanced video object EVOB, and a plurality of pieces of time map information TMAPI are recorded in one file for each interleaved block. Furthermore, information in a navigation pack NV_PCK defined in the conventional DVD-Video and standard content STDCT is recorded after it is simplified.

<Structure of Advanced Video Title Set (Advanced VTS)>

This VTS consists of only one Title. This VTS is composed of control data referred to as Video Title Set Information (VTSI), Enhanced Video Object Set for Titles in a VTS (VTSTT_EVOBS), Video Title Set Time Map Information (VTS_TMAP), backup control data (VTSI_BUP) and backup of Video Title Set Time Map Information (VTS_TMAP_BUP).

The following rules shall apply to Video

Title Set (VTS):

1) The control data (VTSI) and the backup of control data (VTSI_BUP) (if exists: this data is recorded optionally) shall be a single File.

2) VTSI and VTSI_BUP (if exists) shall not be recorded in the same ECC block.

3) Each of a Video Title Set Time Map Information (VTS_TMAP) and the backup of this (VTS TMAP_BUP) (if exists: this data is recorded optionally) shall be composed of files, up to a maximum of 999 respectively.

4) VTS_TMAP and VTS_TMAP_BUP (if exists) shall not be recorded in the same ECC block.

5) Files comprising VTS_TMAP shall be allocated continuously.

6) Files comprising VTS_TMAP_BUP (if exists) shall be allocated continuously.

7) An EVOB which belongs to Contiguous Block shall be a single File.

8) EVOBs which consist of an Interleaved Block shall be included in a single File.

9) An EVOBS of a VTS (VTSTT_EVOBS) shall be composed of files, up to a maximum of 999.

10) Files comprising VTSTT_EVOBS shall be allocated continuously.

11) The contents of VTSI_BUP (if exists) shall be exactly the same as VTSI completely. Therefore, when relative address information in VTSI_BUP refers to outside of VTSI BUP, the relative address shall be taken as a relative address of VTSI.

More intelligible explanations will be provided below.

The data structure in the advanced video title set ADVTS in the advanced content ADVCT shown in FIG. 9 will be described below.

In this embodiment, one advanced video title set ADVTS is composed of only one title that represents video information itself. In this embodiment, the advanced video title set ADVTS is composed of advanced video title set information ADVTSI which records control information, an enhanced video object set VTSTT_EVOBS which stores a video title representing the video information itself, video title set time map information VTS_TMAP which records time map information TMAPI shown in FIG. 9, backup information ADVTSI_BUP of the advanced video title set information ADVTSI, and backup information VTS_TMAP_BUP of the time map information. These pieces of information shall be recorded contiguously in this order on the information storage medium DISC. The following rules shall apply to the advanced video title set ADVTS in this embodiment.

1) The advanced video title set information ADVTSI as control information and its backup information ADVTSI_BUP shall be recorded as a single file on the information storage medium DISC.

2) The advanced video title set information ADVTSI and its backup information ADVTSI_BUP shall not be stored in one ECC block together. When the advanced video title set information ADVTSI and its backup information ADVTSI_BUP are recorded contiguously, if the last information in the advanced video title set information ADVTSI is located in the middle of one ECC block, padding information should be recorded in the residual area in that ECC block so that the next backup information ADVTSI_BUP is allocated in a different ECC block. In this manner, even when an ECC block at the boundary between the advanced video title set information ADVTSI and the next backup information ADVTSI_BUP cannot be read due to an error, one of these two pieces of information can be played back, thus improving the reliability upon playback.

3) Each of the video title set time map information VTS_TMAP and its backup information VTS_TMAP_BUP shall be recorded in 1 to 999 (maximum) or fewer files.

4) Each of the video title set time map information VTS_TMAP and its backup information VTS_TMAP_BUP shall not be recorded in one ECC block together. That is, as in 2), when the boundary between these two pieces of information is to be allocated in one ECC block, i.e., when the last part of the video title set time map information VTS_TMAP is allocated in the middle of one ECC block, padding data is recorded to allocate the next backup information VTS_TMAP_BUP to be recorded from the head position of the next ECC block. In this manner, the reliability upon playback can be assured.

5) A plurality of files comprising the video title set time map information VTS_TMAP shall be recorded continuously on the information storage medium DISC. In this way, the need for unwanted transition processing of an optical head can be obviated, and the video title set time map information VTS_TMAP can be played back by single continuous playback, thus attaining easy playback processing and speeding up.

6) A plurality of files comprising the backup information VTS_TMAP_BUP of each video title set time map information VTS_TMAP shall be recorded continuously on the information storage medium DISC. In this way, as in 5), easy playback processing and speeding up can be attained.

7) An enhanced video object set VTSTT_EVOBS that record titles of the advanced video title set shall be recorded on the information storage medium DISC as 1 to 999 (maximum) or fewer files.

8) A plurality of files which record the enhanced video object sets VTSTT_EVOBS that record titles of the advanced video title set shall be recorded continuously on the information storage medium DISC. In this manner, the enhanced video object sets VTSTT_EVOBS that record titles of the advanced video title set can be played back by single continuous playback, thus assuring continuity upon playback.

9) The contents of the backup information ADVTSI_BUP of the advanced video title set information ADVTSI shall be the same as the advanced video title set information ADVTSI completely.

<Structure of Enhanced Video Object Set (EVOBS) in Advanced VTS>

The EVOBS is a collection of Enhanced Video Object which is composed of data on Video, Audio, Sub-picture and the like.

The following rules shall apply to EVOBS:

1) In an EVOBS, EVOBs are to be recorded in Contiguous Block and Interleaved Block.

2) An EVOBS is composed of one or more EVOBs. EVOB_ID numbers are assigned from the EVOB with the smallest LSN in EVOBS, in ascending order starting with one (1). EVOB_ID number is also corresponding to the same number of EVOBI in VTSI.

3) Each EVOB has one corresponded TMAP file if the EVOB belongs to Contiguous Block. EVOBs which compose Interleaved Block have one corresponded TMAP file.

4) An EVOB shall be allocated in ascending order in logical sector number contiguously (without any gaps).

More intelligible explanations will be provided below.

The data structure of the enhanced video object EVOB in the advanced content ADVCT shown in FIG. 9 will be described below. In this embodiment, a collection of enhanced objects EVOBs is called an enhanced video object set EVOBS, and is composed of data of video, audio, subpicture, and the like. In this embodiment, the following rules shall apply to the enhanced video object set EVOBS in the advanced content ADVCT.

1) Enhanced video objects EVOBs are recorded in a contiguous block and interleaved block (to be described later).

2) One enhanced video object set EVOBS includes one or more enhanced video object EVOB. The aforementioned ID numbers EVOB_ID of the enhanced video object are assigned in the layout order of enhanced video object EVOB recorded on the information storage medium DISC. That is, the ID numbers EVOB_ID are assigned in ascending order of logical sector number LSN which indicates the recording address of enhanced video object EVOB on the logical space, and the first number is set to 1. The ID number EVOB_ID of the enhanced video object is corresponding to the same number of the enhanced video object information EVOBI described in the advanced title set information ADVTSI. That is, as shown in FIG. 9, enhanced video object EVOB#1 has an ID number EVOB_ID="1", and enhanced video object EVOB#2 has an ID number EVOB_ID="2". Enhanced video object information EVOBI#1 which controls that data is set to have a number="1", and enhanced video object information EVOBI#2 that manages the enhanced video object EVOB#2 is set to have a number="2".

3) Each enhanced video object EVOB has one corresponded time map file if the enhanced video object EVOB belongs to the contiguous block. That is, as shown in FIG. 9, time map information TMAPI#1 exists as a part for managing the time of enhanced video object EVOB#1, and this time map information TMAPI#1 is recorded on the information storage medium DISC as one time map file. When a plurality of enhanced video objects EVOBs compose an interleaved block, one time map file is recorded on the information storage medium DISC in correspondence with one interleaved block.

<Relation among Presentation Objects>

FIG. 7 shows the relation among Data Type, Data Source and Player/Decoder for each presentation object defined above.

More intelligible explanations will be provided below.

The advanced content ADVCT in this embodiment uses objects shown in FIG. 7. The correspondence among the data types, data sources, and players/decoders, and player for each presentation object is shown in FIG. 7. Initially, "via network" and "persistent storage PRSTR" as the data sources will be described below.

<Network Server>

Network Server is an optional data source for Advanced Content playback, but a player should have network access capability. Network Server is usually operated by the content provider of the current disc. Network Server usually locates in the internet.

More intelligible explanations will be provided below.

"Via network" related with the data sources shown in FIG. 7 will be explained.

This embodiment is premised on playback of object data delivered from the network server NTSRV via the network as the data source of objects used to play back the advanced content ADVCT. Therefore, a player with advanced functions in this embodiment is premised on network access. As the network server NTSRV which represents the data source of objects upon transferring data via the network, a server to be accessed is designated in the advanced content ADVCT on the information storage medium DISC upon playback, and that server is operated by the content provider who created the advanced content ADVCT. The network server NTSRV is usually located in the Internet.

<Data Categories on Network Server>

Any Advanced Content files can exist on Network Server. Advanced Navigation can download any files on Dada Sources to the File Cache or Persistent Storage by using proper API(s). For S-EVOB data read from Network Server, Secondary Video Player can use Streaming Buffer.

More intelligible explanations will be provided below.

Files which record the advanced content ADVCT in this embodiment can be recoded in the network server NTSRV in advance. An application processing command API which is set in advance downloads advanced navigation data ADVNV onto a file cache FLCCH (data cache DTCCH) or the persistent storage PRSTR. In this embodiment, a primary video set player cannot directly play back a primary video set PRMVS from the network server NTSRV. The primary video set PRMVS is temporarily recorded on the persistent storage PRSTR, and data are played back via the persistent storage PRSTR (to be described later). A secondary video player SCDVP can directly play back secondary enhanced video object S-EVOB from the network server NTSRV using a streaming buffer. The persistent storage PRSTR shown in FIG. 7 will be described below.

<Persistent Storage/Data Categories on Persistent Storage>

There are two categories of Persistent Storage. One is called as "Required Persistent Storage". This is a mandatory Persistent Storage device attached in a player. FLASH memory is typical device for this. The minimum capacity for Fixed Persistent Storage is 128 MB. Others are optional and called as "Additional Persistent Storage". They may be removable storage devices, such as USB Memory/HDD or Memory Card. NAS (Network Attached Storage) is also one of possible Additional Persistent Storage device. Actual device implementation is not specified in this specification. They should pursuant API model for Persistent Storage.

Any Advanced Content files can exist on Persistent Storage. Advanced Navigation can copy any files on Data Sources to Persistent Storage or File Cache by using proper API(s). Secondary Video Player can read Secondary Video Set from Persistent Storage.

More intelligible explanations will be provided below.

This embodiment defines two different types of persistent storages PRSTRs. The first type is called a required persistent storage (or a fixed persistent storage as a mandatory persistent storage) PRSTR. The information recording and playback apparatus 1 (player) in this embodiment has the persistent storage PRSTR as a mandatory component. As a practical recording medium which is most popularly used as the fixed persistent storage PRSTR, this embodiment assumes a flash memory. This embodiment is premised on that the fixed persistent storage PRSTR has a capacity of 64 MB or more. When the minimum required memory size of the persistent storage PRSTR is set, as described above, the playback stability of the advanced content ADVCT can be guaranteed independently of the detailed arrangement of the information recording and playback apparatus 1. As shown in FIG. 7, the file cache FLCCH (data cache DTCCH) is designated as the data source. The file cache FLCCH (data cache DTCCH) represents a cache memory having a relatively small capacity such as a DRAM, SRAM, or the like. The fixed persistent storage PRSTR in this embodiment incorporates a flash memory, and that memory itself is set not to be detached from the information playback apparatus. However, this embodiment is not limited to such specific memory, and for example, a portable flash memory may be used in addition to the fixed persistent storage PRSTR.

The other type of the persistent storage PRSTR in this embodiment is called an additional persistent storage PRSTR. The additional persistent storage PRSTR may be a removable storage device, and can be implemented by, e.g., a USB memory, portable HDD, memory card, or the like.

In this embodiment, the flash memory has been described as an example the fixed persistent storage PRSTR, and the USB memory, portable HDD, memory card, or the like has been described as the additional persistent storage PRSTR. However, this embodiment is not limited to such specific devices, and other recording media may be used.

This embodiment performs data I/O processing and the like for these persistent storages PRSTR using the data processing API (application interface). A file that records a specific advanced content ADVCT can be recorded in the persistent storage PRSTR. The advanced navigation data ADVNV can copy a file that records it from a data source to the persistent storage PRSTR or file cache FLCCH (data cache DTCCH). A primary video player PRMVP can directly read and present the primary video set PRMVS from the persistent storage PRSTR. The secondary video player SCDVP can directly read and present a secondary video set SCDVS from the persistent storage PRSTR.

<Note about Presentation Objects>

Resource files in a disc, in Persistent Storage or in network need to be once stored in File Cache.

More intelligible explanations will be provided below.

In this embodiment, the advanced application ADAPL or an advanced subtitle ADSBT recorded in the information storage medium DISC, the persistent storage PRSTR, or the network server NTSRV needs to be once stored in the file cache, and such information then undergoes data processing. When the advanced application ADAPL or advanced subtitle ADSBT is once stored in the file cache FLCCH (data cache DTCCH), speeding up of the presentation processing and control processing can be guaranteed.

The primary video player PRMVP and secondary video player SDCVP as the playback processors shown in FIG. 7 will be described later. In short, the primary video player PRMVP includes a main video decoder MVDEC, main audio decoder MADEC, sub video decoder SVDEC, sub audio decoder SADEC, and sub-picture decoder SPDEC. As for the secondary video player SCDVP, the main audio decoder MADEC, sub video decoder SVDEC, and sub audio decoder SADEC are commonly used as those in the primary video player PRMVP. Also, an advanced element presentation engine AEPEN and advanced subtitle player ASBPL will also be described later.

<Primary Video Set>

There is only one Primary Video Set on Disc. It consists of IFO, one or more EVOB files and TMAP files with matching names.

More intelligible explanations will be provided below.

In this embodiment, only one primary video set PRMVS exists in one information storage medium DISC. This primary video set PRMVS includes its management information, one or more enhanced video object files EVOB, and time map files TMAP, and uses a common filename for each pair.

<Primary Video Set> (Continued)

Primary Video Set is a container format of Primary Audio Video. The data structure of Primary Video Set is in conformity to Advanced VTS which consists of Video Title Set Information (VTSI), Time Map (TMAP) and Primary Enhanced Video Object (P-EVOB). Primary Video Set shall be played back by the Primary Video Player.

More intelligible explanations will be provided below.

The primary video set PRMVS contains a format of a primary audio video PRMAV. The primary video set PRMVS consists of advanced video title set information ADVTSI, time maps TMAP, and primary enhanced video object P-EVOB, and the like. The primary video set PRMVS shall be played back by the primary video player PRMVP.

Components of the primary video set PRMVS shown in FIG. 7 will be described below.

In this embodiment, the primary video set PRMVS mainly means main video data recorded on the information storage medium DISC. The data type of this primary video set PRMVS consists of a primary audio video PRMAV, and a main video MANVD, main audio MANAD, and sub-picture SUBPT mean the same information as video information, audio information, and sub-picture information of the conventional DVD-Video and the standard content STDCT in this embodiment. The advanced content ADVCT in this embodiment can newly present a maximum of two frames at the same time. That is, a sub video SUBVD is defined as video information that can be played back simultaneously with the main video MANVD. Likewise, a sub audio SUBAD that can be output simultaneously with the main audio MANAD is newly defined.

In this embodiment, the following two different use methods of the sub audio SUBAD are available:

1) A method of outputting audio information of the sub video SUBVD using the sub audio SUBAD when the main video MANVD and sub video SUBVD are presented at the same time; and 2) A method of outputting the sub audio SUBAD to be superimposed on the main audio MANAD as a comment of a director when only the main video MANVD is played back and presented on the screen and the main audio MANAD as audio information corresponding to video data of the main video MANVD is output and when, for example, the comment of the director is audibly output to be superposed.

<Secondary Video Set>

Secondary Video Set is used for substitution of Main Video/Main Audio streams to the corresponding streams in Primary Video Set (Substitute Audio Video), substitution of Main Audio stream to the corresponding stream in Primary Video Set (Substitute Audio), or used for addition to/substitution of Primary Video Set (Secondary Audio Video). Secondary Video Set may be recoded on a disc, recorded in Persistent Storage or delivered from a server. The file for Secondary Video Set is once stored in File Cache or Persistent Storage before playback, if the data is recorded on a disc, and it is possible to be played with Primary Video Set simultaneously. Secondary Video Set on a disc may be directly accessed in case that Primary Video Set is not played back (i.e. it is not supplied from a disc). On the other hand, if Secondary Video Set is located on a server, whole of this data should be once stored in File Cache or Persistent Storage and played back ("Complete downloading"), or a part of this data should be stored in Streaming Buffer sequentially and stored data in the buffer is played back without buffer overflow during downloading data from a server ("Streaming").

More intelligible explanations will be provided below.

The secondary video set SCDVS is used as a substitution for the main audio MANAD in the primary video set PRMVS, and is also used as additional information or substitute information of the primary video set PRMVS. This embodiment is not limited to this. For example, the secondary video set SCDVS may be used as a substitution for a main audio MANAD of a substitute audio SBTAD or as an addition (superimposed presentation) or substitution for a secondary audio video SCDAV. In this embodiment, the content of the secondary video set SCDVS can be downloaded from the aforementioned network server NTSRV via the network, or can be recorded and used in the persistent storage PRSTR, or can be recorded in advance on the information storage medium DISC of the embodiment of the invention. If information of the secondary video set SCDVS is recorded in the information storage medium DISC of the embodiment, the following mode is adopted. That is, the secondary video set file SCDVS is once stored in the file cache FLCCH (data cache DTCCH) or the persistent storage PRSTR, and is then played back from the file cache or persistent storage PRSTR. The information of the secondary video set SCDVS can be played back simultaneously with some data of the primary video set PRMVS. In this embodiment, the primary video set PRMVS recorded on the information storage medium DISC can be directly accessed and presented, but the secondary video set SCDVS recorded on the information storage medium DISC in this embodiment cannot be directly played back. In this embodiment, information in the primary video set PRMVS is recorded in the aforementioned persistent storage PRSTR, and can be directly played back from the persistent storage PRSTR. More specifically, when the secondary video set SCDVS is recorded on the network server NTSRV, whole of the secondary video set SCDVS are once stored in the file cache FLCCH (data cache DTCCH) or the persistent storage PRSTR, and are then played back. This embodiment is not limited to this. For example, a part of the secondary video set SCDVS recorded on the network server NTSRV is once stored in the streaming buffer within the range in which the streaming buffer does not overflow, as needed, and can be played back from there.

<Secondary Video Set> (Continued)

Secondary Video Set can carry three types of Presentation Objects, Substitute Audio Video, Substitute Audio and Secondary Audio Video. Secondary Video Set may be provided from Disc, Network Server, Persistent Storage or File Cache in a player. The data structure of Secondary Video Set is a simplified and modified structure of Advanced VTS. It consists of Time Map (TMAP) with attribute information and Secondary Enhanced Video Object (S-EVOB). Secondary Video Set shall be played back by the Secondary Video Player.

More intelligible explanations will be provided below.

The secondary video set SCDVS can carry three different types of presentation objects, i.e., a substitute audio video SBTAV, a substitute audio SBTAD, and secondary audio video SCDAV. The secondary video set SCDVS may be provided from the information storage medium DISC, network server NTSRV, persistent storage PRSTR, file cache FLCCH, or the like. The data structure of the secondary video set SCDVS is a simplified and partially modified structure of the advanced video title set ADVTS. The secondary video set SCDVS consists of time map TMAP and secondary enhanced video object S-EVOB. The secondary video set SCDVS shall be played back by the secondary video player SCDVP.

Components of the secondary video set SCDVS shown in FIG. 7 will be described below.

Basically, the secondary video set SCDVS indicates data which is obtained by reading information from the persistent storage PRSTR or via the network, i.e., from a location other than the information storage medium DISC in this embodiment, and presenting the read information by partially substituting for the primary video set PRMVS described above. That is, the main audio decoder MADEC shown in FIG. 7 is common to that of the primary video player PRMVP and the secondary video player SCDVP. When the content of the secondary video set SCDVS is to be played back using the main audio decoder MADEC in the secondary video player SCDVP, the sub audio SUBAD of the primary video set PRMVS is not played back by the primary video player PRMVP, and is output after it is substituted by data of the secondary video set SCDVS. The secondary video set SCDVS consists of three different types of objects, i.e., the substitute audio video SBTAV, substitute audio SBTAD, and secondary audio video SCDAV. A main audio MANAD in the substitute audio SBTAD is basically used when it substitutes for the main audio MANAD in the primary video set PRMVS. The substitute audio video SBTAV consists of the main video MANDV and the main audio MANAD. The substitute audio SBTAD consists of one main audio stream MANAD. For example, when the main audio MANAD recorded in advance on the information storage medium DISC as the primary video set PRMVS records Japanese and English in correspondence with video information of the main video MANVD, the main audio MANAD can only present Japanese or English audio information upon presentation to the user. By contrast, this embodiment can attain as follows. That is, for a user who speaks Chinese as the native language, Chinese audio information recorded in the network server NTSRV is downloaded via the network, and audio information upon playing back the main video MANVD of the primary video set PRMVS can be output instead of presenting the audio information in Japanese or English while it is substituted by Chinese as the main audio MANAD of the secondary video set SCDVS. Also, the sub audio SUBAD of the secondary video set SCDVS can be used when audio information synchronized with the window of the sub video SUBVD of the secondary audio video SCDAV is to be presented upon presentation on two windows (e.g., when comment information of a director is simultaneously presented to be superposed on the main audio MANAD which is output in synchronism with the main video MANVD of the primary video set PRMVS described above).

<Secondary Audio Video>

Secondary Audio Video contains zero or one Sub Video stream and zero to eight Sub Audio streams. This is used for addition to Primary Video Set or substitution of Sub Video stream and Sub Audio stream in Primary Video Set.

More intelligible explanations will be provided below.

In this embodiment, the secondary audio video SCDAV contains zero or one sub video SUBVD and zero to eight sub audio SUBAD. In this embodiment, the secondary audio video SCDAV is used to be superimposed on (in addition to) the primary video set PRMVS. In this embodiment, the secondary audio video SCDAV can also be used as a substitution for the sub video SUBVD and sub audio SUBAD in the primary video set PRMVS.

<Secondary Audio Video> (Continued)

Secondary Audio Video replaces Sub Video and Sub Audio presentations of Primary Audio Video. It may consist of Sub Video stream with/without Sub Audio stream or Sub Audio stream only. While being played back one of presentation stream in Secondary Audio Video, it is prohibited to be played Sub Video stream and Sub Audio stream in Primary Audio Video. The container format of Secondary Audio Video is Secondary Video Set.

More intelligible explanations will be provided below.

The secondary audio video SCDAV replaces the sub video SUBVD and sub audio SUBAD in the primary video set PRMVS. The secondary audio video SCDAV has the following cases.

1) Case of consisting of the video SUBAD stream only;
2) Case of consisting both the sub video SUBVD and sub audio SUBAD; and
3) Case of consisting of the sub audio SUBAD only.

At the time of playing back a stream in the secondary audio video SCDAV, the sub video SUBVD and sub audio SUBAD in the primary audio video PRMAV cannot be played back. The secondary audio video SCDAV is included in the secondary video set SCDVS.

<Advanced Application>

An Advanced Application consists of one Manifest file, Markup file(s) (including content/style/timing/layout information), Script file(s), Image file(s) (JPEG/PNG/MNG/Capture Image Format), Effect Audio file(s) (LPCM wrapped by WAV), Font file(s) (Open Type) and others. A Manifest file gives information for display layout, an initial Markup file to be executed, Script file(s) and resources in the Advanced Application.

More intelligible explanations will be provided below.

The advanced application ADAPL in FIG. 7 consists of information such as a markup file MRKUP, script file SCRPT, still picture IMAGE, effect audio file EFTAD, font file FONT, and others. As described above, these pieces of information of the advanced application ADAPL are used once they are stored in the file cache. Information related with downloading to the file cache FLCCH (data cache DTCCH) is recorded in a manifest file MNFST (to be described later). Also, information of the download timing and the like of the advanced application ADAPL is described in resource information RESRCI in the playlist PLLST. In this embodiment, the manifest file MNFST also contains information related with loading of the markup file MRKUP information executed initially, information required upon loading information recorded in the script file SCRPT onto the file cache FLCCH (data cache DTCCH), and the like.

<Advanced Application> (Continued)

Advanced Application provides three functions. The first is to control entire presentation behavior of Advanced Content. The next is to realize graphical presentation, such as menu buttons, over the video presentation. The last is to control effect audio playback. Advanced Navigation files of Advanced Application, such as Manifest, Script and Markup, define the behavior of Advanced Application. Advanced Element files are used for graphical and audio presentation.

More intelligible explanations will be provided below.

The advanced application ADAPL provides the following three functions.

The first function is a control function (e.g., jump control between different frames) for presentation behavior of the advanced content ADVCT. The second function is a function of realizing graphical presentation of menu buttons and the like. The third function is an effect audio playback control function. An advanced navigation file ADVNV contains a manifest MNFST, script file SCRPT, markup file MRKUP, and the like to implement the advanced application ADAPL. Information in an advanced element file ADVEL is related with a still picture IMAGE, font file FONT, and the like, and is used as presentation icons and presentation audio upon graphical presentation and audio presentation of the second function.

<Advanced Subtitle>

An advanced subtitle ADSBT is also used after it is stored in the file cache FLCCH (data cache DTCCH) as in the advanced application ADAPL. Information of the advanced subtitle ADSBT can be fetched from the information storage medium DISC or persistent storage PRSTR, or via the network. The advanced subtitle ADSBT in this embodiment basically contains a substituted explanatory title or telop for a conventional video information or images such as pictographic characters, still pictures, or the like. As for substitution of the explanatory title, it is basically formed based on text other than the images, and can also be presented by changing the font file FONT. Such advanced subtitles ADSBT can be added by downloading them from the network server NTSRV. For example, a new explanatory title or a comment for a given video information can be output while playing back the main video MANVD in the primary video set PRMVS stored in the information storage medium DISC. As described above, the following use method is available. That is, when the sub-picture SUBPT stores only Japanese and English subtitles as, for example, the subtitles in the primary video set PRMVS, the user who speaks Chinese as the native language downloads a Chinese subtitle as the advanced subtitle ADSBT from the network server NTSRV via the network, and presents the downloaded subtitle. The data type in this case is set as the type of markup file MRKUPS for the advanced subtitle ADSBT or font file FONT.

<Advanced Subtitle> (Continued)

Advanced Subtitle is used for subtitle synchronized with video, which may be substitution of the Sub-picture data. It consists of one Manifest file for Advanced Subtitle, Markup file(s) for Advanced Subtitle (including content/style/timing/layout information), Font file(s) and Image file(s). The Markup file for Advanced Subtitle is a subset of Markup for Advanced Application.

More intelligible explanations will be provided below.

In this embodiment, the advanced subtitle ADSBT can be used as a subtitle (explanatory title or the like) which is presented in synchronism with the main video MANVD of the primary video set PRMVS. The advanced subtitle ADSBT can also be used as simultaneous presentation (additional presentation processing) for the sub-picture SUBPT in the primary video set PRMVS or as a substitute for the sub-picture SUBPT of the primary video set PRMVS. The advanced subtitle ADSBT consists of one manifest file MNFSTS for the advanced subtitle ADSBT, markup file(s) MRKUPS for the advanced subtitle ADSBT, font file(s) FONTS and image file(s) IMAGES. The markup file MRKUPS for the advanced subtitle ADSBT exists as a subset of the markup file MRKUP of the advanced application ADAPL.

<Advanced Subtitle> (Continued)

Advanced Subtitle provides subtitling feature. Advanced Content has two means for subtitling. The one is by using with Sub-picture stream in Primary Audio Video as well as Sub-picture function of Standard Content. The other is by using with Advanced Subtitle. Both means shall not be used at the same time. Advanced Subtitle is a subset of Advanced Application.

More intelligible explanations will be provided below.

The advanced content ADVCT has two means for a subtitle.

As the first mean, the subtitle is used as a sub-picture stream in the primary audio PRMAV as in the sub-picture function of the standard content STDCT. As the second mean, the subtitle is used as the advanced subtitle ADSBT. Both means shall not be used in both the purposes at the same time. The advanced subtitle ADSBT is a subset of the advanced application ADAPL.

<Advanced Stream>

Advanced Stream is a data format of package files containing one or more Advanced Content files except for Primary Video Set. Advanced Stream is multiplexed into Primary Enhanced Video Object Set (P-EVOBS) and delivered to File Cache with P-EVOBS data supplying to Primary Video Player. The same files which are multiplexed in P-EVOBS and are mandatory for Advanced Content playback, should be stored as files on Disc. These duplicated copies are necessary to guarantee Advanced Content playback. Because Advanced Stream supply may not be finished, when Advanced Content playback is jumped. In this case, necessary files are directly copied by File Cache Manager from Disc to Data Cache before re-starting playback from specified jump timing.

More intelligible explanations will be provided below.

An advanced stream is a data format of package files containing one or more advanced content files ADVCT except for the primary video set PRMVS. The advanced stream is recorded to be multiplexed in a primary enhanced video object set P-EVOBS, and is delivered to the file cache FLCCH (data cache DTCCH). This primary enhanced video object set P-EVOBS undergoes playback processing by the primary video player PRMVP. These files which are recorded to be multiplexed in the primary enhanced video object set P-EVOBS are mandatory for playback of the advanced content ADVCT, and should be stored on the information storage medium DISC of this embodiment to have a file structure.

<Advanced Navigation>

Advanced Navigation files shall be located as files or archived in package file. Advanced Navigation files are read and interpreted for Advanced Content playback. Playlist, which is Advanced Navigation file for startup, shall be located on "ADV_OBJ" directory. Advanced Navigation files may be multiplexed in P-EVOB or archived in package file which is multiplexed in P-EVOB.

More intelligible explanations will be provided below.

Files related with the advanced navigation ADVNV are used in interrupt processing upon playback of the advanced content ADVCT.

<Primary Audio Video>

Primary Audio Video can provide several presentation streams, Main Video, Main Audio, Sub Video, Sub Audio and Sub-picture. A player can simultaneously play Sub Video and Sub Audio, in addition to Main Video and Main Audio. Primary Audio Video shall be exclusively provided from Disc. The container format of Primary Audio Video is Primary Video Set. Possible combination of video and audio presentation is limited by the condition between Primary Audio Video and other Presentation Object which is carried by Secondary Video Set. Primary Audio Video can also carry various kinds of data files which may be used by Advanced Application, Advanced Subtitle and others. The container stream for these files is called Advanced Stream.

More intelligible explanations will be provided below.

The primary audio video PRMAV is composed of streams containing a main video MANVD, main audio MANAD, sub video SUBVD, sub audio SUBAD, and sub-picture SUBPT. The information playback apparatus can simultaneously play back the sub video SUBVD and sub audio SUBAD, in addition to the main video MANVD and main audio MANAD. The primary audio video PRMAV shall be recorded in the information storage medium DISC or the persistent storage PRSTR. The primary audio video PRMAV is included as a part of the primary video set PRMVS. Possible combination of video and audio presentation is limited by the condition between the primary audio video PRMAV and the secondary video set SDCVS. The primary audio video PRMAV can also carry various kinds of data files which may be used by the advanced application ADAPL, advanced subtitle ADSBT, and others. The stream contained in these files are called an advanced stream.

<Substitute Audio>

Substitute Audio replaces the Main Audio presentation of Primary Audio Video. It shall consist of Main Audio stream only. While being played Substitute Audio, it is prohibited to be played back Main Audio in Primary Video Set. The container format of Substitute Audio is Secondary Video Set. If Secondary Video Set includes Substitute Audio Video, then Secondary Video Set can not contain Substitute Audio.

More intelligible explanations will be provided below.

The substitute audio SBTAD replaces the main audio MANAD presentation of the primary audio video PRMAV. This substitute audio SBTAD shall consists of a main audio MANAD stream only. Wile being played the substitute audio SBTAD, it is prohibited to be played back the main audio MANAD in the primary video set PRMVS. The substitute audio SBTAD is contained in the secondary video set SCDVS.

<Primary Enhanced Video Object (P-EVOB) for Advanced Content>

Primary Enhanced Video Object (P-EVOB) for Advanced Content is the data stream which carries presentation data of Primary Video Set. Primary Enhanced Video Object for Advanced Content is just referred as Primary Enhanced Video Object or P-EVOB. Primary Enhanced Video Object complies with Program Stream prescribed in "The system part of the MPEG-2 standard (ISO/IEC 13818-1)". Types of presentation data of Primary Video Set are Main Video, Main Audio, Sub Video, Sub Audio and Sub-picture. Advanced Stream is also multiplexed into P-EVOB.

Possible pack types in P-EVOB are followings.
Navigation Pack (NV_PCK)
Main Video Pack (VM_PCK)
Main Audio Pack (AM_PCK)
Sub Video Pack (VS_PCK)
Sub Audio Pack (AS_PCK)
Sub-picture Pack (SP_PCK)
Advanced Pack (ADV_PCK)

Time Map (TMAP) for Primary Video Set specifies entry points for each Primary Enhanced Video Object Unit (P-EVOBU).

Access Unit for Primary Video Set is based on access unit of Main Video as well as traditional Video Object (VOB) structure. The offset information for Sub Video and Sub Audio is given by Synchronous Information (SYNCI) as well as Main Audio and Sub-picture.

Advanced Stream is used for supplying various kinds of Advanced Content files to the File Cache without any interruption of Primary Video Set playback. The demux module in the Primary Video Player distributes Advanced Stream Pack (ADV_PCK) to the File Cache Manager in the Navigation Manager.

More intelligible explanations will be provided below.

The primary enhanced video object P-EVOB for the advanced content ADVCT is the data stream which carries presentation data of the primary video set PRMVS. As the types of presentation data of the primary video set PRMVS, the main video MANVD, main audio MANAD, sub video SUBVD, sub audio SUBAD, and sub-picture SUBPT are included. In this embodiment, as packs included in the primary enhanced video object P-EVOB, a navigation pack NV_PCK exists as in the existing DVD and the standard content STDCT, and an advanced stream pack that records the advanced stream exists. In this embodiment, offset information to the sub video SUBVD and sub audio SUBAD is recorded in synchronous information SYNCI as in the main audio MANAD and sub-picture SUBPT.

<File Structure>

Figure 15:
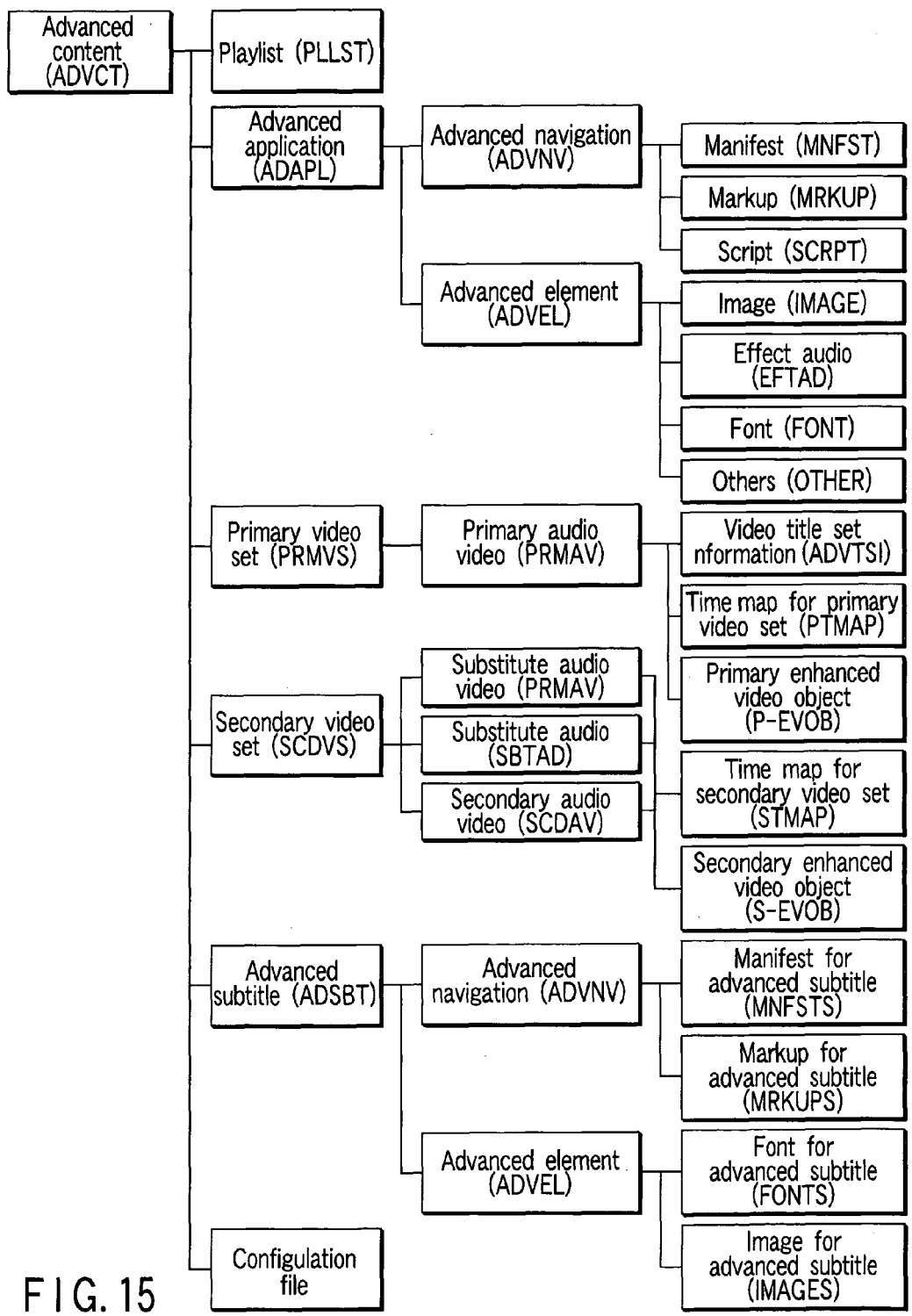
FIG. 15 is an exemplary view showing the file configuration when various object streams are recorded on an information storage medium.
Figure 19B:
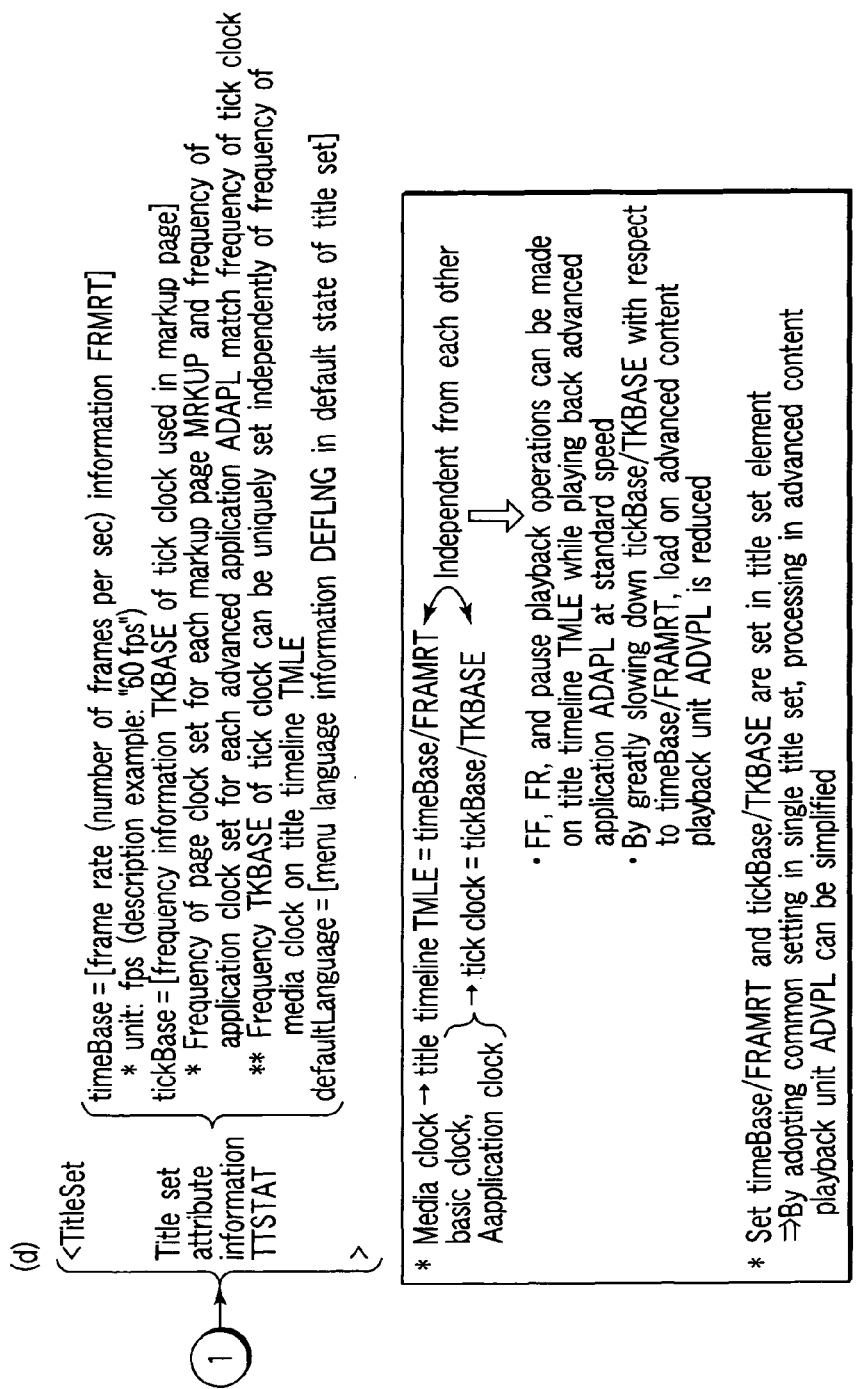

FIG. 15 shows the file structure when various object streams shown in FIG. 7 are recorded on the information storage medium DISC. In this embodiment, as for the advanced content ADVCT, an advanced content directory ADVCT is allocated immediately under the root directory of the information storage medium DISC, and all files are recorded in that directory. A playlist file PLLST that records information related with playback exists under the advanced content directory ADVCT. Together with this file, an advanced application directory ADAPL that records information related with the advanced application, a primary video set directory PRMVS that records information related with the primary video set, a secondary video set directory SCDVS that records information related with the secondary video set, and an advanced subtitle directory ADSBT that records information related with the advanced subtitle are recorded.

Under the advanced application directory ADAPL, an advanced navigation directory ADVNV that records management information related with the advanced application, and an advanced element directory ADVEL that records information related with various advanced elements (object information and the like) use in the advanced application. The advanced navigation directory ADVNV includes a manifest file MNFST related with a manifest which records the relationship among various kinds of management information used in the advanced application and information lists required for network downloading together, a markup file MRKUP which records markup data related with page layouts and the like, a script file SCRPT which records script commands. The advanced element directory ADVEL includes a still picture file IMAGE which records still pictures, an effect audio file EFTAD which records effect audio data, a font file FONT which records font information, and other file OTHER.

Under the primary video set directory PRMVS, a primary audio video directory PRMAV exists. This directory includes a video title set information file ADVTSI which records attribute information and management information related with the enhanced video objects of the primary audio video, a time map file PTMAP of the primary video set which records time map information used to convert time information of the primary video set into address information, and a primary enhanced video object file P-EVOB which records the primary enhanced video objects.

Under the secondary video set directory SCDVS, a substitute audio directory SBTAD and secondary audio video directory SCDAV exist. Under the secondary audio video directory SCDAV, a time map file STMAP of the secondary video set which records time map information used to convert time information of the secondary video set into address information, and a secondary enhanced video object file S-EVOB which records the secondary enhanced video objects exist. Under the substitute audio directory SBTAD as well, the time map file STMAP used to convert time information of the secondary video set into address information, and the secondary enhanced video object file S-EVOB can be stored.

Under the advanced subtitle directory ADSBT, an advanced navigation directory ADVNV which records management information related with the advanced subtitle, and an advanced element directory ADVEL as element information of the advanced subtitle exist. The advanced navigation directory ADVNV includes a manifest file MNFSTS of the advanced subtitle, and a markup file MRKUPS of the advanced subtitle. The manifest file MNFSTS of the advanced subtitle records the relationship among various kinds of management information related with the advanced subtitle and information required for network downloading. The markup file MRKUPS of the advanced subtitle records markup information used to designate the presentation position of the advanced subtitle on the screen and the like. The advanced element directory ADVEL includes a font file FONTS of the advanced subtitle which records font information of the advanced subtitle.

<Directories for Advanced Content>

"Directories for Advanced Content" may exist only under the "ADV_OBJ" directory. Any files of Advanced Navigation, Advanced Element and Secondary Video Set can reside at this directory. The name of this directory shall be consisting of character set defined in Files for Advanced Content below. The total number of "ADV_OBJ" sub-directories (excluding "ADV_OBJ" directory) shall be less than 512. Directory depth shall be equal or less than 8 from "ADV_OBJ" directory.

More intelligible explanations will be provided below.

The name of the advanced content directory ADVCT and directories and filenames included in this directory are described using d-characters or dl-characters. Sub-directories exist under the advanced content directory ADVCT. The depth of layers of the sub-directories is eight layers or less, and the total number of sub-directories shall be less than 512 in this embodiment. If the directories are too deep, or if the total number of sub-directories is too large, accessibility drops. Therefore, in this embodiment, high-speed access is assured by limiting the number of layers and that of directories.

<Files for Advanced Content>

The total number of files under the "ADV_OBJ" directory shall be limited to 512×2047, and the total number of files in each directory shall be less than 2048. Character code set "A to Z a to z 0 to 9 SP ! $ & ' ( )+ , − . = @ _" (20h, 21h, 24h to 29h, 2Bh to 2Eh, 30h to 39h, 3Bh, 3Dh, 40h to 5Ah, 5Fh, 61h to 7Ah in ISO 8859-1) are used for filename. The length of the filename shall be equal to or less than 255 characters. For use of the filename, following rule shall be applied.

A disc may have characters in both upper case and lower case.
 A disc must not have the same filename where only the difference case character. (e.g. test.jpg and TEST.JPG must not co-exist in a disc)
 Filename referred in XML/Script document shall match the filename for Advanced Element in a disc/Persistent Storage/network. <case-sensitive> (e.g. test.jpg is not linked to TEST.JPG)

More intelligible explanations will be provided below.

The total number of files that can be recorded under the advanced content directory ADVCT shall be limited to be 512×2047, and the total number of files that can be recorded in each directory is shall be less than 2048. The filename adopts a structure in which a dot "." is allocated after each filename, and an extension is allocated after the dot ".". The advanced content directory ADVCT is recorded directly under the root directory of the information storage medium, and the playlist file PLLST is recorded directly under this advanced content directory ADVCT.

<Playlist>

A Playlist file shall reside under "ADV_OBJ" directory with having the filename "VPLST%%%.XPL" for a player which connects with a display device, or the filename "APLST&&&.XPL" for a player which doesn't connect with a display device, in case of Category 2 disc and Category 3 disc. If the Playlist file is necessary to be read in the startup sequence, the Playlist file shall reside directly under "ADV_OBJ" directory (its sub-directories are not included), and "%%%" and "&&&" are described by the value "000" to "999". In this case, the Playlist file which has the maximum number shall be read initially in the startup sequence.

More intelligible explanations will be provided below.

A plurality of playlist files PLLST can be recorded on the information storage medium DISC. As the playlist file PLLST, two different types of playlist files PLLST can be set. The filename of a playlist file PLLST which is directly accessed by the information playback apparatus upon playback is set to be "VPLIST%%%.XML", and that of a playlist file PLLST which is not directly accessed by the information playback apparatus is set to be "APLIST&&&.XML". Note that "%%%" and "&&&" store numerals ranging from 000 to 999.

<Filename for Advanced Video Title Set (Advanced VTS)>

The filename for Video Title Set Information shall be "HVA00001.VTI".

The filename for Enhanced Video Object shall have extension of "EVO".

The filename of Time Map Information for Contiguous Block shall have same body in filename as that of a corresponding EVOB, with extension of "MAP".

The filename of Time Map Information for Interleaved Block shall have same body in filename as that of corresponding EVOBs, with extension of "MAP".

The filename of Time Map Information for Standard VTS referred in Advanced Content shall be "HVSO@@@@.MAP".

"@@@@" shall be four characters of "0001" to "1998" which are same number as EVOB index number assigned to each EVOBI and TMAP.

More intelligible explanations will be provided below.

The advanced video title set information file ADVTSI shown in FIG. 15 shall have a filename of "HVA00001.VTI". The extension of the filename of the primary enhanced video object file P-EVOB and that of the secondary enhanced video object file S-EVOB shall be "EVO". The extension of the filename of the time map file PTMAP of the primary video set and that of the time map file STMAP of the secondary video set shall be "MAP".

The number of files of the primary video set time map files PTMAP and secondary video set time map files STMAP shall be limited to 999 or fewer. By specifying the number of time map files, speeding up of access control to the enhanced object EVOB is guaranteed.

FIGS. 6A, 6B, and 6C show the data structure of an advanced content and explanations of effects and the like.

<Advanced Content>

Advanced Content realizes more interactivity in addition to the extension of audio and video realized by Standard Content. Advanced Content consists of followings.

Playlist
 Primary Video Set
 Secondary Video Set
 Advanced Application
 Advanced Subtitle Playlist gives playback information among presentation objects as shown in FIG. 6A. For instance, to play back Primary Video Set, a player reads a TMAP file by using URI described in the Playlist, interprets an EVOBI referred by the TMAP and access appropriate P-EVOB defined in the EVOBI. To present Advanced Application, a player reads a Manifest file by using URI described in the Playlist, and starts to present an initial Markup file described in the Manifest file after storing resource elements (including the initial file).

More intelligible explanations will be provided below.

In this embodiment, there is provided the advanced content ADVCT which further extends the audio and video expression format implemented by the standard content STDCT and realizes interactivity. The advanced content ADVCT consists of the playlist PLLST, the primary video set PRMVS, secondary video set SCDVS, advanced application ADAPL, and advanced subtitle ADSBT shown in FIG. 7. The playlist PLLST shown in FIG. 6A records information related with the playback methods of various kinds of object information, and these pieces of information are recorded as one playlist file PLLST under the advanced content directory ADVCT, as shown in FIG. 15.

<Playlist> (Again)

A Playlist file is described by XML and one or more Playlist file are located on a disc. A player interprets initially a Playlist file to play back Advanced Content. The Playlist file consists of following information.

Object Mapping Information
 Track Number Assignment Information
 Track Navigation Information
 Resource Information
 Playback Sequence Information
 System Configuration Information
 Scheduled Control Information More intelligible explanations will be provided below.

The playlist PLLST or the playlist file PLLST which records the playlist PLLST is described using XML, and one or more playlist files PLLST are recorded in the information storage medium DISC. In the information storage medium DISC which records the advanced content ADVCT that belongs to category 2 or category 3 in this embodiment, the information playback apparatus searches for the playlist file PLLST immediately after insertion of the information storage medium DISC. In this embodiment, the playlist file PLLST includes the following information.

1) Object mapping information OBMAPI

Object mapping information OBMAPI is set as playback information related with objects such as the primary video set PRMVS, secondary video set SCDVS, advanced application ADAPL, advanced subtitle ADSBT, and the like. In this embodiment, the playback timing of each object data is described in the form of mapping on a title timeline to be described later. In the object mapping information OBMAPI, the locations of the primary video set PRMVS and secondary video set SCDVS are designated with reference to a location (directory or URL) where their time map file PTMAP or time map file STMAP exists. In the object mapping information OBMAPI, the advanced application ADAPL and advanced subtitle ADSBT are determined by designating the manifest file MNFST corresponding to these objects or its location (directory or URL).

2) Track number assignment information

This embodiment allows to have a plurality of audio streams and sub-picture streams. On the playlist PLLST, information indicating what number of stream data is to be presented is described. The information indicating what number of stream is used is described as a track number. As the track number to be described, video track numbers for video streams, sub video track numbers for sub video streams, audio track numbers for audio streams, sub audio track numbers for sub audio streams, subtitle track numbers for subtitle streams, and application track numbers for application streams are set.

3) Track navigation information TRNAVI

Track navigation information TRNAVI describes related information for the assigned track numbers, and records attribute information for respective track numbers as lists for the sake of convenience for user's selection. For example, language codes and the like are recorded in the navigation information for respective track numbers: track No. 1=Japanese; track No. 2=English; track No. 3=Chinese; and so forth. By utilizing the track navigation information TRNAVI, the user can immediately determine a favorite language.

4) Resource information RESRCI

Resource information RESRCI indicates timing information such as a time limit of transfer of a resource file into the file cache and the like. This resource information also describes reference timings of resource files and the like in the advanced application ADAPL.

5) Playback sequence information PLSQI

Playback sequence information PLSQI describes information, which allows the user to easily execute jump processing to a given chapter position, such as chapter information in a single title and the like. This playback sequence information PLSQI is presented as a time designation point on a title timeline TMLE.

6) System configuration information

System configuration information records structural information required to constitute a system such as a stream buffer size that represents the data size required upon storing data in the file cache via the Internet, and the like.

7) Scheduled control information SCHECI

Scheduled control information SCHECI records schedule indicating pause positions (timings) and event starting positions (timings) on the title timeline TMLE.

<Data Reference from Playlist>

FIG. 6A shows the data reference method to respective objects by the playlist PLLST. For example, when specific primary enhanced object P-EVOB is to be played back on the playlist PLLST, that primary enhanced object P-EVOB shall be accessed after enhanced video object information EVOBI which records its attribute information is referred to The playlist PLLST specifies the playback range of the primary enhanced object P-EVOB as time information on the timeline. For this reason, the time map information PTMAP of the primary video set shall be referred to first as a tool used to convert the designated time information into the address position on the information storage medium DISC. Likewise, the playback range of secondary enhanced video object S-EVOB is also described as time information on the playlist PLLST. In order to search the data source of the secondary enhanced video object S-EVOB on the information storage medium DISC within that range, the time map information STMAP of the secondary video set SCDVS is referred to first. Data of the advanced application ADAPL shall be stored on the file cache before they are used by the information playback apparatus, as shown in FIG. 7. For this reason, in order to use various data of the advanced application ADAPL, the manifest file MNFST shall be referred to from the playlist PLLST to transfer various resource files described in the manifest file MNFST (the storage locations and resource filenames of the resource files are also described in the manifest file MNFST) onto the file cache FLCCH (data cache DTCCH). Similarly, in order to user various data of the advanced subtitle ADSBT, they shall be stored on the file cache FLCCH (data cache DTCCH) in advance. By utilizing the manifest file MNFSTS of the advanced subtitle ADSBT, data transfer to the file cache FLCCH (data cache DTCCH) can be made. Based on the markup file MRKUPS in the advanced subtitle ADSBT, the representation position and timing of the advanced subtitle ADSBT on the screen can be detected, and the font file FONTS in the advanced subtitle ADSBT can be utilized when the advanced subtitle ADSBT information is presented on the screen.

<Reference to Time Map>

In order to present the primary video set PRMVS, the time map information PTMAP shall be referred to and access processing to primary enhanced video object P-EVOB defined by the enhanced video object information EVOBI shall be executed.

<Network Route>

FIG. 1 shows an example of the network route from the network server NTSRV to the information recording and playback apparatus 1, which goes through the router 11 in the home via the optical cable 12 to attain data connection via a wireless LAN in the home. However, this embodiment is not limited to this. For example, this embodiment may have another network route. FIG. 1 illustrates a personal computer as the information recording and playback apparatus 1. However, this embodiment is not limited to this. For example, a single home recorder or a single home player may be set as the information recording and playback apparatus. Also, data may be directly displayed on the monitor by a wire without using the wireless LAN.

In this embodiment, the network server NTSRV shown in FIG. 1 stores information of the secondary video set SCDVS, advanced application ADAPL, and advanced subtitle ADSBT shown in FIG. 7 in advance, and these pieces of information can be delivered to the home via the optical cable 12. Various data sent via the optical cable 12 are transferred to the information recording and playback apparatus 1 in the form of wireless data 17 via the router 11 in the home. The router 11 comprises the wireless LAN controller 7-2, data manager 9, and network controller 8. The network controller 8 controls data updating processing with the network server NTSRV, and the wireless LAN controller 7-2 transfers data to the home wireless LAN. The data manager 9 controls such data transfer processing. Data of various contents of the secondary video set SCDVS, advanced application ADAPL, and advanced subtitle ADSBT, which are sent to be multiplexed on the wireless data 17 from the router 11, are received by the wireless LAN controller 7-1, and are then sent to the advanced content playback unit ADVPL, and some data are stored in the data cache DTCCH shown in FIG. 13. The information playback apparatus of this embodiment incorporates the advanced content playback unit ADVPL which plays back the advanced content ADVCT, the standard content playback unit STDPL which plays back the standard content STDCT, and the recording and playback processor 4 which performs video recording on the recordable information storage medium DISC or the hard disk device 6 and can play back data from there. These playback units and the recording and playback processor 4 are organically controlled by the main CPU 5. As shown in FIG. 1, information is played back or recorded from or on the information storage medium DISC in the information recording and playback unit 2. In this embodiment, media to be played back by the advanced content playback unit ADVPL are premised on playback of information from the information recording and playback unit 2 or the persistent storage drive (fixed or portable flash memory drive) 3. In this embodiment, as described above, data recorded on the network server NTSRV can also be played back. In this case, as described above, data saved in the network server NTSRV go through the optical cable 12, go through the wireless LAN controller 7-2 in the router 11 under the network control in the router 11 to be transferred in the form of wireless data 17, and are then transferred to the advanced content playback unit ADVPL via the wireless LAN controller 7-1. Video information to be played back by the advanced content playback unit ADVPL can be displayed on the wide-screen TV monitor 15 from the wireless LAN controller 7-1 in the form of wireless data 18 when it can be displayed on the display 13 or when a user request of presentation on a wider screen is detected. The wide-screen TV monitor 15 incorporates the video processor 24, video display unit 21, and wireless LAN controller 7-3. The wireless data 18 is received by the wireless LAN controller 7-3, then undergoes video processing by the video processor 24, and is displayed on the wide-screen TV monitor 15 via the video display unit 21. At the same time, audio data is output via the loudspeakers 16-1 and 16-2. The user can make operations on a window (menu window or the like) displayed on the display 13 using the keyboard 14.

<Internal Structure of Advanced Content Playback Unit>

Figure 13:
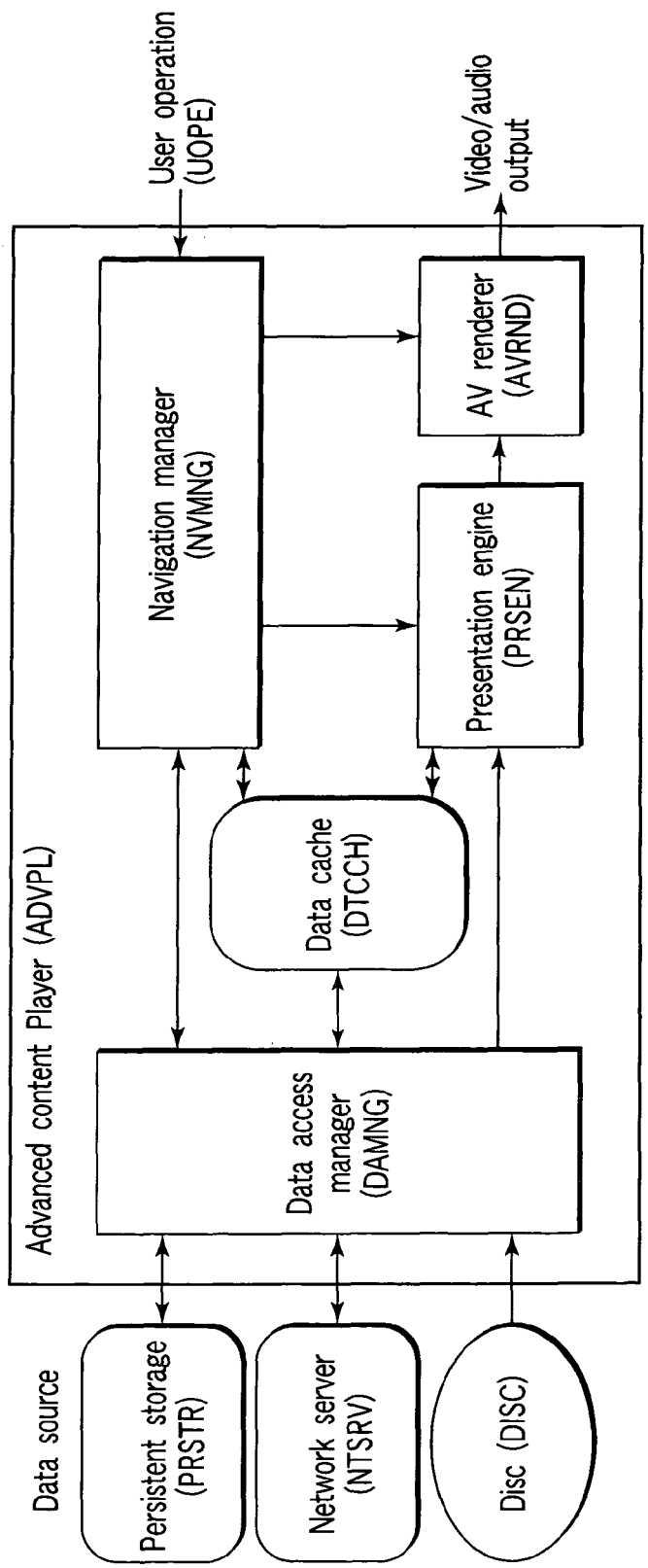
FIG. 13 is an exemplary block diagram showing the internal structure of an advanced content playback unit.

The internal structure of the advanced content playback unit ADVPL in the system explanatory diagram shown in FIG. 1 will be described below with reference to FIG. 13. In this embodiment, the advanced content playback unit ADVPL comprises the following five logical functional modules.

<Data Access Manager>

Data Access Manager is responsible to exchange various kind of data among data sources and internal modules of Advanced Content Player.

More intelligible explanations will be provided below.

A data access manager DAMNG is used to manage data exchange between the external data source where the advanced content ADVCT is recorded, and modules in the advanced content playback unit ADVPL. In this embodiment, as the data source of the advanced content ADVCT, the persistent storage PRSTR, network server NTSRV, and information storage medium DISC are premised, and the data access manager DAMNG exchanges information from them. Various kinds of information of the advanced content ADVCT are exchanged with a navigation manager NVMNG (to be described later), the data cache DTCCH, and a presentation engine PRSEN via the data access manager DAMNG.

<Data Cache>

Data Cache is temporal data storage for Advanced Content playback.

More intelligible explanations will be provided below.

The data cache DTCCH is used as a temporal data storage (temporary data save location) in the advanced content playback unit ADVPL.

<Navigation Manager>

Navigation Manager is responsible to control all functional modules of Advanced Content player in accordance with descriptions in Advanced Application. Navigation Manager is also responsible to control user interface devices, such as remote controller or front panel of a player. Received user interface device events are handled in Navigation Manager.

More intelligible explanations will be provided below.

The navigation manager NVMNG controls all functional modules of the advanced content playback unit ADVPL in accordance with the description contents of the advanced application ADAPL. This navigation manager NVMNG also makes control in response to a user operation UOPE. The user operation UOPE is generated based on key in on a front panel of the information playback apparatus, that on a remote controller, and the like. Information received from the user operation UOPE generated in this way is processed by the navigation manager NVMNG.

<Presentation Engine>

Presentation Engine is responsible for playback of presentation materials, such as Advanced Element of Advanced Application, Advanced Subtitle, Primary Video Set and Secondary Video set.

The presentation engine PRSEN performs presentation playback of the advanced content ADVCT.

<AV Renderer>

AV Renderer is responsible to composite video inputs and mix audio inputs from other modules and output to external devices such as speakers and display.

More intelligible explanations will be provided below.

An AV renderer AVRND executes composition processing of video information and audio information input from other modules, and externally outputs composite information to the loudspeakers 16-1 and 16-2, the wide-screen TV monitor 15, and the like. The audio information used in this case may be either independent stream information or audio information obtained by mixing the sub audio SUBAD and main audio MANAD.

<Implementation of Automatic Updating of Object Information, etc.>

A practical example of new effects obtained as a result of the technical devices according to this embodiment, which have been described using FIGS. 2A, 2B, and 2C, will be described below with reference to FIGS. 3A and 3B. As a method of exhibiting a new effect 5.1) "Automatic updating of object information and intra-disc management information" of 5] "Provide information update function on disc using network," in this embodiment, as shown in FIGS. 3A and 3B, the commercial 44 as commercial information, the independent window 32 for a commercial, the telop commercial 43, and the preview 41 can always be supplied to the user as the latest video information. This point is a large technical feature in this embodiment.

By always changing the preview 41 to the latest information, the preview of the movie can be timely conducted to the users so as to create an opportunity to call them to a movie theater. In this embodiment, since the commercials (commercial 44, independent window 32 for a commercial, and telop commercial 43) are presented to be linked with playback of the main title 31, sponsor charges are collected from commercial sponsors like in normal TV broadcasting, thus holding down the sales prices of the information storage media to the users. The concept of insertion of commercials into video information has been popularly proposed conventionally. In this embodiment, the latest commercial information is read from the network server NTSRV and the latest commercial information is presented to be linked with showing of the main title 31 recorded on the information storage medium DISC. This point is a large technical feature in this embodiment. The latest preview 41 and commercial information are sequentially updated and saved in the network server NTSRV shown in FIG. 1, and are downloaded via the network in synchronism with the playback timing of the main title 31 recorded in the information storage medium DISC. The relationship between respective objects shown in FIGS. 3A and 3B and those shown in FIG. 7 will be described below.

In FIGS. 3A and 3B, the main title 31 includes the main video MANVD and main audio MANAD of the primary audio video PRMAV in the primary video set PRMVS. The preview 41, commercial 44, and independent window 32 for a commercial are also recorded as the sub video SUBVD and sub audio SUBAD of the primary audio video PRMAV in the primary video set PRMVS in the information storage medium DISC. However, when a specific period of time has elapsed after creation of the information storage medium DISC, these pieces of information become too old to be presented. In such case, these pieces of information are substituted by the sub video SUBVD and sub audio SUBAD of the secondary audio video SCDAV in the secondary video set SCDVS saved in the network server NTSRV, and are presented as the commercial 44 or the independent window 32 for a commercial. In this embodiment, the commercial 44 which is recorded in advance on the information storage medium DISC can be recorded as the main video MANVD and main audio MANAD of the primary audio video PRMAV in the primary video set PRMVS as another embodiment. Likewise, when information of the preview 41 is recorded in the information storage medium DISC, it is recorded in the sub video SUBVD and sub audio SUBAD of the primary audio video PRMAV in the primary video set PRMVS or in the main video MANVD and main audio MANAD of the primary audio video PRMAV. When a specific period of time has elapsed after creation of the information storage medium DISC upon playback, that information is downloaded from the network server NTSRV as information of the sub video SUBVD and sub audio SUBAD in the secondary audio video SCDAV in the secondary video set SCDVS, and the downloaded information is presented. In this way, according to this embodiment, the commercial 44, information of the independent window 32 for a commercial or telop commercial 43, and the preview 41 can always be presented to the user as the latest ones, thus improving the PR effects.

<Detailed Playback Method of Video Content>

Presentation examples of the video content in this embodiment will be described in detail below with reference to (a), (b), and (c) of FIGS. 3A and 3B.

In (a) of FIG. 3A, when the information storage medium DISC is inserted into the information recording and playback apparatus 1, the necessity explanatory video information 42 of detailed navigation is presented first. If the user does not feel the necessity of detailed navigation, he or she ignores it. However, if the user wants to see an explanation of the method of playing back the advanced content ADVCT on this information storage medium DISC, he or she inputs necessity of detailed navigation to present directions of use of detailed navigation (not shown). In case of (c) in FIG. 3B, how to use a help key (to be described later) is explained in the necessity explanatory video information 42 of detailed navigation, and a help icon is presented all the time. As a result, the user can designate the help icon when needed to ask for an explanation of the use method.

In (a) of FIG. 3A, the aforementioned commercial 44 is inserted in the middle of presentation of the main title 31 like in the broadcast TV screen, and the presentation method and timing of the commercial 44 are the same as those of commercials normally presented on broadcast reception TVs. In (a) of FIG. 3A, the preview 41 of a forthcoming movie of the content provider of the information storage medium DISC is presented after completion of presentation of the main title 31.

In (b) of FIG. 3B, the latest commercial 43 is presented to be superimposed on presentation of the main title 31 in the form of a telop. As a method of always updating the presentation information of the telop commercial 43 to the latest information, this embodiment utilizes the advanced subtitle ADSBT with the aid of network downloading. This point is a large technical feature in this embodiment. That is, at an early timing, the telop commercial 43 is presented in the form of a telop (running text information) in the sub-picture SUBPT of the primary audio video PRMAV in the primary video set PRMVS. When a specific period of time has elapsed after the manufacture of the information storage medium DISC, since the latest information of the telop commercial 43 is recorded as the advanced subtitle ADSBT in the network server NTSRV, it is downloaded via the network and is presented as the telop commercial 43.

A video content presentation example in (c) of FIG. 3B will be explained below. In (c) of FIG. 3B, the preview 41 of a movie to be screened in a movie theater is presented immediately after the necessity explanatory video information 42 of detailed navigation, and the main title 31 is presented after presentation of the preview 41. In this case, the independent window 32 for a different commercial is presented in addition to the main title 31, and the help icon 33 is presented at the same time. In this embodiment, the contents of the main title 31 are recorded in advance in the information storage medium DISC as the main video MANVD and main audio MANAD of the primary audio video PRMAV in the primary video set PRMVS. The independent window 32 for a different commercial is recorded as the sub video SUBVD and sub audio SUBAD of the primary audio video PRMAV in the primary video set PRMVS in the information storage medium DISC. This information is presented to the user at an early timing. When a specific period of time has elapsed after the manufacture of the information storage medium DISC, the independent window 32 for a different commercial can present an updated video information in this embodiment. As this method, information of the independent window 32 for the latest commercial is saved in the network server NTSRV as the sub video SUBVD and sub audio SUBAD of the secondary audio video SCDAV in the secondary video set SCDAV, and is downloaded as needed via the network, thus presenting the latest information to the user. In the embodiment in (c) of FIG. 3B, the help icon 33 includes the still picture file IMAGE and script file SCRPT of the advanced application ADAPL.

<Practical Example of Presentation Window>

FIG. 4 shows an example of the presentation window at point α when the main title 31, the independent window 32 for a commercial, and the help icon 33 are displayed at the same time in (c) of FIG. 3B.

The main title 31 is presented on the upper left area in FIG. 4, the independent window 32 for a commercial is presented on the upper right area, and the help icon 33 is presented on the lower area. New effects as a result of the technical devices according to this embodiment shown in the window of FIG. 4 and FIGS. 2A, 2B, and 2C will be described below.

As for 1] "Make flexible and impressive reactions in response to user's actions" as the new effect obtained as a result of the technical devices according to this embodiment described using FIGS. 2A, 2B, and 2C, a flexible and impressive window close to a homepage on the Internet can be created in this embodiment. The help icon 33 in FIG. 4 corresponds to 1.4) "PC-like help" and 1.5) "How to use guide of menu, etc.," as the practical new effects of this embodiment. Picture data of the help icon 33 on this window exists as the still picture file IMAGE of the advanced application ADAPL, and its information is stored in the advanced element directory ADVEL in the advanced application directory ADAPL under the advanced content directory ADVCT in the information storage medium DISC shown in FIG. 15. When the user clicks the help icon 33, a help compatible picture begins to move. Command processing related with such movement is recorded in the script file SCRPT in the advanced application ADAPL, i.e., it is stored in the script file SCRPT under the advanced navigation directory ADVNV in the advanced application directory ADAPL under the advanced content directory ADVCT in FIG. 15. Information used to designate the still picture of the help icon 33 and an area defined by the script file is recorded in the markup file MRKUP shown in FIG. 15, and associating information (related information required to download data) among these pieces of information is recorded in the manifest file MNFST. A plurality of pieces of information such as the stop button 34, play button 35, FR (fast-rewinding) button 36, pause button 37, FF (fast-forwarding) button 38, and the like shown in FIG. 4 are categorized as the advanced application ADAPL. Still pictures corresponding to these icons are stored in the still picture file IMAGE in FIG. 15, execution commands upon designation of each of these buttons are recorded in the script file in FIG. 15, and their area designations are recorded in the markup file MRKUP.

The window in FIG. 4 which corresponds to 3.1) "Simultaneously present a plurality of pieces of video information by means of multi-windows" and 3.4) "Simultaneously present scrolling text to be superimposed on video information" of 3] "Simultaneously present independent information to be superimposed on video information during playback" of the new effects as a result of the technical devices according to this embodiment shown in FIGS. 2A, 2B, and 2C will be described below.

In the existing DVD, only one type of video information can be displayed on one window. By contrast, in this embodiment, the sub video SUBVD and sub audio SUBAD can be presented simultaneously with the main video MANVD and main audio MANAD. More specifically, the main title 31 in FIG. 4 corresponds to the main video MANVD and main audio MANAD in the primary video set PRMVS, and the independent window 32 for a commercial on the right side corresponds to the sub video SUBVD and sub audio SUBAD, so that the two windows can be displayed at the same time. Furthermore, in this embodiment, the independent window 32 for a commercial on the right side in FIG. 4 can be presented by substituting it by the sub video SUBVD and sub audio SUBAD in the secondary video set SCDVS. This point is a large technical feature in this embodiment. That is, the sub video SUBVD and sub audio SUBAD in the primary audio video of the primary video set PRMVS are recorded in advance in the information storage medium DISC, and the sub video SUBVD and sub audio SUBAD in the secondary video set SCDVS to be updated are recorded in the network server NTSRV. Immediately after creation of the information storage medium DISC, the independent window 32 for a commercial recorded in advance in the information storage medium DISC is presented. When a specific period of time has elapsed after creation of the information storage medium DISC, the sub video SUBVD and sub audio SUBAD in the secondary video set SCDVS recorded in the network server NTSRV are downloaded via the network and are presented to update the independent window 32 for a commercial to the latest video information. In this manner, the independent window 32 for the latest commercial can always be presented to the user, thus improving the commercial effect of a sponsor. Therefore, by collecting a large amount of commercial charge from the sponsor, the price of the information storage medium DISC to be sold can be hold down, thus promoting prevalence of the information storage medium DISC in this embodiment. In addition, a telop text message 39 shown in FIG. 4 can be presented to be superimposed on the main title 31. As the telop text message, the latest information such as news, weather forecast, and the like is saved on the network server NTSRV in the form of the advanced subtitle ADSBT, and is presented while being downloaded via the network as needed, thus greatly improving the user's convenience. Note that text font information of the telop text message at that time can be stored in the font file FONTS in the advanced element directory ADVEL in the advanced subtitle directory ADSBT, as shown in FIG. 15. Information about the size and presentation position on the main title 31 of this telop text message 39 can be recorded in the markup file MRKUPS of the advanced subtitle ADSBT in the advanced navigation directory ADVNV under the advanced subtitle directory ADSBT in FIG. 15.

<Overview of Information in Playlist>

An overview of information in the playlist PLLST in this embodiment will be described below with reference to FIG. 14. The playlist PLLST in this embodiment is recorded in the playlist file PLLST located immediately under the advanced content directory ADVCT in the information storage medium DISC or persistent storage PRSTR, as shown in FIG. 15, and records management information related with playback of the advanced content ADVCT. The playlist PLLST records information such as playback sequence information PLSQI, object mapping information OBMAPI, resource information RESRCI, and the like. The playback sequence information PLSQI records information of each title in the advanced content ADVCT present in the information storage medium DISC, persistent storage PRSTR, or network server NTSRV, and division position information of chapters that divide video information in the title. The object mapping information OBMAPI manages the presentation timings and positions on the screen of respective objects of each title. Each title is set with a title timeline TMLE, and the presentation start and end timings of each object can be set using time information on that title timeline TMLE. The resource information RESRCI records information of the prior storage timing of each object information to be stored in the data cache DTCCH (file cache FLCCH) before it is presented on the screen for each title. For example, the resource information RESRCI records information such as a loading start time LDSTTM for starting loading onto the data cache DTCCH (file cache FLCCH), a use valid period VALPRD in the data cache DTCCH (file cache FLCCH), and the like.

<Presentation Control Based on Title Timeline>

As shown in FIG. 14, management information which designates an object to be presented and its presentation location on the screen is hierarchized into two levels, i.e., the playlist PLLST, and the markup file MRKUP and the markup file MRKUPS in the advanced subtitle ADSBT (via the manifest file MNFST and the manifest file MNFSTS in the advanced subtitle ADSBT), and the presentation timing of an object to be presented in the playlist PLLST is set in synchronism with the title timeline TMLE. This point is a large technical feature in this embodiment. In addition, the presentation timing of an object to be presented is set in synchronism with the title timeline TMLE similarly in the markup file MRKUP or the markup file MRKUPS of the advanced subtitle ADSBT. This point is also a large technical feature in this embodiment. Furthermore, in this embodiment, the information contents of the playlist PLLST as management information that designates the object to be presented and its presentation location, the markup file MRKUP, and the markup file MRKUPS of the advanced subtitle ADSBT are described using an identical description language (XML). This point is also a large technical feature in this embodiment, as will be described below. With this feature, easy edit and change processing of the advanced content ADVCT by its producer can be greatly improved compared to the conventional DVD-Video. As another effect, processing such as skip processing of the playback location and the like in the advanced content playback unit ADVPL which performs presentation processing upon special playback can be simplified.

<Relationship between Various Kinds of Information on Window and Playlist>

A description of features of this embodiment will be continued with reference to FIG. 4. In FIG. 4, the main title 31, the independent window 32 for a commercial, and various icon buttons on the lower area are presented on the window. The main video MANVD in the primary video set PRMVS is presented on the upper left area of the window as the main title 31, and its presentation timing is described in the playlist PLLST. The presentation timing of this main title 31 is set in synchronism with the title timeline TMLE. The presentation location and timing of the independent window 32 for a commercial recorded as, e.g., the sub video SUBVD are also described in the aforementioned same playlist PLLST. The presentation timing of this the independent window 32 for a commercial is also designated in synchronism with the title timeline TMLE. In the existing DVD-Video, the window from the help icon 33 to the FF button 38 in, e.g., FIG. 4 is recorded as the sub-picture SUBPT in a video object, and command information executed upon depression of each button from the help icon 33 to the FF button 38 is similarly recorded as highlight information HLI in a navigation pack in the video object. As a result, easy edit and change processing by the content producer is not allowed. By contrast, in this embodiment, a plurality of pieces of command information corresponding to window information from the help icon 33 to the FF button 38 are grouped together as the advanced application ADAPL, and only the presentation timing and the presentation location on the window of the grouped advanced application ADAPL are designated on the playlist PLLST. Information related with the grouped advanced application ADAPL shall be downloaded onto the file cache FLCCH (data cache DTCCH) before it is presented on the window. The playlist PLLST describes only the filename and file saving location of the manifest file MNFST (manifest file MNFSTS) that records information required to download data related with the advanced application ADAPL and advanced subtitle ADSBT. The plurality of pieces of window information themselves from the help icon 33 to the FF button 38 in FIG. 4 are saved in the advanced element directory ADVEL as still picture files IMAGE (see FIG. 15). Information which manages the locations on the window and presentation timings of respective still pictures IMAGE from the help icon 33 to the FF button 38 in FIG. 4 is recorded in the markup file MRKUP. This information is recorded in the markup file MRKUP in the advanced navigation directory ADVNV in FIG. 15. Each control information (command information) to be executed upon pressing of each of buttons from the help icon 33 to the FF button 38 is saved in the script file SCRPT in the advanced navigation directory ADVNV in FIG. 15, and the filenames and file saving locations of these script files SCRPT are described in the markup file MRKUP (and manifest file MNFST). In FIG. 15, the markup file MRKUP, script file SCRPT, and still picture file IMAGE are recorded in the information storage medium DISC. However, this embodiment is not limited to this, and these files may be saved in the network server NTSRV or persistent storage PRSTR. In this way, the overall layout and presentation timing on the window are managed by the playlist PLLST, and the layout positions and presentation timings of respective buttons and icons are managed by the markup file MRKUP. The playlist PLLST makes designation with respect to the markup file MRKUP via the manifest file MNFST. Video information and commands (scripts) of various icons and buttons, and command information are stored in independent files compared to the conventional DVD-Video in which they are stored in a video object, and undergo middle management using the markup file MRKUP. This structure can greatly facilitate edit and change processing of the content producer. As for the telop text message 39 shown in FIG. 4, the playlist PLLST designates the filename and file saving location of the markup file MRKUPS of the advanced subtitle via the manifest file MNFSTS of the advanced subtitle (see FIG. 15). The markup file MRKUPS of the advanced subtitle is recorded not only in the information storage medium DISC but it can also be saved on the network server NTSRV or persistent storage PRSTR in this embodiment.

<Playlist> (Again)

Playlist is used for two purposes of Advanced Content playback. The one is for initial system configuration of a player. The other is for definition of how to play plural kind of presentation objects of Advanced Content. Playlist consists of following configuration information for Advanced Content playback.

Object Mapping Information for each Title
        Track Number Assignment
        Resource Information
    Playback Sequence for each Title
    Scheduled Control Information for each Title
    System Configuration for Advanced Content playback More intelligible explanations will be provided below.

In this embodiment, upon playback of the advanced content ADVCT, there are two use purposes of the playlist PLLST, as will be described below. The first use purpose is to define the initial system structure (advance settings of the required memory area in the data cache DTCCH and the like)

in the information playback apparatus 1. The second use purpose is to define the playback methods of plural kind of presentation objects in the advanced content ADVCT. The playlist PLLST has the following configuration information.

1) Object mapping information OBMAPI of each title
   Track number assignment
   Resource information RESRCI
2) Playback sequence information PLSQI of each title
3) System configuration for playback of the advanced content ADVCT <Resource Information>

On Object Mapping Information in Playlist, there is information element which specifies when resource files are needed for Advanced Application playback or Advanced Subtitle playback. They are called Resource Information. There are two types of Resource Information. The one is the Resource Information which is associated to Application. The other is the Resource Information which is associated to Title.

More intelligible explanations will be provided below.

An overview of the resource information RESRCI shown in FIG. 14 will be described below. The resource information RESRCI records information indicating which timings resource files that record information needed to play back the advanced application ADAPL and advanced subtitle ADSBT are to be stored on the data cache DTCCH (file cache FLCCH) in the object mapping information OBMAPI in the playlist PLLST. In this embodiment, there are two different types of resource information RESRCI. The first type of resource information RESRCI is that related with the advanced application ADAPL, and the second type is that related with the advanced subtitle ADSBT.

<Relationship between Track and Object Mapping>

Each Object Mapping Information of Presentation Object on Title Timeline can contain Track Number Assignment information in Playlist. Track is to enhance selectable presentation streams through the different Presentation Objects in Advanced Content. For example, it is possible to select to play main audio stream in Substitute Audio in addition to the selection of main audio streams in Primary Audio Video. There are five types of Tracks. They are main video, main audio, subtitle, sub video and sub audio.

More intelligible explanations will be provided below.

The object mapping information OBMAPI corresponding to various objects to be presented on the title timeline TMLE shown in FIG. 14 includes track number assignment information defined in the playlist PLLST.

In the advanced content ADVCT of this embodiment, track numbers are defined to select various streams corresponding to different objects. For example, audio information to be presented to the user can be selected from a plurality of pieces of audio information (audio streams) by designating the track number. As shown in, e.g., FIG. 7, the substitute audio SBTAD includes the main audio MANAD, which often includes a plurality of audio streams having different contents. By designating an audio track number defined in advance in the object mapping information OBMAPI (track number assignment), an audio stream to be presented to the user can be selected from a plurality of audio streams. Also, audio information which is recorded as the main audio MANAD in the substitute audio SBTAD can be output to be superposed on the main audio MANAD in the primary audio video PRMAV. In some cases, the main audio MANAD in the primary audio video PRMAV, which is to be superposed upon output, often has a plurality of pieces of audio information (audio streams) having different contents. In such case, an audio stream to be presented to the user can be selected from a plurality of audio streams by designating an audio track number which is defined in advance in the object mapping information OBMAPI (track number assignment).

In the aforementioned track, five different objects, i.e., the main video MANVD, main audio MANAD, subtitle ADSBT, sub video SUBVD, and sub audio SUBAD exist, and these five different objects can simultaneously record a plurality of streams having different contents. For this reason, track numbers are assigned to individual streams of these five different object types, and a stream to be presented to the user can be selected by selecting the track number.

<Information of Explanatory Title, Telop, Etc.>

In this embodiment, there are two methods of displaying information of the explanatory title, telop, and the like, i.e., a method of displaying such information using the sub-picture SUBPT in the primary audio video PRMAV and a method of displaying such information using the advanced subtitle ADSBT. In this embodiment, mapping of the advanced subtitle ADBST on the timeline TMLE can be independently defined on the object mapping information OBMAPI irrespective of, e.g., the mapping situation of the primary audio video PRMAV and the like. As a result, not only pieces of information such as a title and telop, i.e., the sub-picture SUBPT in the primary audio video PRMAV and the advanced subtitle ADSBT can be simultaneously presented, but also their presentation start and end timings can be respectively uniquely set. Also, one of them can be selectively presented, thereby greatly improving the presentation performance of the subtitle and telop.

In FIG. 14, a part corresponding to the primary audio video PRMAV is indicated by a single band as P-EVOB. In fact, this band includes main video MANVD tracks, main audio MANAD tracks, sub video SUBVD tracks, sub audio SUBAD tracks, and sub-picture SUBPT tracks. Each object includes a plurality of tracks, and one track (stream) is selected and presented upon presentation. Likewise, the secondary video set SCDVS is indicated by bands as S-EVOB, each of which includes sub video SUBVD tracks and sub audio SUBAD tracks. Of these tracks, one track (one stream) is selected and presented. If the primary audio video PRMAV alone is mapped on the object mapping information OBMAPI on the title timeline TMLE, the following rules are specified in this embodiment to assure easy playback control processing.

The main video stream MANVD shall always be mapped on the object mapping information OBMAPI and played back.

One track (one stream) of the main audio streams MANAD is mapped on the object mapping information OBMAPI and played back (but it may not be played back). This embodiment permits to map none of the main audio streams MANAD on the object mapping information OBMAPI, regardless of such rule.

Under the precondition, the sub video stream SUBVD mapped on the title timeline TMLE is to be presented to the user, but it is not always presented (by user selection or the like).

Under the precondition, one track (one stream) of the sub audio streams SUBAD mapped on the title timeline TMLE is to be presented to the user, but it is not always presented (by user selection or the like).

If the primary audio video PRMAV and the substitute audio SBTAD are simultaneously mapped on the title timeline TMLE and are simultaneously presented, the following rules are specified in this embodiment, thus assuring easy control processing and reliability in the advanced content playback unit ADVPL.

The main video MANVD in the primary audio video PRMAV shall be mapped in the object mapping information OBMAPI and shall be necessarily played back.

The main audio stream MANAD in the substitute audio SBTAD can be played back in place of the main audio stream MANAD in the primary audio video PRMAV.

Under the precondition, the sub video stream SUBVD is to be simultaneously presented with given data, but it is not always presented (by user selection or the like).

Under the precondition, one track (one stream) (of a plurality of tracks) of the sub audio SUBAD is to be presented, but it is not always presented (by user selection or the like).

When the primary audio video PRMAV and the secondary audio video SCDAV are simultaneously mapped on the title timeline TMLE in the object mapping information OBMAPI, the following rules are specified in this embodiment, thus assuring simple processing and high reliability of the advanced content playback unit ADVPL.

The main video stream MANVD in the primary audio video PRMAV shall be played back.

Under the precondition, one track (one stream) of the main audio streams MANAD is to be presented, but it is not always presented (by user selection or the like).

The sub video stream SUBVD and sub audio stream SUBAD in the secondary audio video SCDAV can be played back in place of the sub video stream SUBVD and sub audio stream SUBAD in the primary audio video PRMAV. When sub video stream SUBVD and sub audio stream SUBAD are multiplexed and recorded in the secondary enhanced video object S-EVOB in the secondary audio video SCDAV, playback of the sub audio stream SUBAD alone is inhibited.

<Object Mapping Position>

Time code for Title Timeline is 'Time code'. It is based on non-drop frame and described as HH:MM:SS:FF.

The life period of all presentation objects shall be mapped and described by Time code values onto Title Timeline. Presentation end timing of audio presentation may not be exactly same as Time code timing. In this case, the end timing of audio presentation shall be rounded up to Video System Time Unit (VSTU) timing from the last audio sample presentation timing. This rule is to avoid overlapping of audio presentation objects on the time on Title Timeline.

Video presentation timing for 60 Hz region, even if presentation object is $\frac{1}{24}$ frequency, it shall be mapped at $\frac{1}{60}$ VSTU timing. For video presentation timing of Primary Audio Video or Secondary Audio Video, it shall have 3:2 pull-down information in elementary stream for 60 Hz region, so presentation timing on the Title Timeline is derived from this information for video presentation. For graphical presentation timing of Advanced Application or Advanced Subtitle with $\frac{1}{24}$ frequency, it shall follow graphic output timing model in this specification.

There are two conditions between $\frac{1}{24}$ timing and $\frac{1}{60}$ time code unit timing. The one is exactly matches both timings, and the other is mismatches between them. In case mismatch timing of $\frac{1}{24}$ presentation object frame, it shall be rounded up to the most recent $\frac{1}{60}$ time unit timing.

More intelligible explanations will be provided below.

A method of setting a unit of the title timeline TMLE in this embodiment will be explained below.

The title timeline TMLE in this embodiment has time units synchronized with the presentation timings of frames and fields of video information, and the time on the title timeline TMLE is set based on the count value of time units. This point is a large technical feature in this embodiment. For example, in the NTSC system, interlaced display has 60 fields and 30 frames per second. Therefore, the duration of a minimum time unit on the title timeline TMLE is divided into 60 per second, and the time on the title timeline TMLE is set based on the count value of the time units. Also, progressive display in the NTSC system has 60 fields=60 frames per second, and matches the aforementioned time units. The PAL system is a 50-Hz system, and interlaced display has 50 fields and 25 frames per second, and progressive display has 50 fields=50 frames per second. In case of video information of the 50-Hz system, the title timeline TMLE is equally divided into 50 units per second, and the time and timing on the title timeline TMLE is set based on a count value with reference to the equally divided one interval ($\frac{1}{50}$ sec). In this manner, since the reference duration (minimum time unit) of the title timeline TMLE is set in synchronism with the presentation timings of fields and frames of video information, synchronized timing presentation control among respective pieces of video information can be facilitated, and time settings with the highest precision within a practically significant range can be made.

As described above, in this embodiment, the time units are set in synchronism with fields and frames of video information, i.e., one time unit in the 60-Hz system is $\frac{1}{60}$ sec, and one time unit in the 50-Hz system is $\frac{1}{50}$ sec. At respective time unit positions (times), the switching timings (presentation start or end timing or switching timing to another frame) of all presentation objects are controlled. That is, in this embodiment, the presentation periods of every presentation objects are set in synchronism with the time units ($\frac{1}{60}$ sec or $\frac{1}{50}$ sec) on the title timeline TMLE. The frame interval of audio information is often different from the frame or field interval of the video information. In such case, as the playback start and end timings of the audio information, the presentation period (presentation start and end times) is set based on timings which are rounded out in correspondence with the unit interval on the title timeline TMLE. In this way, presentation outputs of a plurality of audio objects can be prevented from overlapping on the title timeline TMLE.

When the presentation timing of the advanced application ADAPL information is different from the unit interval of the title timeline TMLE (for example, when the advanced application ADAPL has 24 frames per second and its presentation period is expressed on the title timeline of the 60-Hz system), the presentation timings (presentation start and end times) of the advanced application ADAPL are rounded out in correspondence with the title timeline TMLE of the 60-Hz system (time unit=$\frac{1}{60}$ sec).

<Timing Model for Advanced Application>

Advanced Application (ADV APP) consists of one or plural Markup(s) files which can have one-directional or bi-directional links each other, script files which shares a name space belonging to the Advanced Application, and Advanced Element files which are used by the Markup (s) and Script(s). Valid period of each Markup file in one Advanced Application is the same as the valid period of Advanced Application which is mapped on Title Timeline. During the presentation of one Advanced Application, active Markup is always only one. An active Markup jumps one to another. The valid period one Application is divided to three major periods; pre-script period, Markup presentation period and post-script period.

More intelligible explanations will be provided below.

In this embodiment, the valid period of the advanced application ADAPL on the title timeline TMLE can be divided into three periods i.e., a pre-script period, markup presentation period, and post-script period. The markup presentation period represents a period in which objects of the advanced application ADAPL are presented in correspondence with time units of the title timeline TMLE based on information of the markup file MRKUP of the advanced application ADAPL. The pre-script period is used as a preparation period of presenting the window of the advanced application ADAPL prior to the markup presentation period. The post-script period is set immediately after the markup presentation period, and is used as an end period (e.g., a period used in release processing of memory resources) immediately after presentation of respective presentation objects of the advanced application ADAPL. This embodiment is not limited to this. For example, the pre-script period can be used as a control processing period (e.g., to clear the score of a game given to the user) prior to presentation of the advanced application ADAPL. Also, the post-script period can be used in command processing (e.g., point-up processing of the score of a game of the user) immediately after playback of the advanced application ADAPL.

<Application Sync Model>

There are two kind of application which has following two Sync Models:

Soft-Sync Application
Hard-Sync Application

The information of sync type is defined by sync attribute of application segment in Playlist. In Soft-Sync Application and Hard-Sync Application, the behavior to Title Timeline differs at the time of execution preparation of application. Execution preparation of application is resource loading and other startup process (such as script global code execution). Resource loading is reading resource from storage (DISC, Persistent Storage and Network Server) and store to the File Cache. Every application shall not execute before all resource loading is finished.

More intelligible explanations will be provided below.

The window during the aforementioned markup presentation period will be described below. Taking the presentation window in FIG. 4 as an example, when the stop button 34 is pressed during presentation of video information in this embodiment, that video information stops, and the window presentation of, e.g., changing the shape and color of the stop button 34 can be changed. This means the effect of 1.1) "Make response by means of change in animation and image at the time of button selection or execution instruction" in 1] "Make flexible and impressive reactions in response to user's actions" described in the column "New effects obtained as a result of technical devices" shown in FIGS. 2A, 2B, and 2C. When the display window itself of FIG. 4 is largely changed as in the above example, the corresponding markup file MRKUP jumps to another markup file MRKUP in the advanced application ADAPL. In this way, by jumping the markup file MRKUP that sets the presentation window contents of the advanced application ADAPL to another markup file MRKUP, the apparent window presentation can be greatly changed. That is, in this embodiment, a plurality of markup files MRKUP are set in correspondence with different windows during the markup presentation period, and are switched in correspondence with switching of the window (the switching processing is executed based on a method described in the script file SCRPT). Therefore, the start timing of a markup page on the title timeline TMLE during the presentation period of the markup file MRKUP matches the presentation start timing of the one to be presented first of the plurality of markup files MRKUP, and the end timing of a markup page on the title timeline TMLE matches the presentation end timing of the last one of the plurality of markup files MRKUP. As a method of jumping the markup pages (changing the presentation window of the advanced application ADAPL part in the presentation window), this embodiment specifies the following two sync models.

Soft-Sync Application
Hard-Sync Application
<Soft-Sync Application>

Soft-Sync Application gives preference to seamless proceeding of Title Timeline over execution preparation. If 'auto Run' attribute is 'true' and application is selected then resources will load into the File Cache by soft synced mechanism. Soft-Sync Application is activated after that all resources loading into the File Cache. The resource which cannot read without Title Timeline stopping shall not be defined as a resource of Soft-Sync Application. In case, Title Timeline jump into the valid period of Soft-Sync Application, the Application may not execute. And also, during the varied period of Soft-Sync Application, playback mode changes trick play to normal playback, the Application may not run.

More intelligible explanations will be provided below.

The first jump method is soft sync jump (jump model) of markup pages. At this jump timing, the time flow of the title timeline TMLE does not stop on the window to be presented to the user. That is, the switching timing of the markup page matches that of unit position (time) of the aforementioned title timeline TMLE, and the end timing of the previous markup page matches the start timing of the next markup page (presentation window of the advanced application ADAPL) on the title timeline TMLE. To allow such control, in this embodiment, a time period required to end the previous markup page (e.g., a time period used to release the assigned memory space in the data cache DTCCH) is set to overlap the presentation time period of the next markup page. Furthermore, the presentation preparation period of the next markup page is set to overlap the presentation period of the previous markup page. The soft sync jump of the markup page can be used for the advanced application ADAPL or advanced subtitle ADSBT synchronized with the title timeline TMLE.

<Hard-Sync Application>

Hard-Sync Application gives preference to execution preparation over seamless progress of Title Timeline. Hard-Sync Application is activated after all resources loading into the File Cache. If 'auto Run' attribute is 'true' and application is selected then resources will load into the File Cache by hard synced mechanism. Hard-Sync Application holds the Title Timeline during the resource loading and execution preparation of application.

More intelligible explanations will be provided below.

As the other jump method, this embodiment also specifies hard sync jump of markup pages. In general, a time change on the title timeline TMLE occurs on the window to be presented to the user (count-up on the title timeline TMLE is made), and the window of the primary audio video PRMAV changes in synchronism with such change. For example, when the time on the title timeline TMLE stops (the count value on the title timeline TMLE is fixed), the window of the corresponding primary audio video PRMAV stops, and a still window is presented to the user. When the hard sync jump of markup pages occurs in this embodiment, a period in which the time on the title timeline TMLE stops (the count value on the title timeline TMLE is fixed) is formed. In the hard sync jump of markup pages, the end timing time of a markup page before apparent switching on the title timeline TMLE matches the playback start timing of the next markup page on the title timeline TMLE. In case of this jump, the end period of the previously presented markup page does not overlap the preparation period required to present the next markup page. For this reason, the time flow on the title timeline TMLE temporarily stops during the jump period, and presentation of, e.g., the primary audio video PRMAV or the like is temporarily stopped. The hard sync jump processing of markup pages is used in only the advanced application ADAPL in this embodiment. In this way, the window change of the advanced subtitle ADSBT can be made without stopping the time change on the title timeline TMLE (without stopping, e.g., the primary audio video PRMAV) upon switching the presentation window of the advanced subtitle ADSBT.

The windows of the advanced application ADAPL, advanced subtitle ADSBT, and the like designated by the markup page are switched for respective frames in this embodiment. For example, interlaced display, the number of frames per second is different from that of fields per second. However, when the windows of the advanced application ADAPL and advanced subtitle ADSBT are controlled to be switched for respective frames, switching processing can be done at the same timing irrespective of interlaced or progressive display, thus facilitating control. That is, preparation of a window required for the next frame is started at the immediately preceding frame presentation timing. The preparation is completed until the presentation timing of the next frame, and the window is displayed in synchronism with the presentation timing of the next frame. For example, since NTSC interlaced display corresponds to the 60-Hz system, the interval of the time units on the title timeline is 1/60 sec. In this case, since 30 frames are displayed per sec, the frame presentation timing is set at an interval of two units (the boundary position of two units) of the title timeline TMLE. Therefore, when a window is to be presented at the n-th count value on the title timeline TMLE, presentation preparation of the next frame starts at the (n−2)-th timing two counts before, and a prepared graphic frame (a window that presents various windows related with the advanced application ADAPL will be referred to as a graphic frame in this embodiment) is presented at the timing of the n-th count on the title timeline TMLE. In this embodiment, since the graphic frame is prepared and presented for respective frames in this way, the continuously switched graphic frames can be presented to the user, thus preventing the user from feeling odd.

<Presentation Clip Element and Object Mapping Information>

Tide element in Playlist file contains a list of element, called by Presentation Clip element, which describes Object Mapping Information of the segment of Presentation Object.

Primary Audio Video Clip element, Substitute Audio Video Clip element, Secondary Audio Video Clip element and Substitute Audio Clip element, Advanced Subtitle Segment element Application Segment element respectively describe Object Mapping Information of Primary Audio Video, Secondary Audio Video, Substitute Audio, Advanced Subtitle of Advanced Subtitle of Advanced Subtitle Profile markup and Advanced Application of Markup and Script.

Presentation Object shall be referred by the URI of the index information file as shown in FIG. 21.

Object Mapping Information of a Presentation Object in a Title Timeline, is a valid period of the Presentation Object in a Title Timeline.

The valid period on Title Timeline of a

Presentation Object is determined by start time and end time on Title Timeline. The start time and end time on Title Timeline are described by title Time Begin attribute and title Time End attribute of each Presentation Clip element, respectively. For the Presentation Clip except for Advanced Subtitle and Application, the starting position of the Presentation Object is described by clip Time Begin attribute of each Presentation Clip element.

For Primary Audio Video Clip, Substitute Audio Video Clip, Substitute Audio Clip and Secondary Audio Video Clip element, the Presentation Object shall be present at the starting position, described by clip Time Begin.

The clip Time Begin attribute value shall be the presentation start time (PTS) of Coded-Frame of the video streams in P-EVOB (S-EVOB).

Attribute values of titleTimeBegin, titleTimeEnd and clipTimeBegin, and the duration time of the Presentation Object shall satisfy the following relation:

titleTimeBegin<titleTimeEnd and titleTimeEnd<duration time of the Title

If the Presentation Object is synchronized with Title Timeline, the following relation shall be satisfied:

clipTimeBegin+titleTimeEnd−
titleTimeBegin≦duration time of the Presentation Object The valid period of Primary Audio Video Clip element shall not overlap each other on Title Timeline.

The valid period of Secondary Audio Video Clip element shall not overlap each other on Title Timeline.

The valid period of Substitute Audio Clip element shall not overlap each other on Title Timeline.

The valid period of Substitute Audio Video Clip element shall not overlap each other on Title Timeline.

For any of Primary Audio Video Clip element and Substitute Audio Video Clip element, the valid periods on Title Timeline shall not overlap.

For any of Substitute Audio Video Clip element, Secondary Audio Video Clip element and Substitute Audio Clip element, the valid periods on Tide Timeline shall not overlap.

For any Presentation Clip element with 'Disc' data Source, the valid periods on Title Timeline shall not overlap to those of other Presentation Clip element with 'Disc' data Source.

More intelligible explanations will be provided below.

The object mapping information OBMAPI described in the playlist PLLST shown in FIG. 14 describes list information of elements called presentation clip elements. FIG. 21 shows the relationship between various presentation clip elements and corresponding object names to be presented and used.

As shown in FIG. 21, a primary audio video clip element PRAVCP described in the object mapping information OBMAPI explains object mapping information OBMAPI related with the primary audio video PRMAV. A secondary audio video clip element SCAVCP explains object mapping information OBMAPI of the secondary audio video SCDAV. A substitute audio clip element SBADCP explains object mapping information OBMAPI of the substitute audio SBTAD. An advanced subtitle segment element ADSTSG in the object mapping information OBMAPI describes information related with the markup file MRKUPS in the advanced subtitle ADSBT. An application segment element ADAPSG in the object mapping information OBMAPI describes information related with the markup file MRKUP and script file SCRPT of the advanced application ADAPL. The object mapping information OBMAPI related with each object to be played back and used describes information related with the valid period (including a presentation period or a preparation period and end processing period) of each object on the title timeline TMLE. The valid period on the title timeline TMLE is specified by the start time and end time on the title timeline TMLE. In each clip element, the start time and end time on the title timeline TMLE are specified by a titleTimeBegin attribute and titleTimeEnd attribute. That is, each clip element individually records the titleTimeBegin attribute and title- TimeEnd attribute. Presentation of a corresponding object begins from the time described by the titleTimeBegin attribute on the title timeline TMLE, and ends at the time described by the titleTimeEnd attribute. In the primary audio video clip element PRAVCP, secondary audio video clip element SCAVCP, and substitute audio clip element SBADCP except for the advanced subtitle segment element ADSTSG and application segment element ADAPSG, each of the primary audio video PRMAV, secondary audio video SCDAV, and substitute audio SBTAD begins to be presented by clipTimeBegin which means an presentation elapsed time period calculated from a start position where each object is recorded. That is, the aforementioned titleTimeBegin attribute and titleTimeEnd attribute mean time information on the title timeline TMLE. On the other hand, clipTimeBegin means an independent time elapse in each object. By synchronizing the times of the titleTimeBegin attribute and clipTimeBegin, a plurality of different objects can be synchronously presented on the same title timeline TMLE.

Note that various objects to be played back and used are not recorded in the information storage medium (DISC) but only the playlist (PLLST) is recorded in the information storage medium (DISC). The information playback apparatus may designate and acquire from the corresponding playlist (PLLST) various objects to be played back and used recorded in the network server (NTSRV) or persistent storage (PRSTR).

In this embodiment, the following relationship is set among the presentation period of each presentation object, and titleTimeBegin, titleTimeEnd, and clipTimeBegin to improve the precision of the presentation processing without producing any conflict among presentation timings.

titleTimeBegin<titleTimeEnd    and titleTimeEnd<duration time of the Title clipTimeBegin+titleTimeEnd−
   titleTimeBegin≦duration time of the Presentation Object Furthermore, in this embodiment, the presentation precision is improved by setting the following conditions.
- The valid periods of respective primary audio video clip elements PRAVCP shall not overlap on the title timeline TMLE.
- The valid periods of respective secondary audio video clip elements SCAVCP shall not overlap on the title timeline TMLE.
- The valid periods of respective substitute audio clip elements SBADCP shall not overlap on the title timeline TMLE.
- The valid period of the secondary audio video clip element SCAVCP shall not overlap that of the substitute audio clip element SBADCP on the title timeline TMLE.

As shown in FIG. 6, the time map file PTMAP of the primary video set PRMVS, the time map file STMAP of the secondary video set SCDVS, the manifest file MNFST, and the manifest file MNFSTS of the advanced subtitle ADSBT are referred to from the playlist PLLST.

More specifically, as shown in FIG. 21, the primary audio video clip element PRAVCP describes the filename and saving location of the time map file PTMAP of the primary video set PRMVS as the filename to be referred to in the primary audio video clip element PRAVCP. Likewise, the second audio video clip element SCAVCP describes the filename and saving location of the time map file STMAP of the secondary video set SCDVS. Furthermore, the substitute audio clip element SBADCP describes the filename and saving location of the time map file STMAP of the secondary video set SCDVS. The advanced subtitle segment element ADSTSG describes the filename and saving location of the manifest file MNFSTS of the advanced subtitle ADSBT. The application segment element ADAPSG describes the filename and saving location of the manifest file MNFST of the advanced application ADAPL.

The locations of files to be referred to as indices upon playing back and using objects shown in FIG. 21 are described in FIG. 7. For reconfirmation, they are described in the column of the original data sources of objects in FIG. 21.

The files which are described in respective clip elements and are referred to as indices upon playing back and using objects can be recorded in various recording media (including the network server NTSRV), as shown in FIG. 21. FIG. 16 shows the saving location designation method of the files described in respective clip elements. More specifically, when files are saved in the network server NTSRV, the address of an HTTP server or HTTPS server is designated by "http: . . . " or "https: . . . ", as shown in FIG. 16. In this embodiment, the description range of file saving location designation information (URI: Uniform Resource Identifier) described in each clip element shall be described using 1024 bytes or less. When such information is recorded in the information storage medium DISC, file cache FLCCH (data cache DTCCH), or persistent storage PRSTR, the file saving location is designated as a data file.

When each file is saved in the information storage medium DISC, file cache FLCCH (data cache DTCCH), or persistent storage PRSTR shown in FIG. 16, each medium shall be identified. In this embodiment, each medium can be identified by adopting a path designation description method shown in FIG. 17 in respective clip elements. This point is a large technical feature in this embodiment.

<Content Referencing>

Every resource available on the disc or the network has an address that encoded by a Uniform Resource Identifier.

The following is a URI example which refers to a XML file on a Disc.

file:///dvddisk/ADV_OBJ/file.xmu

The total length of URI shall be less than 1024.

By the 'file' URI scheme, URI can refer to the resources on DVD Disc contents, File Cache, and Persistent Storages. There is two type of Persistent Storage. One is Required Persistent Storage, which all Player shall have only one. The other is Additional Persistent Storage, which Player can have one or more. The path of URI includes storage type and identifier for Persistent Storage in the following manner.

All Advanced Navigation files (Manifest/Markup/Script) and Advanced Element files shall be loaded into File Cache by Resource Information element in Playlist, or API. All files loaded by Resource Information element shall be referred by URI of the original file location, not location in the File Cache.

Files in archived file shall be referred by sub path of URI of archived file. At this time URI of archived file shall be referred by original location, not location in file cache.

The path 'file:///file cache/' is resolved as/temp directory in File Cache. For file cache, only application managed directory may be accessed.

Playlist,. Manifest and Markup may use relative URI reference. The base URI shall be derived from the URI of the original file location, if xml: base attribute is not specified. If xml: base attribute is specified, base URI is determined by rule.

The path-segment " . . " shall not used in URI.

More intelligible explanations will be provided below.

In this embodiment, two different recording media are brought into view as the persistent storage PRSTR. The first one is the fixed persistent storage PRSTR, and specifies only one persistent storage drive 3 in the information recording and playback apparatus 1 in this embodiment. The other one is the portable persistent storage PRSTR, and one or more storages (a plurality of storages are allowed) can be mounted in the information recording and playback apparatus 1 in this embodiment. In the path designation description to a file, the description method shown in FIG. 17 is specified, and the contents are described in each clip element in the playlist PLLST. That is, when a file is recorded in the information storage medium DISC, "file:///dvddisc/" is described. When a file is stored in the file cache FLCCH (data cache DTCCH), "file:///filecache/" is described as the path designation description method. When a file is recorded in the fixed persistent storage PRSTR, "file:///fixed/" is described as the path designation description method. When a file is recorded in the portable persistent storage PRSTR, "file:///removable/" is described as the path designation description method. When various files are recorded in the information storage medium DISC, file cache FLCCH (data cache DTCCH), or persistent storage PRSTR, the file structure shown in FIG. 15 is formed in each recording medium, and files are recorded under corresponding directories.

<Playlist File>

Playlist File describes the navigation, the synchronization and the initial system configuration information for Advanced Content. Playlist File shall be encoded as well-formed XML. FIG. 18 shows an outline example of Playlist file. The root element of Playlist shall be Playlist element, which contains Configuration element, Media Attribute List element and Title Set element in a content of Playlist element.

More intelligible explanations will be provided below.

FIG. 18 shows the data structure in the playlist file PLLST that records information related with the playlist PLLST shown in FIG. 14. This playlist file PLLST is directly recorded in the form of the playlist file PLLST under the advanced content directory ADVCT, as shown in FIG. 15. The playlist file PLLST describes management information, synchronization information among respective presentation objects, and information related with the initial system structure (e.g., information related with pre-assignment of a memory space used in the data cache DTCCH or the like). The playlist file PLLST is described by a description method based on XML. FIG. 18 shows a schematic data structure in the playlist file PLLST.

A field bounded by <Playlist[playlist] . . . > and </Playlist> is called a playlist element in FIG. 18. As information in the playlist element, configuration information CONFGI, media attribute information MDATRI, and title information TTINFO are described in this order. In this embodiment, the allocation order of various elements in the playlist element is set in correspondence with the operation sequence before the beginning of video presentation in the advanced content playback unit ADVPL in the information recording and playback apparatus 1 shown in FIG. 1. That is, the assignment of the memory space used in the data cache DTCCH in the advanced content playback unit ADVPL shown in FIG. 13 is most necessary in the process of playback preparation. For this reason, a configuration information CONFGI element 134 is described first in the playlist element. The presentation engine PRSEN in FIG. 13 shall be prepared in accordance with the attributes of information in respective presentation objects. For this purpose, a media attribute information MDATRI element 135 shall be described after the configuration information CONFGI element 134 and before a title information TTINFO element 136. In this manner, after the data cache DTCCH and presentation engine PRSEN have been prepared, the advanced content playback unit ADVPL starts presentation processing according to the information described in the title information TTINFO element 136. Therefore, the title information TTINFO element 136 is allocated after the information required for preparations (at the last position).

A description 131 of the first line in FIG. 18 is definition text that declares "the following sentences are described based on the XML description method", and has a structure in which information of xml attribute information XMATRI is described between "<?xml" and "?>".

Figure 22:
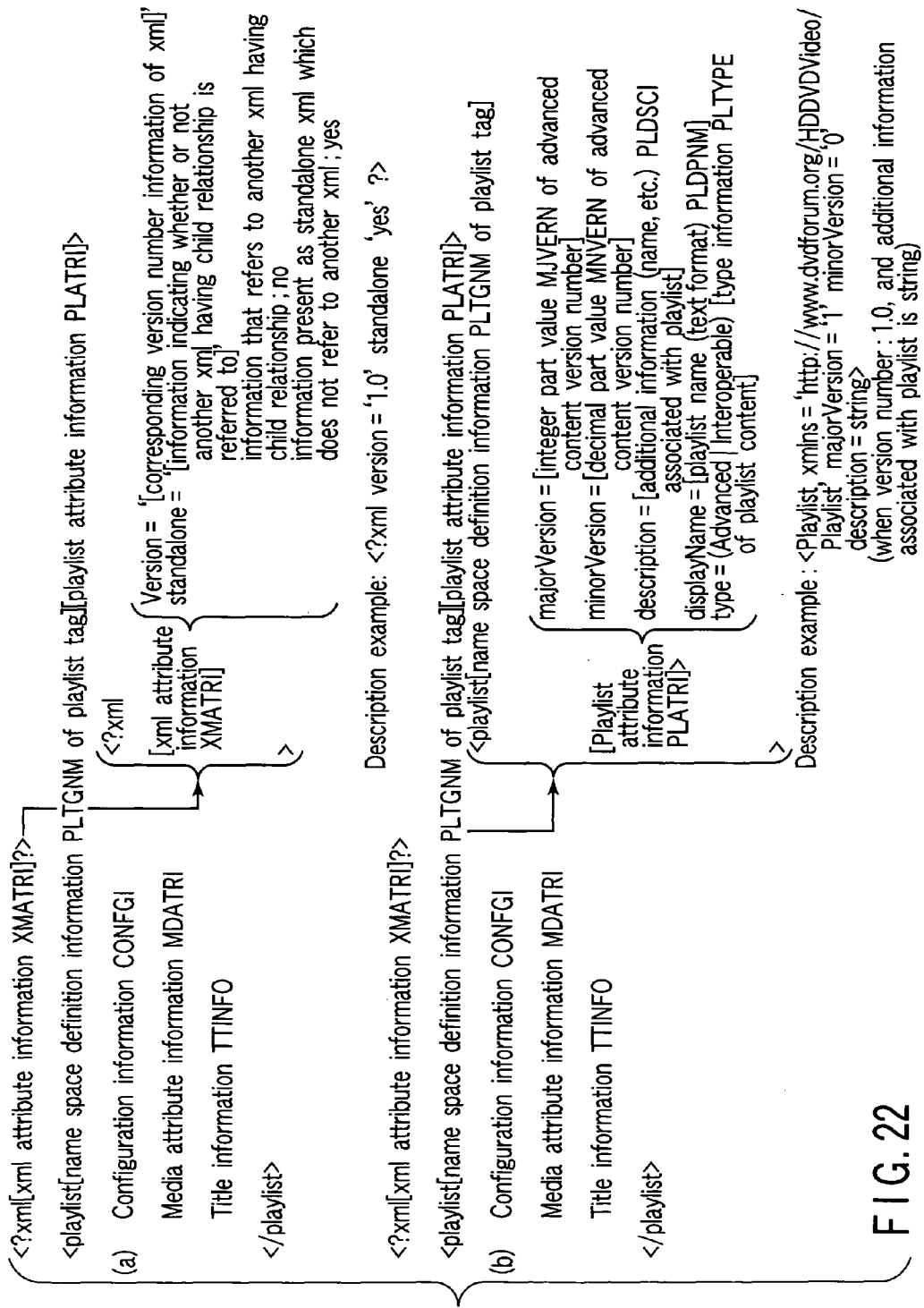
FIG. 22 is an exemplary view showing details contents of respective pieces of attribute information in an XML tag and playlist tag.

FIG. 22 shows the information contents in the xml attribute information XMATRI in (a).

The xml attribute information XMATRI describes information indicating whether or not another XML having a child relationship with corresponding version information of XML is referred to. Information indicating whether or not the other XML having the child relationship is referred to is described using "yes" or "no". If the other XML having the child relationship is directly referred to in this target text, "no" is described; if this XML text does not directly refer to the other XML and is present as standalone XML, "yes" is described. As an XML statement, for example, when the corresponding version number of XML is 1.0, and XML text does not refer to the other XML but is present as standalone XML, "<?xml version='1.0' standalone='yes' ?>" is described as a description example (a) of FIG. 22.

Description text in a playlist element tag that specifies the range of a playlist element describes name space definition information PLTGNM of the playlist tag and playlist attribute information PLATRI after "<Playlist", and closes with ">", thus forming the playlist element tag. FIG. 22 shows description information in the playlist element tag in (b). In this embodiment, the number of playlist elements which exit in the playlist file PLLST is one in principle. However, in a special case, a plurality of playlist elements can be described. In such case, since a plurality of playlist element tags may be described in the playlist file PLLST, the name space definition information PLTGNM of the playlist tag is described immediately after "<Playlist" so as to identify each playlist element. The playlist attribute information PLATRI describes an integer part value MJVERN of the advanced content version number, a decimal part value MNVERN of the advanced content version number information, and additional information (e.g., a name or the like) PLDSCI related with the playlist in the playlist element in this order. For example, as a description example, when the advanced content version number is "1.0", "1" is set in the integer part value MJVERN of the advanced content version number, and "0" is set in the decimal part value MNVERN of the advanced content version number. If the additional information related with the playlist PLLST is "string", and the name space definition information PLTGNM of the playlist tag is "http://www.dvdforum.org/HDDVDVideo/Playlist", the description text in the playlist element is:

"<Playlist xmlns =
    'http://www.dvdforum.org/HDDVDVideo/Playlist'
    majorVersion = '1' minorVersion = '0'
    description = string>"

The advanced content playback unit ADVPL in the information recording and playback apparatus 1 shown in FIG. 1 plays back the advanced content version number described in the playlist element tag first, and determines if the advanced content version number falls within the version number range supported by it.

If the advanced content version number falls outside the support range, the advanced content playback unit ADVPL shall immediately stop the playback processing. For this purpose, in this embodiment, the playlist attribute information PLATRI describes the information of the advanced content version number at the foremost position.

Various kinds of information described in the playlist PLLST in this embodiment have a hierarchical structure, as shown in FIGS. 19A and 19B, and FIGS. 20A and 20B.

<Title Information>

A Playlist file contains a list of Title elements in the Title Set element. The Title Set element describes information of a set of Titles for Advanced Contents in the Playlist.

Title Timeline is assigned for each Title. The duration of Title Timeline shall be described by title Duration attribute of Title element by the time Expression value. The duration of Title Timeline shall be greater than '00:00:00:00'.

Note: To describe Title which contains only Advanced Application, set duration to some value such as '00:01:00:00', and pause the time on Tide Timeline at the beginning of Title.

The total number of Title shall be less than 1000.

Each Title element describes a set of information of a Title for Advanced Content.

More intelligible explanations will be provided below.

In information recorded in the aforementioned playlist file PLLST, the title information TTINFO included in the playlist element is described using a title set element bounded by <TitleSet> and </TitleSet>, as shown in (b) of FIG. 19A. This title set element describes information related with a title set of the advanced content ADVCT defined in the playlist PLLST. The title set element describes one or more pieces of title element information TTELEM in turn, and management information related with each title is recorded in the corresponding title element information TTELEM. The example of FIG. 14 has three titles, i.e., titles #1 to #3, and (b) of FIG. 19A describes title element information TTELEM related with title #1 to that related with title #3. However, this embodiment is not limited to such example, and title element information TTELEM related with one to an arbitrary number of titles can be described. A title timeline TMLE is set to each title corresponding to the title element information TTELEM. The presentation period of the title timeline TMLE of each title is described in titleDuration attribute information (time duration information TTDUR of the entire title on the title timeline TMLE) in the title element information TTELEM. The numbers of corresponding titles are set in accordance with the order of description of respective pieces of title element information TTELEM described in the title set element. As shown in (b) of FIG. 19A, the title number of a title corresponding to the title element information TTELEM described first in the title set element is set to "1". In this embodiment, the number of pieces of title element information TTELEM (the number of titles defined per playlist PLLST) that can be described in the title set element is set to be 512 or less. By setting the upper limit value of the number of titles, the processing in the advanced content playback unit ADVPL is prevented from diffusing. Each title element information TTELEM describes object mapping information OBMAPI, resource information RESRCI, playback sequence information PLSQI, and track navigation information TRNAVI in this order. The object mapping information OBMAPI includes information of track number assignment information that sets stream (track) numbers in respective presentation objects. The object mapping information describes a list of various clip elements described using FIGS. 20A and 20B. Also, the object mapping information OBMAPI describes a list related with track number assignment information which represents the setting information of track numbers in the aforementioned presentation clip elements. In this embodiment, each playback object such as video information, audio information, sub-picture information, or the like can have a plurality of streams, independent tracks are related with these streams, and track numbers are set, thus identifying playback streams in each presentation object. By setting the track number assignment element list in this way, the number of streams included in each presentation object and individual streams can be identified. The resource information RESRCI explains a list of resource elements in the title element information TTELEM. The track navigation information TRNAVI describes information related with a track navigation list element. The playback sequence information PLSQI describes information of a chapter list element indicating the head positions of chapters corresponding to divisions of the video contents in a single title.

As shown in (c) of FIG. 19A, the arrangement order of the object mapping information OBMAPI, resource information RESRCI, playback sequence information PLSQI, and track navigation information TRNAVI in the title element information TTELEM corresponds to the processing sequence of the advanced content playback unit ADVPL in the information recording and playback apparatus 1 (see FIG. 1). That is, information of the object mapping information OBMAPI which describes the information of the advanced application ADAPL and advanced subtitle ADSBT used in a single title is described at the first location in the title element information TTELEM. The advanced content playback unit ADVPL recognizes the contents of the advanced application ADAPL and advanced subtitle ADSBT used in the single title first from the object mapping information OBMAPI recorded first. As has been described using FIG. 7, the information of the advanced application ADAPL and advanced subtitle ADSBT shall be saved in the file cache FLCCH (data cache DTCCH) in advance prior to presentation to the user. For this reason, the advanced content playback unit ADVPL in the information recording and playback apparatus 1 requires information related with the advanced application ADAPL and advanced subtitle ADSBT set in the title and their storage timings in the file cache FLCCH (data cache DTCCH) prior to playback. The advanced content playback unit ADVPL then reads the resource information RESRCI, and can detect the storage timings of the advanced application ADAPL and advanced subtitle ADSBT in the file cache FLCCH (data cache DTCCH). Therefore, since the resource information RESRCI is described after the object mapping information OBMAPI, the processing of the advanced content playback unit ADVPL is facilitated. Since the playback sequence information PLSQI becomes important to allow the user to immediately move video information that he or she wants to see upon playing back the advanced content ADVCT, the playback sequence information PLSQI is allocated after the resource information RESRCI. Since the track navigation information TRNAVI is information required immediately before presentation to the user, it is described at the last location in the title element information TTELEM.

<Title Element>

The Title element describes information of a Title for Advanced Contents, which consists of Object Mapping Information, Track Number Assignment for elementary stream and Playback Sequence in a Title.

The content of Title element consists of Chapter List element, Track Navigation List element, Title Resource element and list of Presentation Clip element. Presentation Clip elements are Primary Audio Video Clip, Substitute Audio Video Clip, Substitute Audio Clip, Secondary Audio Video Clip, Advanced Subtitle Segment and Application Segment.

Presentation Clip elements in Title element describe the Object Mapping Information in the Title.

Presentation Clip elements also describe Track Number Assignment for elementary stream.

Chapter List element describes the information of Playback-Sequence in the Title.

Track Navigation List element describes the information of Track Navigation Information in the Title.

Title Resource element describes the information of Resource Information par Title.

(a) title Number attribute

Describes the number of Title. The Title number shall follow the constraints.

(b) type attribute

Describes type of Title. If the content is Interoperable Content and Title is Original Title, the value shall be 'Original'. If the content is Interoperable Content and Title is User Defined Title, the value shall be 'User Defined'. Otherwise it shall be omitted, or 'Advanced'. The value may be omitted. The default value is 'Advanced'.

(c) selectable attribute

Describes whether the Title can be selectable by User Operation, or not. If the value is "false", the title shall not be navigated by User Operation. The value may be omitted. The default value is "true".

(d) title Duration attribute

Describes the duration of the Title Timeline. The attribute value shall be described by time Expression.

The end time of all Presentation Object shall be less than the duration time of Title Timeline.

(e) parental Level attribute

Describes the list of parental level for each country code. The attribute value shall be described by parental List value. This attribute can be omitted. Default value is '*: 1'.

(f) tick Base Divisor attribute

Describes the reducing rate of the Application Ticks to process in Advanced Application Manager. For example, if tick Base Divisor value is 3, Advanced Application Manager shall process one of the three Application Ticks, and ignore the rest of them.

(g) on End attribute

Describes the id attribute value of Title element describing Title to be played after end of current Title. This value can be omitted. If this value is omitted, player shall be stopped after Title playback.

(h) display Name attribute

Describes the name of Title in the human consumable text form. Player may display this name as title name. This attribute can be omitted.

(i) alternative SD Display Mode attribute

Describes the permitted display modes on 4:3 monitor in this Title playback. 'pan scan Or Letter box' allows both Pan-scan and Letterbox, 'pan scan' allows only Pan-scan, and 'letterbox' allows only Letterbox for 4:3 monitor. Player shall output into 4:3 monitor forcedly in allowed display modes. This attribute can be omitted. The default value is 'pan scan Or Letter box'.

(j) description attribute

Describes additional information in the human consumable text form. This attribute can be omitted.

(k) xml: base attribute

Describes the base URI in this element. The semantics of xml:base shall follow to XML Base.

More intelligible explanations will be provided below.

Figure 20A:
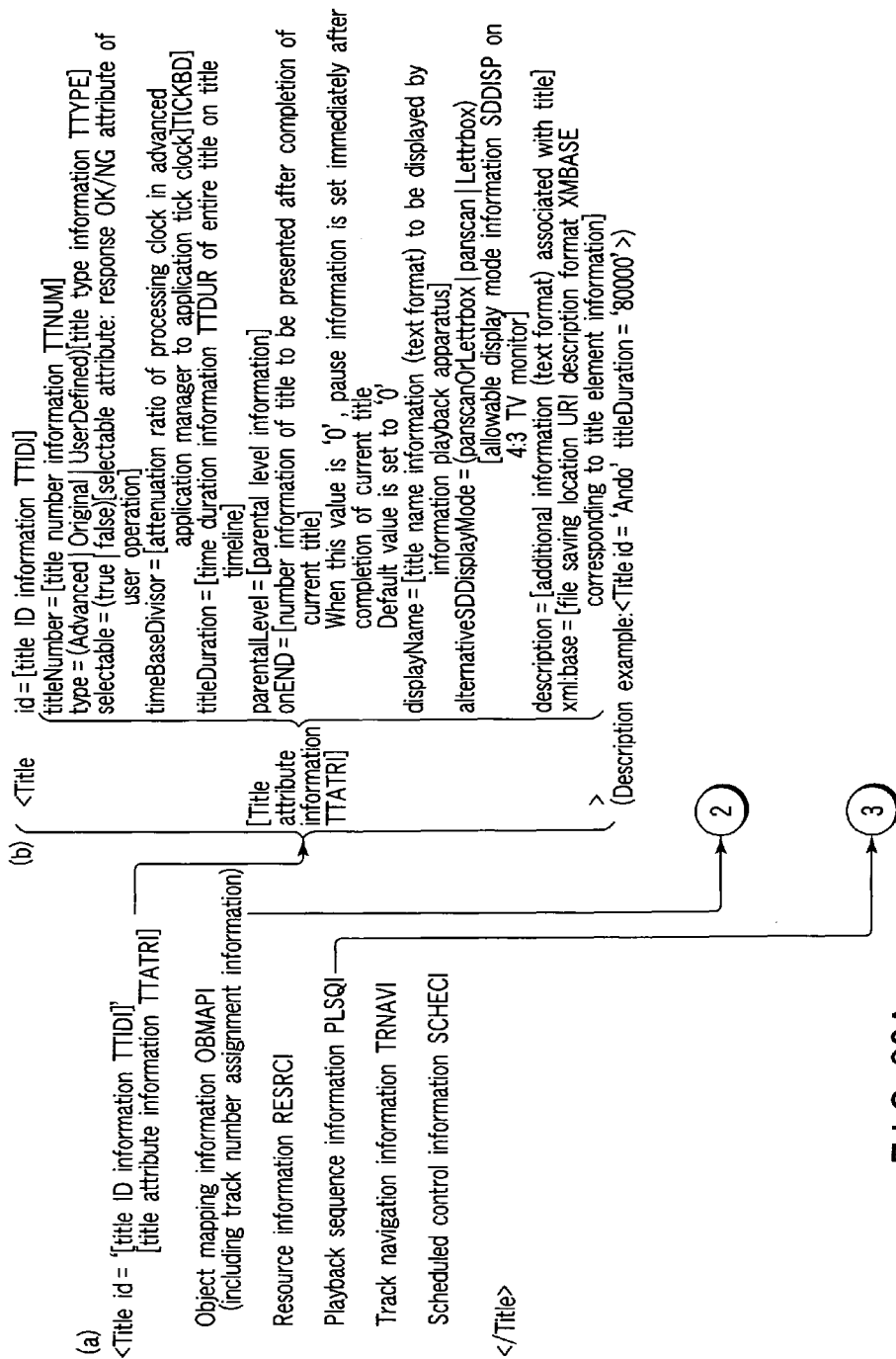
FIGS. 20A and 20B are exemplary views showing details of title attribute information, object mapping information, and playback information.
Figure 20B:
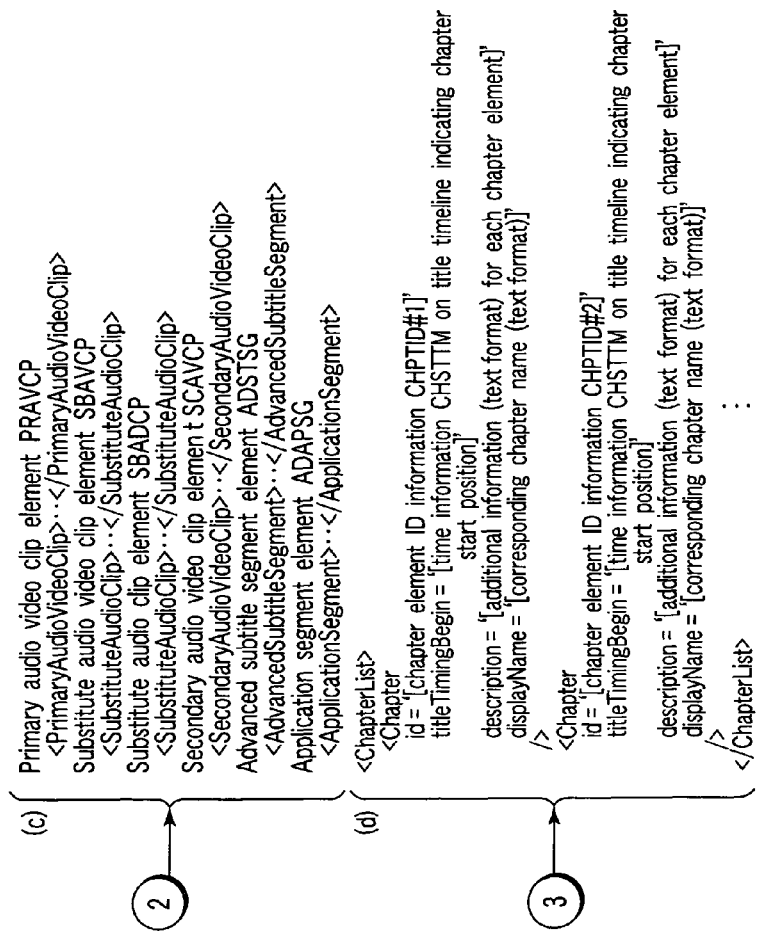

FIGS. 20A and 20B show information described in the title element tag that represents the start of each title element information TTELEM in this embodiment. The title element tag describes ID information TTIDI of a title used to identify each title first. Next, selectable attribute information is described. This selectable attribute information indicates selection information as to whether or not the designated title can be operated in response to user operations. For example, in case of the system shown in FIG. 1, the user may oppose the wide-screen TV monitor 15 and may perform screen operations (e.g., fast-forwarding FF or first-rewinding FR) using a remote controller (not shown). Processing designated by the user in this way is called a user operation, and the selectable attribute information indicates whether or not the title is processed in response to user operations. In this information, a word of either "true" or "false" is described. For example, when the video contents of the corresponding title, i.e., the commercial 44 and preview 41 are not allowed to be fast-forwarded by the user, the entire corresponding title may be set to inhibit user operations. In such case, the selectable attribute information is set to "false" to inhibit user operations with respect to the corresponding title, thus rejecting requests such as fast-forwarding, fast-rewinding, and the like by the user. When this value is "true", user operations are supported, and processing (user operations) such as fast-forwarding, fast-rewinding, and the like can be executed in response to user's requests. In this embodiment, the default value of the selectable attribute information is set to "true". The title playback processing method of the advanced content playback unit ADVPL (see FIG. 1) largely changes depending on the selectable attribute information. Therefore, by allocating the selectable attribute information at a position immediately after the title ID information TTIDI and after other kinds of information, the convenience of the processing of the advanced content playback unit ADVPL can be improved. In this embodiment, a description of the selectable attribute information can be omitted in the title element tag. When the description of this information is omitted, it is set as a default value "true".

Frame rate information represents the number of frames per sec of video information to be presented on the screen, and corresponds to a reference time interval of the title timeline TMLE. As has been described using FIG. 14, in this embodiment, two systems, i.e., the 50-Hz system (50 counts are counted up per sec on the title timeline TMLE) and 60-Hz system (60 counts are counted up per sec on the title timeline TMLE) can be set as the title timeline TMLE. For example, in case of NTSC interlaced display, 30 frames (60 fields) are displayed per sec. This case corresponds to 60-Hz system, and a unit interval (time interval of one count of the title timeline is set to 1/60 sec.

Time duration information TTDUR of the entire title on the title timeline TMLE represents the duration of the entire title timeline TMLE on the corresponding title. The time duration information TTDUR of the entire title on the title timeline TMLE is described using the total number of counts of the 50-Hz system or 60-Hz system corresponding to the frame rate (number of frames per sec) information. For example, when the presentation time of the corresponding entire title is n sec, a value "60n" or "50n" is set in the total number of counts as the time duration information TTDUR of the entire title on the title timeline TMLE. In this embodiment, the end times of all playback objects shall be smaller than the time duration information TTDUR of the entire title on the title timeline TMLE. In this manner, since the time duration information TTDUR of the entire title on the title timeline TMLE depends on the time unit interval on the title timeline TMLE, it is allocated behind the frame rate information, thus assuring easy data processing of the advanced content playback unit ADVPL.

Next parental level information indicates a parental level of the corresponding title to be played back.

A numeral equal to or smaller than 8 is entered as the parental level value. In this embodiment, this information may be omitted in the title element tag. A default value of this information is set to "1".

Information "on End" that represents the number information of a title to be presented after completion of the current title describes information of the title number related with the next title to be played back after completion of the current title. When a value set in the title number is "0", the window is kept paused (to present the end window) after completion of the title. A default value of this information is set to "0". A description of this information can be omitted in the title element tag, and in such case, that information is set to "0" as a default value.

Title name information "displayName" to be displayed by the information recording and playback apparatus 1 describes the name of the corresponding title in a text format. Information described in this information can be displayed as the title name of the information recording and playback apparatus 1. Also, this information can be omitted in the title element tag.

Furthermore, the column of additional information (description) related with a title describes additional information related with the title in a text format. A description of this information can be omitted in the title element tag. The title name information (displayName) to be displayed by the information recording and playback apparatus 1 and additional information (description) related with the title are not essential upon executing the playback processing of the advanced content playback unit ADVPL. Therefore, these pieces of information are recorded at the last location in title attribute information TTATRI.

As a practical information example of the title element tag, for example, when the identification ID information of a title is "Ando" and the time duration of the entire title in the 60-Hz system is 80000, a description example is:

<Title='Ando' titleDuration='80000'>

In the 60-Hz system, since the number of counts of the title timeline TMLE is counted up by 60 per sec, the value "80000" amounts to 22 min (≈80000÷60÷60).

Information in the title element information TTELEM includes the object mapping information OBMAPI that describes a presentation clip element list, the resource information RESRCI that records a title resource element, the playback sequence information PLSQI that describes a chapter list element, and the track navigation information TRNAVI that describes a track list navigation list element, as shown in (c) of FIG. 19A. The presentation clip elements describe the primary audio video clip PRAVCP, substitute audio clip SBADCP, secondary audio video clip SCAVCP, advanced subtitle segment ADSTSG, and application segment ADAPSG, as shown in (c) of FIG. 20B. The presentation clip elements are described in the object mapping information OBMAPI in each title. The presentation clip elements are described as a part of track number assignment information in correspondence with each elementary stream.

The playback sequence information PLSQI is described as a list of chapter list elements, as shown in (d) of FIG. 20B.

<Chapter Elements and Playback Sequence Information>

Title element in Playlist file contains a list of Chapter elements in a Chapter List element. Chapter List element describes chapter structure, called by Playback Sequence Information.

The Chapter List element consists of a list of Chapter element. According to the document order of Chapter element in Chapter List, the Chapter number for Advanced Navigation shall be assigned continuously from '1'.

The total number of chapters in a Title shall be less than 2000.

The total number of chapters in a Playlist shall be less than 100000.

The title Time Begin attribute of Chapter element describes the chapter start position by the time value on the Title Timeline. Chapter end position is given as the next chapter start position or the end of the Title Timeline for the last chapter.

The chapter start position in a Title

Timeline shall be monotonically increased according to the chapter number, and be less than or equals to the duration of Title Timeline. The chapter start position of chapter 1 shall be 00:00:00:00.

The following description is an example of Playback Sequence.

```
<ChapterList>
    <Chapter titleTimeBegin="00:00:00:00"/>
    <Chapter titleTimeBegin="00:01:02:00"/>
    <Chapter titleTimeBegin="00:02:01:03"/>
    <Chapter titleTimeBegin="00:04:02:30"/>
    <Chapter titleTimeBegin="00:05:21:22"/>
    <Chapter titleTimeBegin="00:06:31:23"/>
</ChapterList>
```

More intelligible explanations will be provided below.

The chapter list element in the playback sequence information PLSQI describes a chapter structure in the title. The chapter list element is described as a list of chapter elements (respective lines starting with a <Chapter titleTimingBegin> tag, as shown in (d) of FIG. 20B). The number of a chapter element described first in the chapter list is set to "1", and the chapter numbers are set in accordance with the order of description of respective chapter elements. The number of chapters in one chapter list (title) is set to be 512 or less, thus preventing diffusion in the processing of the advanced content playback unit ADVPL. A titleTimingBegin attribute (information described after "<Chapter titleTimingBegin>=") in each chapter element represents time information (the number of counts on the title timeline TMLE) indicating the start position of each chapter on the title timeline. The end position of the current chapter is represented by the start position of the next chapter. The end position of the last chapter is interpreted as the last value (count value) on the title timeline TMLE. The time information (count value) indicating the start position of each chapter on the title timeline TMLE shall be set to be monotonously increased in correspondence with increments of chapter number. With this setting, sequence jump access control according to the playback order of chapters is facilitated.

In the description of the aforementioned embodiment, at least some of various objects to be played back and used are recorded in the information storage medium (DISC). However, the invention is not limited to this. For example, the information storage medium (DISC) may record only management information (e.g., only the playlist (PLLST)), and all objects to be played back and used may be stored in the network server (NTSRV) (or persistent storage (PRSTR)). Using that management information, the information playback apparatus may access the network server (NTSRV) or the like via the network as needed to acquire various objects to be played back and used stored in the network server (NTSRV) or the like so as to execute playback processing and the like.

As described above, according to the embodiment of the invention, at least the following demands can be satisfied:

1. Realization of flexible and diversified expression formats like computer window;
2. Realization of flexible responses to various actions via network; and
3. Realization of easy processing of video related information and easy transmission of information after processing.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information reproducing method, comprising:
   reproducing management information, the management information including mapping information that manages presentation timings and positions on a screen of objects of a video title, in which presentation start and end timings of each of the objects are described in a form of mapping on a title timeline, the mapping information including resource information that records information indicating which timings resource files that record information needed to play back the objects are to be stored on a cache; and
   transferring resource files onto the cache at the timings indicated by the resource information and reproducing the objects on a screen of a display device at the presentation timings and positions indicated by the mapping information, based on the management information.

2. A non-transitory information storage medium storing computer-executable program code, which when executed by a processor, cause the information playback apparatus to perform playback of a video title, the program code comprising:
   reproducing management information, the management information including mapping information that manages presentation timings and positions on a screen of objects of the video title, in which presentation start and end timings of each of the objects are described in a form of mapping on a title timeline, the mapping information including resource information that records information indicating which timings resource files that record information needed to play back the objects are to be stored on a cache; and
   transferring resource files onto the cache at the timings indicated by the resource information and reproducing the objects on a screen of a display device at the presentation timings and positions indicated by the mapping information, based on the management information.

* * * * *